US009927140B2

(12) United States Patent
Pinkalla et al.

(10) Patent No.: US 9,927,140 B2
(45) Date of Patent: *Mar. 27, 2018

(54) PLIABLE-WALL AIR DUCTS WITH INTERNAL EXPANDING STRUCTURES

(71) Applicant: Rite-Hite Holding Corporation, Milwaukee, WI (US)

(72) Inventors: Cary Pinkalla, Fox Point, WI (US); Frank Heim, Platteville, WI (US); Kevin J. Gebke, Dubuque, IA (US); Nicholas L. Kaufmann, Sherill, IA (US); William A. Niehaus, Holy Cross, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,051

(22) Filed: Feb. 16, 2017

(65) Prior Publication Data

US 2017/0159966 A1 Jun. 8, 2017

Related U.S. Application Data

(63) Continuation of application No. 13/879,759, filed as application No. PCT/US2011/059199 on Nov. 3, (Continued)

(51) Int. Cl.
*F24F 13/02* (2006.01)
(52) U.S. Cl.
CPC ...... *F24F 13/0218* (2013.01); *F24F 13/0245* (2013.01); *F24F 13/0254* (2013.01)

(58) Field of Classification Search
CPC .. F16L 11/02; F16L 11/00; F16L 11/10; F16L 3/18; F16L 55/00; F24F 7/06;
(Continued)

(56) References Cited

U.S. PATENT DOCUMENTS 2,939,378 A 6/1960 Zalkind
3,716,077 A 2/1973 Sherman et al.
(Continued)

FOREIGN PATENT DOCUMENTS

CN 2162615 4/1994
CN 101617178 12/2009
(Continued)

OTHER PUBLICATIONS

Mexican Industrial Property Institute, "Office Action," issued in connection with Mexican Patent Application No. MX/2013/006737, dated Apr. 7, 2017, 3 pages.
(Continued)

*Primary Examiner* — J. Casimer Jacyna
(74) *Attorney, Agent, or Firm* — Hanley, Flight & Zimmerman, LLC

(57) ABSTRACT

Pliable-wall air ducts with internal expanding structures are disclosed. An example air duct system includes a shaft to be disposed within an air duct, to extend in a longitudinal direction, and to be in longitudinal compression. The air duct system also includes a plurality of ribs to be coupled to the shaft and to engage an inner surface of the air duct and a spring to be disposed within the air duct, the spring to be coupled to the shaft. The spring under stress being a contributing factor in both the shaft being in longitudinal compression and the air duct being in longitudinal tension.

30 Claims, 45 Drawing Sheets

Related U.S. Application Data 2011, now Pat. No. 9,605,864, which is a continuation-in-part of application No. 12/950,511, filed on Nov. 19, 2010, now Pat. No. 8,844,578.

(58) Field of Classification Search
CPC .... F24F 7/065; F24F 13/0218; F24F 13/0254; F24F 13/0245
See application file for complete search history.

(56) References Cited

U.S. PATENT DOCUMENTS

| | | | |
|---|---|---|---|
| 3,824,909 A | 7/1974 | Horneff et al. | |
| 4,327,775 A | 5/1982 | Tally | |
| 4,456,034 A | 6/1984 | Bixby | |
| 5,096,004 A | 3/1992 | Ide | |
| 5,989,006 A | 11/1999 | Godeau et al. | |
| 6,280,320 B1 | 8/2001 | Paschke et al. | |
| 6,425,417 B1* | 7/2002 | Paschke | F24F 13/0218 138/106 |
| 8,356,634 B2 | 1/2013 | Blake et al. | |
| 8,434,526 B1 | 5/2013 | Pinkalla et al. | |
| 8,844,578 B2 | 9/2014 | Pinkalla et al. | |
| 9,605,864 B2 | 3/2017 | Pinkalla et al. | |
| 9,605,865 B2 | 3/2017 | Pinkalla et al. | |
| 9,612,033 B2 | 4/2017 | Pinkalla et al. | |
| 2007/0220732 A1 | 9/2007 | Liebson | |
| 2009/0194186 A1 | 8/2009 | Gross | |
| 2011/0105239 A1 | 5/2011 | Garno | |
| 2012/0028562 A1 | 2/2012 | Heim et al. | |
| 2012/0125472 A1 | 5/2012 | Pinkalla et al. | |
| 2014/0000744 A1 | 1/2014 | Pinkalla et al. | |
| 2014/0007971 A1 | 1/2014 | Pinkalla et al. | |
| 2014/0261835 A1 | 9/2014 | Pinkalla et al. | |

FOREIGN PATENT DOCUMENTS

| | | |
|---|---|---|
| DE | 1956659 | 6/1970 |
| EP | 1091179 | 4/2001 |
| FR | 2713317 | 6/1995 |
| GB | 1181405 | 2/1970 |
| JP | H11201537 | 7/1999 |
| JP | 2004116793 | 4/2004 |
| WO | 2012091795 | 7/2012 |

OTHER PUBLICATIONS

Mexican Industrial Property Institute, "Notice of Allowance," issued in connection with Mexican Patent Application No. MX/a/2015/006736, dated May 9, 2017, 3 pages.
Mexican Industrial Property Institute, "Notice of Allowance," issued in connection with Mexican Patent Application No. MX/2013/005158, dated Apr. 11, 2017, 2 pages.
European Patent Office, "Communication pursuant to Rules 161(1) and 162 EPC," issued in connection with European Patent Application No. 11788265.4, dated Jun. 26, 2013, 2 pages.
International Searching Authority, "International Search Report," issued in connection with PCT Application No. PCT/US2011/059199, dated Apr. 11, 2012, 7 pages.
International Searching Authority, "Written Opinion of the International Searching Authority," issued in connection with PCT Application No. PCT/US2011/059199, dated Apr. 11, 2012, 10 pages.
International Searching Authority, "International Preliminary Report on Patentability," issued in connection with PCT Application No. PCT/US2011/059199, dated May 21, 2013, 11 pages.
United States Patent and Trademark Office, "Non-Final Office Action," issued in connection with U.S. Appl. No. 12/950,511, dated Feb. 20, 2014, 27 pages.
United States Patent and Trademark Office, "Notice of Allowance and Fee(s) Due," issued in connection with U.S. Appl. No. 12/950,511, dated May 20, 2014, 21 pages.

United States Patent and Trademark Office, "Notice of Allowance and Fee(s) Due," issued in connection with U.S. Appl. No. 13/879,759, dated Dec. 7, 2016, 45 pages.
United States Patent and Trademark Office, "Notice of Allowance and Fee(s) Due," issued in connection with U.S. Appl. No. 14/288,116, dated Dec. 5, 2016, 15 pages.
Canadian Intellectual Property Office, "Office Action," issued in connection with Canadian Patent Application No. 2,931,262, dated Jan. 20, 2017, 3 pages.
United States Patent and Trademark Office, "Final Office Action," issued in connection with U.S. Appl. No. 14/288,116, dated Oct. 5, 2016. 41 pages.
Mexican Industrial Property Institute, "Fourth Office Action," issued in connection with Mexican Patent Application No. MX/a/2013/005158, dated Sep. 23, 2016, 7 pages.
European Patent Office, "Communication under Rule 71(3) EPC," issued in connection with European Patent Application No. 11 788 265.4, dated Nov. 3, 2016, 79 pages.
United States Patent and Trademark Office, "Final Office Action," issued in connection with U.S. Appl. No. 13/879,759 dated Sep. 21, 2016, 10 pages.
Qatar Patent Office, "Second Office Action," issued in connection with Qatar Patent Application No. QA201305/00084, dated Jun. 21, 2016, 6 pages.
State Intellectual Property Office of China, "Certificate of Invention Patent," issued in connection with Chinese Patent Application No. 201180055124.4, dated Nov. 3, 2011, 1 page.
Mexican Patent Office, "Third Office Action," issued in connection with Mexican Patent Application No. MX/a/2013/005158, dated Feb. 26, 2016, 4 pages.
The State Intellectual Property Office of China, "Notice of Granting Patent Right," issued in connection with Chinese Patent Application No. 201180055124.4, dated Feb. 5, 2016, 4 pages.
United States Patent and Trademark Office, "Non-Final Office Action," issued in connection with U.S. Appl. No. 13/879,759, dated Feb. 1, 2016, 113 pages.
United States Patent and Trademark Office, "Non-Final Office Action," issued in connection with U.S. Appl. No. 14/288,116, dated Feb. 4, 2016, 89 pages.
Canadian Intellectual Property Office, "Notice of Allowance," issued in connection with Canadian Patent office No. 2,818,114, dated Dec. 11, 2015, 1 page.
State Intellectual Property Office of China, "Second Office Action," issued in connection with Chinese Patent Application No. 201180055124.4, dated Oct. 23, 2015, 4 pages.
Mexican Industrial Property Institute, "Second Office Action," issued in connection with Mexican Patent Application No. MX/a/2013/005158, dated Aug. 20, 2015, 7 pages.
Qatar Patent Office, "Decision of Amendment," issued in connection with Qatar Patent Application No. QA/201305/00084, dated Jul. 9, 2015, 4 pages.
IP Australia, "Innovation Patent Certified," issued in connection with Australian Innovation Patent No. 2014101307, dated Jun. 5, 2015, 2 pages.
IP Australia, "Certificate of Grant," issued in connection with Australian Patent Application No. 2011353077, dated May 7, 2015, 1 page.
IP Australia, "Certificate of Grant," issued in connection with Australian Patent Application No. 2014277862, dated May 21, 2015, 1 page.
Mexican Industrial Property Institute, "Office Action," issued in connection with Mexican Patent Application No. MX/a/2013/005158, dated Apr. 21, 2015, 5 pages.
Canadian Intellectual Property Office, "Second Office Action," issued in connection with Canadian Patent Application No. 2,818,114, dated Feb. 16, 2015, 4 pages.
State Intellectual Property Office of China, "First Office Action," issued in connection with Chinese Patent Application No. 201180055124.4, dated Feb. 9, 2015, 14 pages.
IP Australia, "Notice of Acceptance," issued in connection with Australian patent application No. 2014277862, dated Jan. 22, 2015, 2 pages.

(56) References Cited

OTHER PUBLICATIONS

IP Australia, "Notice of Acceptance," issued in connection with Australian Patent Application No. 2011353077, dated Jan. 6, 2015, 2 pages.
IP Australia, "Innovation Patent Examination Report No. 1," issued in connection with Australian innovation Patent Application No. 2014101307, dated Dec. 23, 2014, 4 pages.
IP Australia, "Patent Examination Report No. 1," issued in connection with Australian Patent Application No. 2011353077, dated Nov. 7, 2014, 4 pages.
IP Australia, "Certificate of Grant," issued in connection with Australian Patent Application No. 2014101307, dated Nov. 13, 2014, 2 pages.
Canadian Intellectual Property Office, "Office Action," issued in connection with Canadian Patent Application No. 2,818,114, dated Oct. 30, 2014, 3 pages.
United States Patent and Trademark Office, "Notice of Allowance and Fee(s) Due," issued in connection with U.S. Appl. No. 14/018,097, dated Jan. 30, 2017, 12 pages.
United States Patent and Trademark Office, "Decision on Appeal," issued in connection with U.S. Appl. No. 14/018,097, dated Jan. 12, 2017, 5 pages.
United States Patent and Trademark Office, "Advisory Action," issued in connection with U.S. Appl. No. 14/018,097, dated Apr. 21, 2014, 3 pages.
United States Patent and Trademark Office, "Final Office Action," issued in connection with U.S. Appl. No. 14/018,097, dated Mar. 4, 2014, 8 pages.
United States Patent and Trademark Office, "Non-Final Office Action," issued in connection with U.S. Appl. No. 14/018,097, dated Jan. 13, 2014, 10 pages.
International Searching Authority, "Invitation to Pay Additional Fees and, Where Applicable, Protest Fee," issued in connection with PCT/US2011/059199, dated Jan. 20, 2012, 8 pages.
United States Patent and Trademark Office, "Examiner's Answer," issued in connection with U.S. Appl. No. 14/018,097, dated Aug. 22, 2014, 8 pages.
Canadian Intellectual Property Office, "Office Action," issued in connection with Canadian Patent Application No. 2,931,239 dated Feb. 3, 2017, 4 pages.
Canadian Intellectual Property Office, "Office Action," issued in connection with Canadian Patent Application No. 2,931,239, dated Aug. 15, 2017, 4 pages.
European Patent Office, "Extended European Search Report," issued in connection with European Patent Application No. 17000234.9, dated May 26, 2017, 8 pages.
United States Patent and Trademark Office, "Non-Final Office Action," issued in connection with U.S. Appl. No. 15/435,032, dated Jul. 7, 2017, 28 pages.
State Intellectual Property Office of China, "First Office Action," issued in connection with Chinese Patent Application No. 201610208324.3, dated Jul. 28, 2017, 8 pages.
Mexican Industrial Property Institute, "Notice of Allowance," issued in connection with Mexican Patent Application No. MX/2017/043006, dated Jul. 31, 2017, 3 pages.
United States Patent and Trademark Office, "Final Office Action," issued in connection with U.S. Appl. No. 15/435,032, dated Nov. 16, 2017, 13 pages.
Canadian Intellectual Property Office, "Notice of Allowance," issued in connection with Canadian Patent Application No. 2,931,262, dated Oct. 23, 2017, 1 page.
State Intellectual Property Office of China, "Notice of Granting Patent Right for Invention," issued in connection with Chinese Patent Application No. 201610208324.3, dated Nov. 7, 2017, 7 pages.

\* cited by examiner

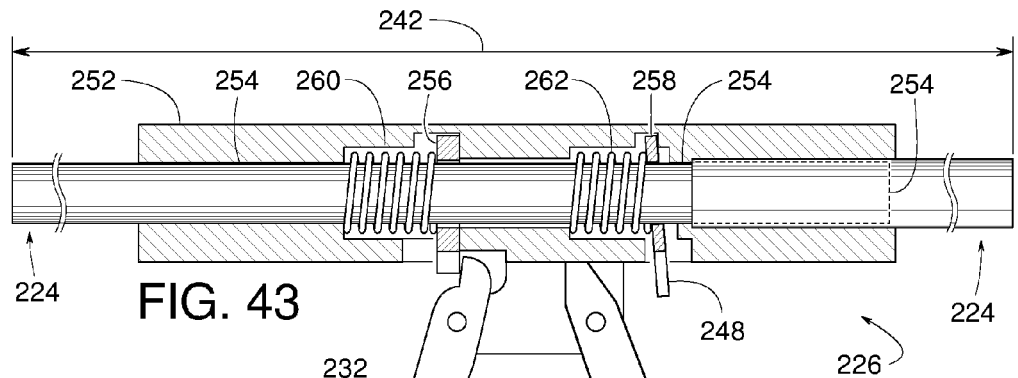
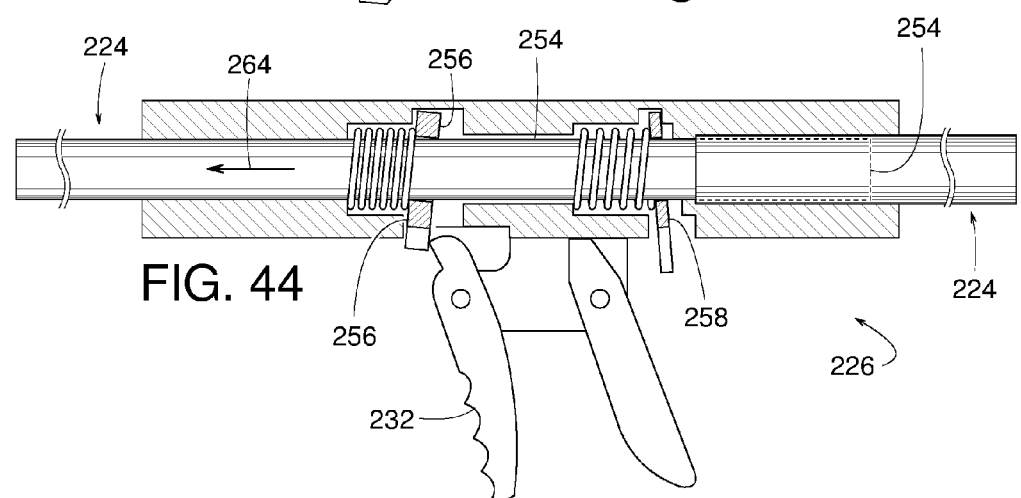
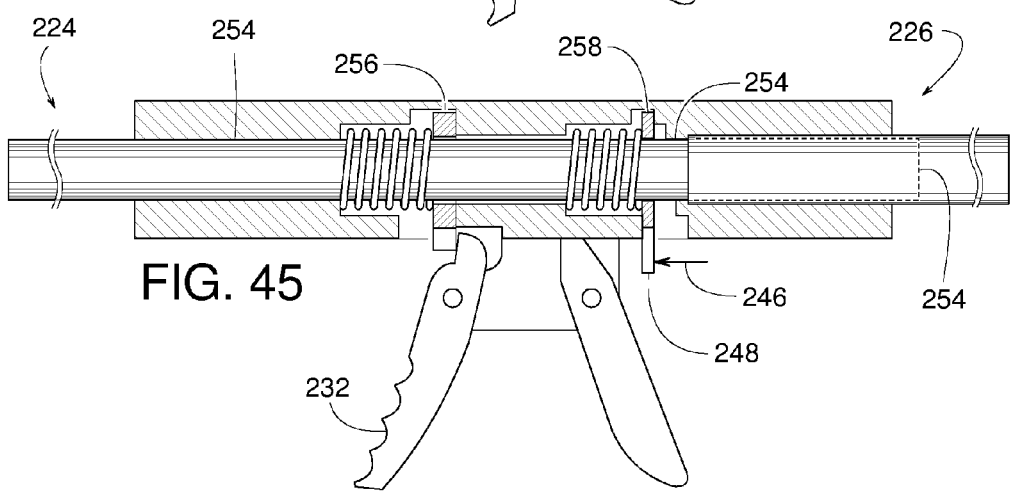

US 9,927,140 B2

PLIABLE-WALL AIR DUCTS WITH INTERNAL EXPANDING STRUCTURES

RELATED APPLICATIONS

This patent arises from a continuation of U.S. patent application Ser. No. 13/879,759 filed on Apr. 16, 2013, which is a National Stage of International Patent Application Serial Number PCT/US2011/059199 filed on Nov. 3, 2011, which is a continuation-in-part of U.S. patent application Ser. No. 12/950,511 (now U.S. Pat. No. 8,844,578) filed on Nov. 19, 2010. Each of the above-referenced patent applications is hereby incorporated herein by reference in its entirety.

FIELD OF THE DISCLOSURE

This patent generally pertains to air ducts and more specifically to pliable-wall air ducts with internal expanding structures.

BACKGROUND

Ductwork is often used for conveying conditioned air (e.g., heated, cooled, filtered, etc.) discharged from a fan and distributing the air to a room or other areas within a building. Ducts are typically formed of rigid metal, such as steel, aluminum, or stainless steel. In many installations, ducts are hidden above suspended ceilings for convenience and aesthetics. But in warehouses, manufacturing plants and many other buildings, the ducts are suspended from the roof of the building and are thus exposed. In those warehouse or manufacturing environments where prevention of air-borne contamination of the inventory is critical, metal ducts can create problems.

For instance, temperature variations in the building or temperature differentials between the ducts and the air being conveyed can create condensation on both the interior and exterior of the ducts. The presence of condensed moisture on the interior of the duct may form mold or bacteria that the duct then passes onto the room or other areas being supplied with the conditioned air. In the case of exposed ducts, condensation on the exterior of the duct can drip onto the inventory or personnel below. The consequences of the dripping can range anywhere from a minor irritation to a dangerously slippery floor or complete destruction of products underneath the duct (particularly in food-processing facilities).

Further, metal ducts with localized discharge registers have been known to create uncomfortable drafts and unbalanced localized heating or cooling within the building. In many food-processing facilities where the target temperature is 42 degrees Fahrenheit, a cold draft can be especially uncomfortable and perhaps unhealthy.

Many of the above problems associated with metal ducts are overcome by the use of flexible fabric ducts, such as DUCTSOX from DuctSox Corporation of Dubuque, Iowa. Such ducts typically have a pliable fabric wall (often porous) that inflates to a generally cylindrical shape by the pressure of the air being conveyed by the duct. Fabric ducts seem to inhibit the formation of condensation on its exterior wall, possibly due to the fabric having a lower thermal conductivity than that of metal ducts. In addition, the fabric's porosity and/or additional holes distributed along the length of the fabric duct broadly and evenly disperse the air into the room being conditioned or ventilated. The even distribution of airflow also effectively ventilates the walls of the duct itself, thereby further inhibiting the formation of mold and bacteria.

In many cases, however, once the room's conditioning demand has been met, the air supply fan is turned off or down until needed again. When the fan is off, the resulting loss of air pressure in the duct deflates the fabric tube, causing it to sag. Depending on the application and material of the fabric, in some cases, the sagging creates a less than optimal appearance or may interfere with whatever might be directly beneath the duct. Moreover, when the duct is re-inflated, the duct can produce a loud popping sound as the duct's fabric again becomes taut from the air pressure.

BRIEF DESCRIPTION OF THE DRAWINGS

FIG. 43 is a cross-sectional side view of the linear clutch shown in FIG. 37 with the clutch's reciprocator in its relaxed position and the clutch's release lever in its normal position.

FIG. 44 is a cross-sectional side view similar to FIG. 43 but showing the linear clutch's reciprocator at its stressed position.

FIG. 45 is a cross-sectional side view similar to FIG. 43 but showing the linear clutch's release lever in its release position.

DETAILED DESCRIPTION

Figure 1:
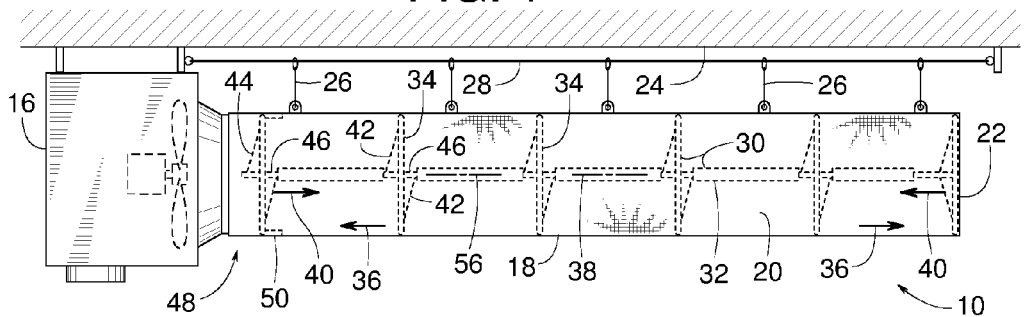
FIG. 1 is a side view of a de-energized example air duct system with an example internal framework for holding the system's pliable duct in a generally expanded shape.
Figure 2:
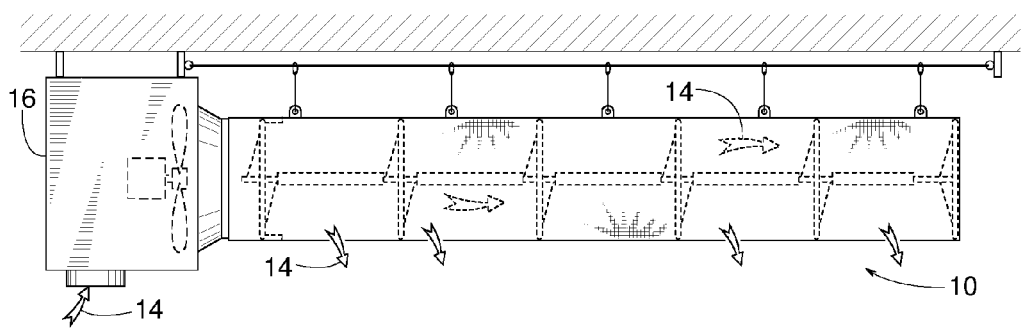
FIG. 2 is a side view similar to FIG. 1 but showing the system's blower energized.

Certain examples are shown in the above-identified figures and described in detail below. In describing these examples, like or identical reference numbers are used to identify same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Example air ducts comprising pliable tubular sidewalls are provided with example internal frameworks that hold the duct in a generally expanded shape even when the duct is depressurized. The framework tensions the pliable sidewall material along the length of the ducts to keep the material taut. In some examples, the framework is restrained within the duct such that the duct's sidewall, being in tension, holds the framework in compression longitudinally. Thus, in the longitudinal direction, the duct is in tension and the framework is in compression. To prevent the framework from buckling under the compressive force, some example frameworks comprise a central longitudinal shaft with a plurality of radial spokes and rings that help hold the shaft straight. In some examples, the rings also help hold the duct radially expanded. In some examples, the framework is spring loaded.

FIGS. 1-4 show example air duct systems 10 and 12 for conveying air 14 discharged from a blower 16 and for dispersing or otherwise delivering air 14 to a room or other areas of a building. Duct system 10 of FIGS. 1 and 2 will be explained first, and the differences between duct systems 10 and 12 being explained later.

To convey air 14, duct system 10 includes an air duct 18 comprising a tubular sidewall 20 made of a pliable material. As used herein, the term, "sidewall" will refer to the full circumferential extent of the fabric tube, even if the portion of the sidewall runs along the top or bottom of the tube or anywhere in between. Some examples of pliable sidewall materials include, but are not limited to, a polymer coated or impregnated cloth fabric, an uncoated fabric, a polyester sheet, other polymer or non metallic sheets, and various combinations thereof. To release air 14 from within duct 18 to the room or area it serves, sidewall 20 and/or an end cap 22 of duct 18 includes one or more discharge openings such as, for example, cut-out openings, plastic or metal discharge registers, and/or porosity in the sidewall material itself.

In some examples, duct system 10 is mounted underneath a ceiling 24 with a plurality of hangers 26 suspending duct system 10 from an overhead support structure 28 (e.g. a cable, track, channel, beam, ceiling, etc.). An example framework 30 comprising a shaft 32 and a plurality of ribs 34 installed inside duct 18, and being of a relatively rigid material (e.g., rigid plastic, fiberglass, steel, aluminum, etc.) that is stiffer and less flexible than sidewall 20, holds duct 18 in a generally expanded shape, regardless of whether blower 16 is energized or inactive. Thus, framework 30 helps prevent or minimize the pneumatic shock and resulting popping noise of a pliable air duct being suddenly inflated as blower 16 turns on, which can suddenly increase the air pressure within duct 18 from an inactive ambient air pressure to an active positive air pressure. Framework 30 also eliminates or minimizes the extent to which duct 18 sags or otherwise suffers degradation in appearance when blower 16 is de-energized. In some installations of the frameworks and/or shaft assemblies disclosed herein, such structures also help hold duct 18 open when duct 18 is used as a return air duct conveying subatmospheric air to the suction inlet of a blower.

Framework 30 is contained within duct 18 in such a way that framework 30 exerts a tensile force 36 that tensions duct 18 in a generally longitudinal direction 38 so that at least sidewall 20 is maintained at a minimum level of tautness whether blower 16 is activated or not. In some examples, the frame work 30 tensions the full and/or substantially the full circumference of the duct 18. Tensioning duct 18 lengthwise subjects shaft 32 of framework 30 to a reactive longitudinal compressive force 40. To prevent compressive force 40 from buckling shaft 32 and to help hold duct 18 in a radially expanded shape, ribs 34 are sized to hold duct 18 open and are spaced along the duct's 18 length to limit the radial deflection of shaft 32.

Figure 5:
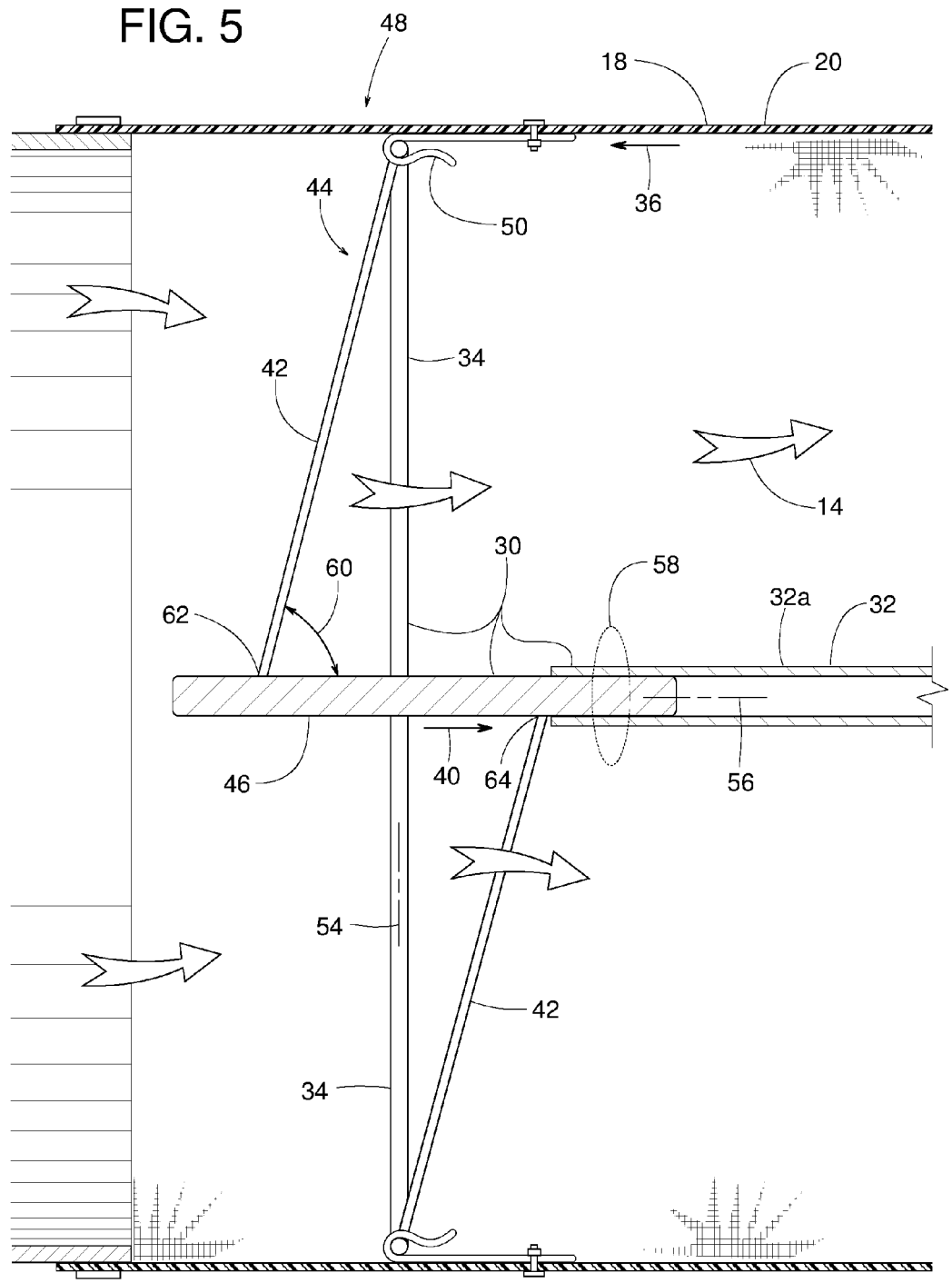
FIG. 5 is a cross-sectional side view showing a portion of the framework in FIG. 2.

Although the framework's 30 specific design details and means for mounting within a pliable air duct may vary, some examples are illustrated in the referenced figures. In FIG. 5, for example, framework 30 includes a radial support member 44 comprising a plurality of spokes 42 that connect rib 34 to a hub 46. In this example, rib 34 is a complete 360-degree ring, but in other examples, rib 34 is a curved rod that extends less than 360-degrees around the inner diameter of duct 18. Also in this example, rib 34, spokes 42 and hub 46, which make up radial support member 44 in this case, comprise a single construction or fabricated member such as a weldment.

Radial support member 44 can be installed at various locations along the length of shaft 32, as shown in FIG. 1. When radial support member 44 is installed at one end 48 of duct 18, as shown in FIG. 5, a retainer 50 holds rib 34 substantially fixed relative to the adjacent sidewall 20 of duct 18 so that this particular radial support member 44 can resist compressive force 40 and transmit the corresponding reactive force as tensile force 36, which tensions sidewall 20. Retainer 50 can be any means for holding a rib or radial support member generally fixed relative to an adjacent sidewall of a duct. Examples of such a retainer include, but are not limited to, a clip (rigid or spring loaded), a strap (elastic or rigid), an axial brace between rib 34 and the blower's housing, a constricting band-style hose clamp (e.g., retainer 52 of FIGS. 3, 4, 17 and 22-24), a screw, rivet, fastener, etc.

In examples where retainer 50 is in the form of an elastic strap or spring loaded clip, the retainer's 50 elasticity can help compensate for permanent longitudinal stretching of duct 18, which may slowly occur over time, depending on the material of sidewall 20. In addition or alternatively, elastic compensation of permanent longitudinal duct stretching may be incorporated within the framework 30 itself at almost any other location along the length of framework 30.

When radial support member 44 is installed at various intermediate locations within the length of duct 18, retainer 50 at those locations may be omitted. Without retainer 50, rib 34, or actually an imaginary plane 54 defined by rib 34, can still be maintained substantially perpendicular to a longitudinal centerline 56 of duct 18 by spokes 42 connecting rib 34 to hub 46 in combination with a telescopic connection 58 (or comparably stiff connection) between hub 46 and an adjoining shaft segment 32a. Shaft segment 32a is one of a plurality of segments that when connected to a plurality of hubs 46 provide an assembled shaft (shaft 32) that lies generally along centerline 56. The rib's 34 perpendicular orientation within duct 18 is further ensured by virtue of spokes 42 being tilted (e.g., spokes 42 lie at an angle 60 not perpendicular to the shaft 32) as shown in FIG. 5. Such an arrangement creates an axially offset arrangement where spokes 42 connect to hub 46 (e.g., spokes 42 are attached to hub 46 at a plurality of points 62 and 64 that are distributed and spaced apart lengthwise along hub 46), thereby making spokes 42 an effective angled brace.

Figure 21:
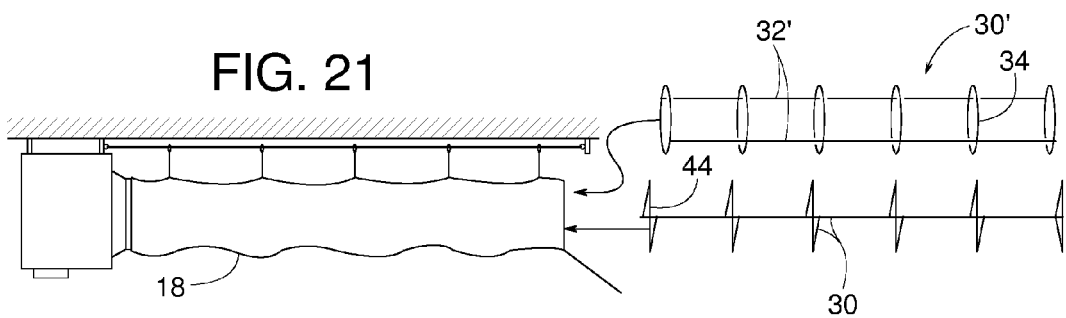
FIG. 21 is a side view similar to FIG. 20 but showing a choice of two example frameworks about to be inserted into the air duct of FIG. 20.

In the example shown in FIG. 5, hub 46 is a solid rod and shaft segment 32a is a tube with the rod fitting telescopically within the tube. In other examples, hub 46 is a tube and shaft segment 32a is a solid rod, wherein the solid rod of the shaft segment fits telescopically within the tubular hub. In some examples, both the hub and the shaft segment are tubes of different diameters with the smaller diameter tube fitting telescopically within the larger one. In some examples, hubs 46 provide a coupling that interconnects a plurality of shaft segments 32a, and in other examples, the hub and the "shaft segments" are a unitary piece or a single weldment. In other examples, the hub and shaft segments are joined by some other means for attachment. In still other examples, as shown in FIG. 21, a framework 30' comprises ribs 34 being interconnected by one or more shafts 32' at the rib's periphery, thereby eliminating the need for spokes 42 and hub 46.

Figure 6:
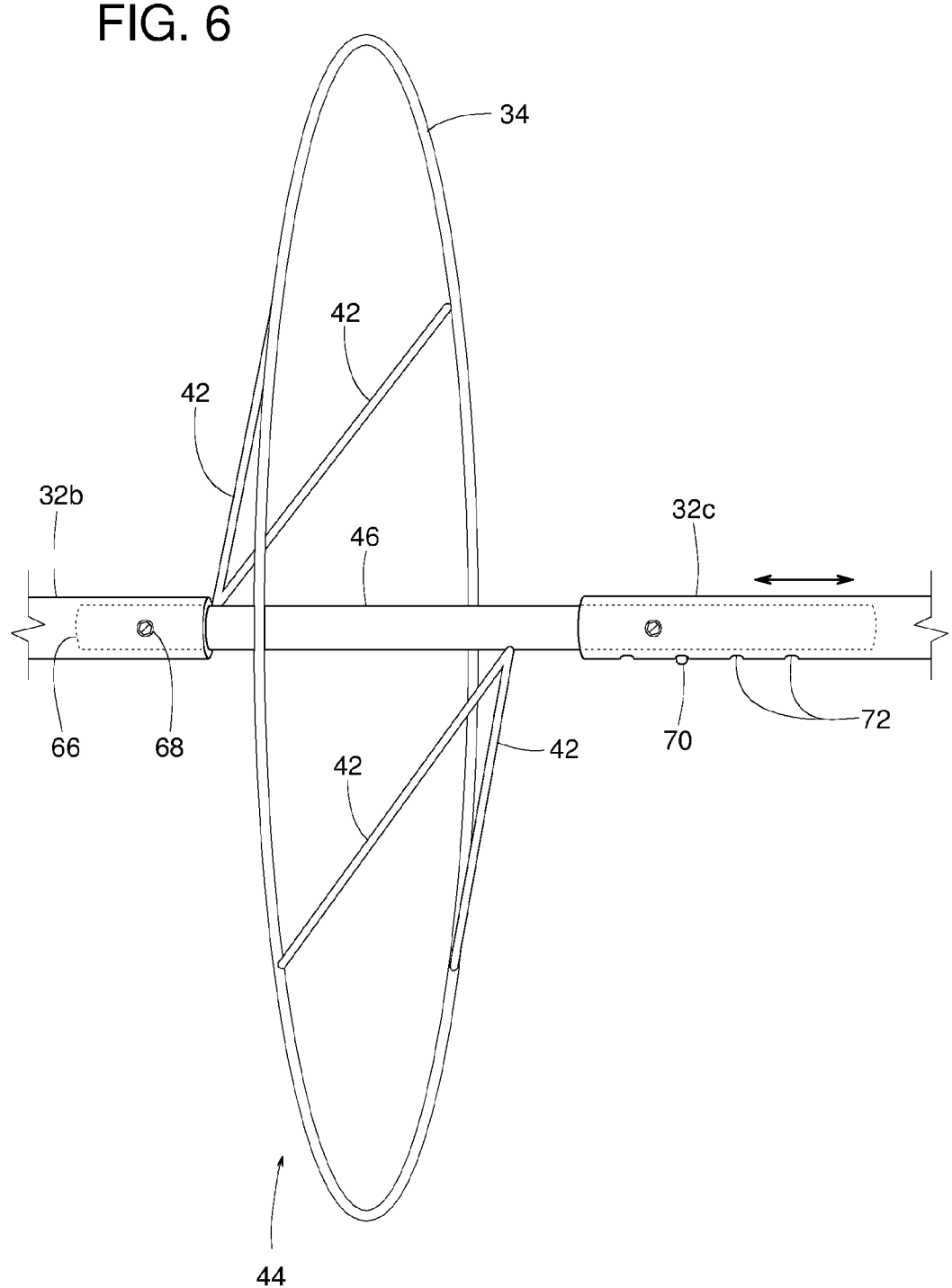
FIG. 6 is a perspective view of an example radial support member.

FIG. 6 shows an example where one end 66 of hub 46 fits within a shaft segment 32b with a fastener 68 (e.g., a screw, pin, spring loaded button, etc.) holding the two together. In addition or alternatively, hub 46 includes a spring loaded button 70 that protrudes selectively into one of several holes 72 in a shaft segment 32c to provide discrete axial adjustment between hub 46 and shaft segment 32c. Such axial adjustment can be used for adjusting the overall length of framework 30.

Figure 7:
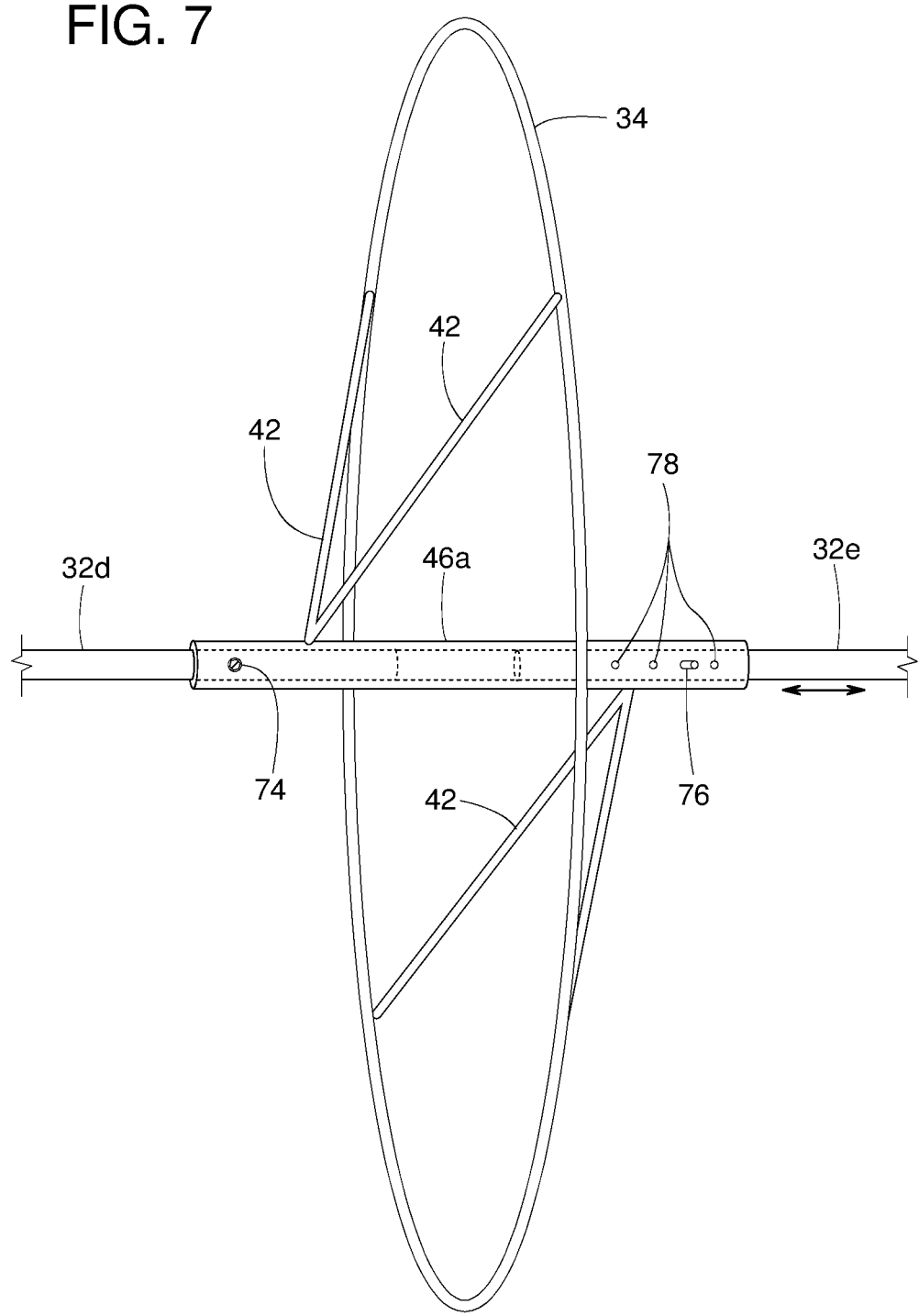
FIG. 7 is a perspective view of another example radial support member.

FIG. 7 shows an example where solid shaft segments 32d and 32e fit within a tubular hub 46a. A self-tapping screw 74 fastens shaft segment 32d to one end of hub 46a. To provide the framework with an adjustable length, a pin 76 is inserted selectively in one of a series of holes 78. Once inserted, pin 76 holds the chosen fixed axial relationship between hub 46a and shaft segment 32e.

Figure 8:
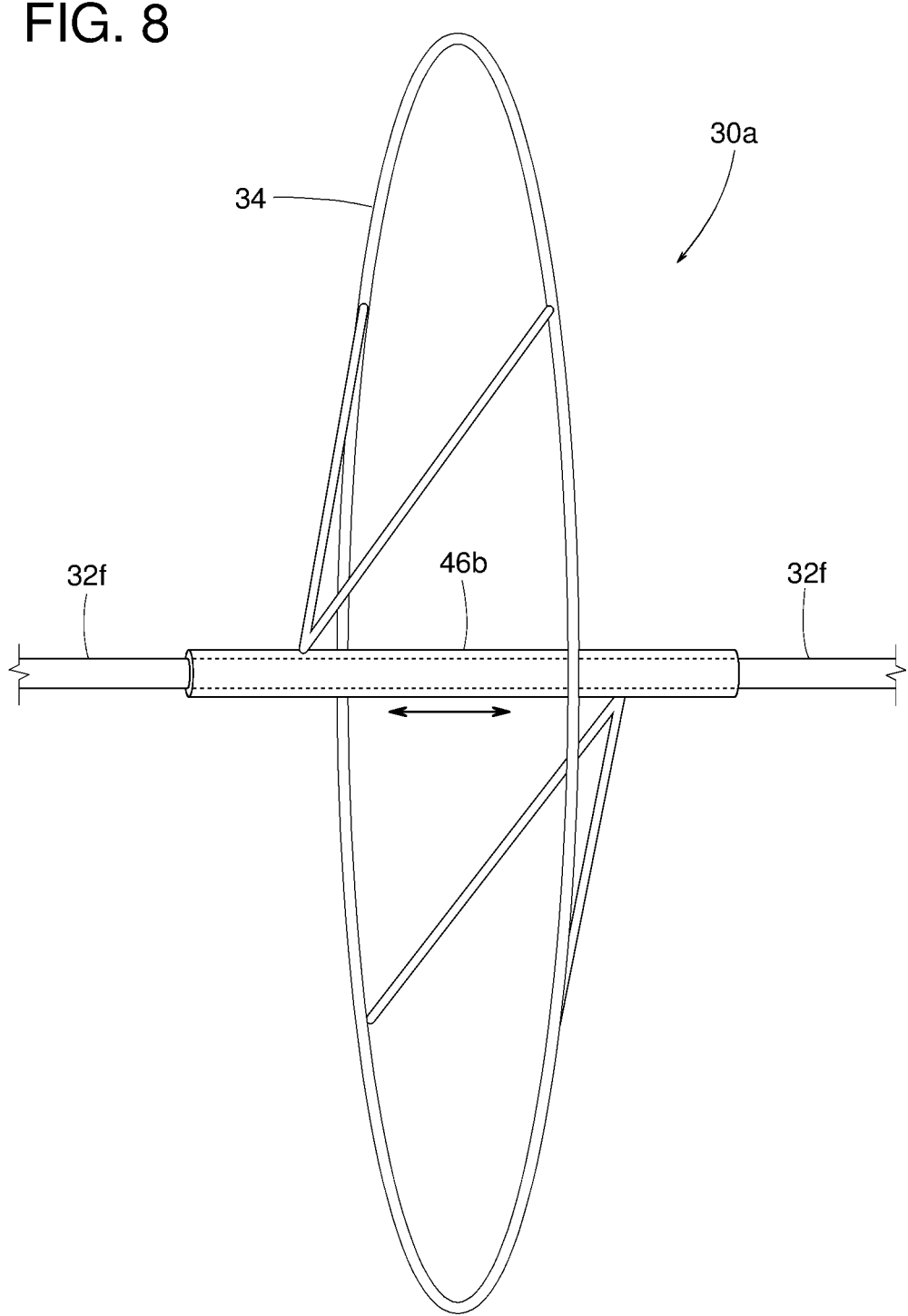
FIG. 8 is a perspective view of another example radial support member.

FIG. 8 shows an example where a radial support member 30a has a tubular hub 46b that can telescopically slide along a continuous shaft 32f, rather than a segmented one. When inserted within duct 18, in some examples, rib 34 is attached to sidewall 20 and hub 46b is left with limited freedom to slide relative to shaft 32f, but in other examples, hub 46b is fastened to shaft 32f to hold it in place axially along shaft 32f.

Figure 9:
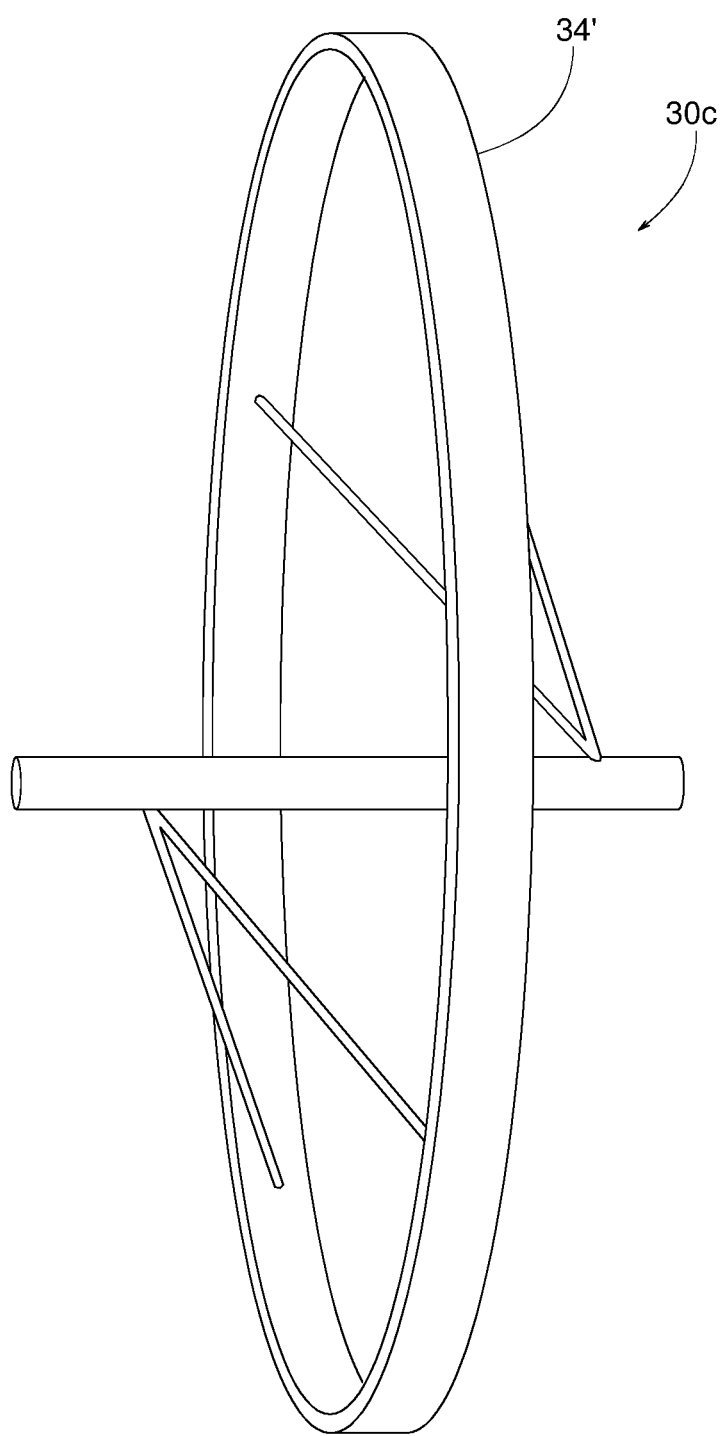
FIG. 9 is a perspective view of yet another example radial support member.

FIG. 9 shows an example where a radial support member 30c includes a ring 34' that may be formed from a flat bar, which might make radial support member 30c more suitable for clamping with a band-style hose clamp such as retainer 52 of FIGS. 3, 4, 17 and 22-24.

Figure 10:
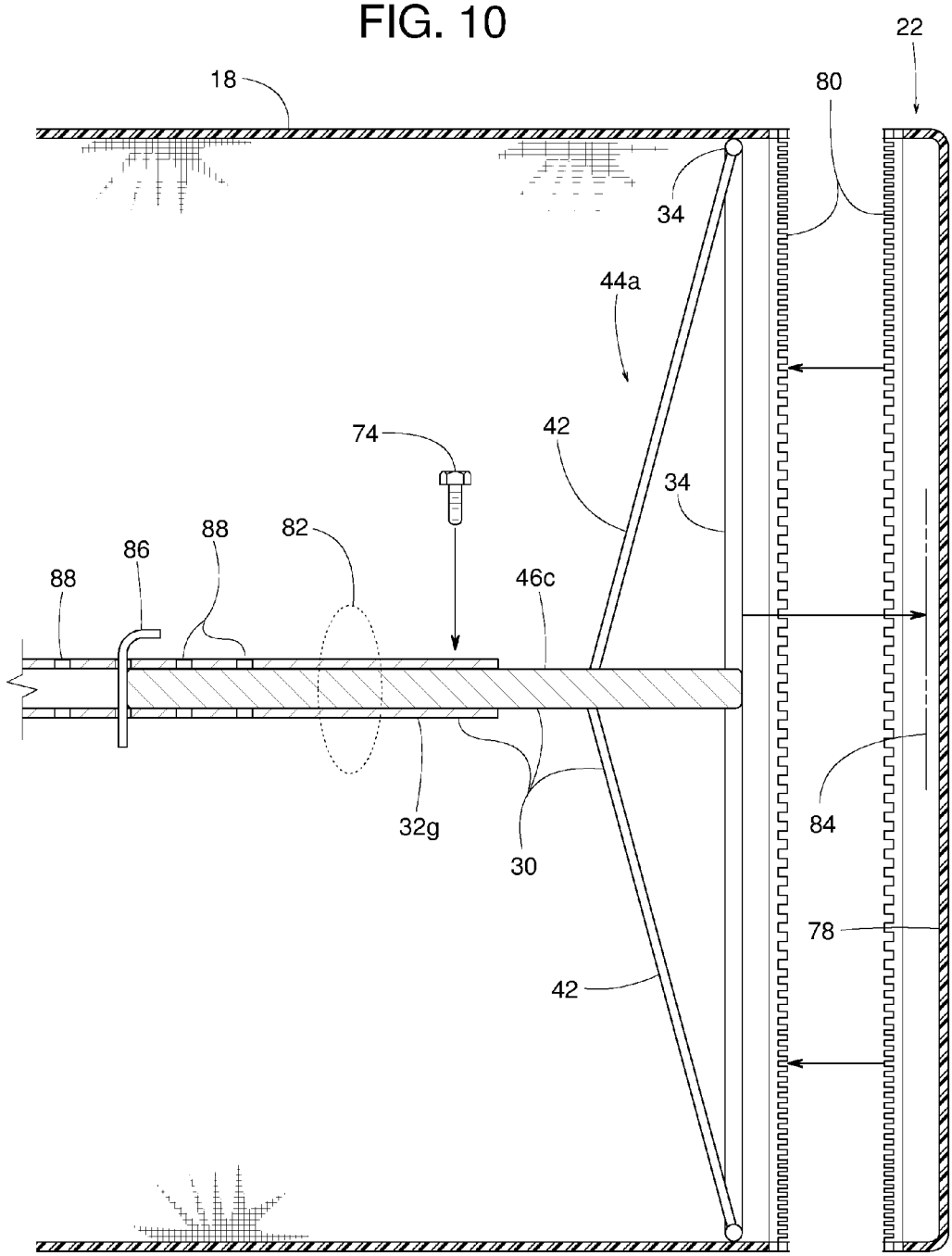
FIG. 10 is a cross-sectional side view showing one end of the framework in FIGS. 1-4 with the end cap disconnected.
Figure 11:
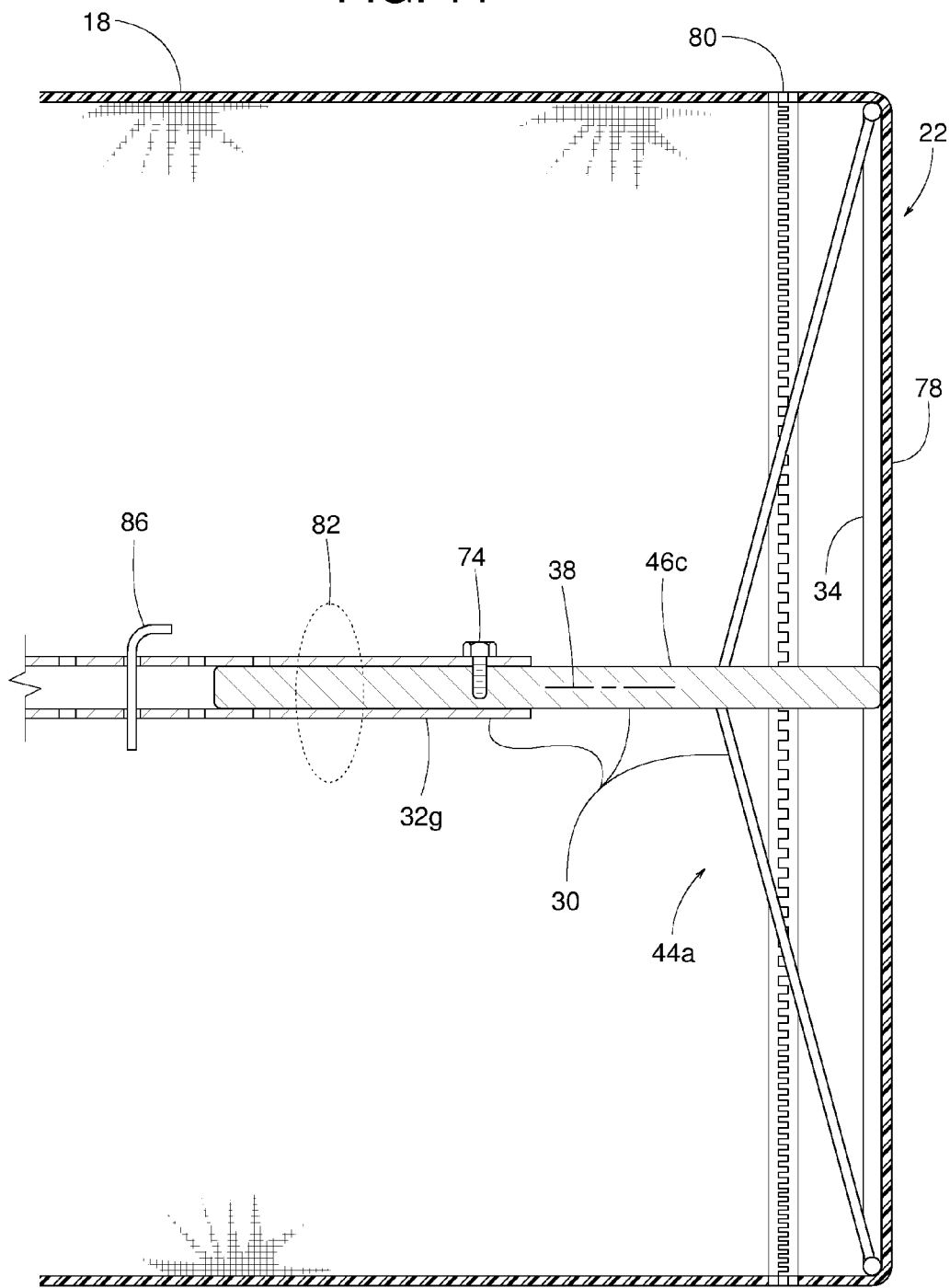
FIG. 11 is a cross-sectional side view similar to FIG. 10 but showing the framework lengthened and the end cap installed.
Figure 12:
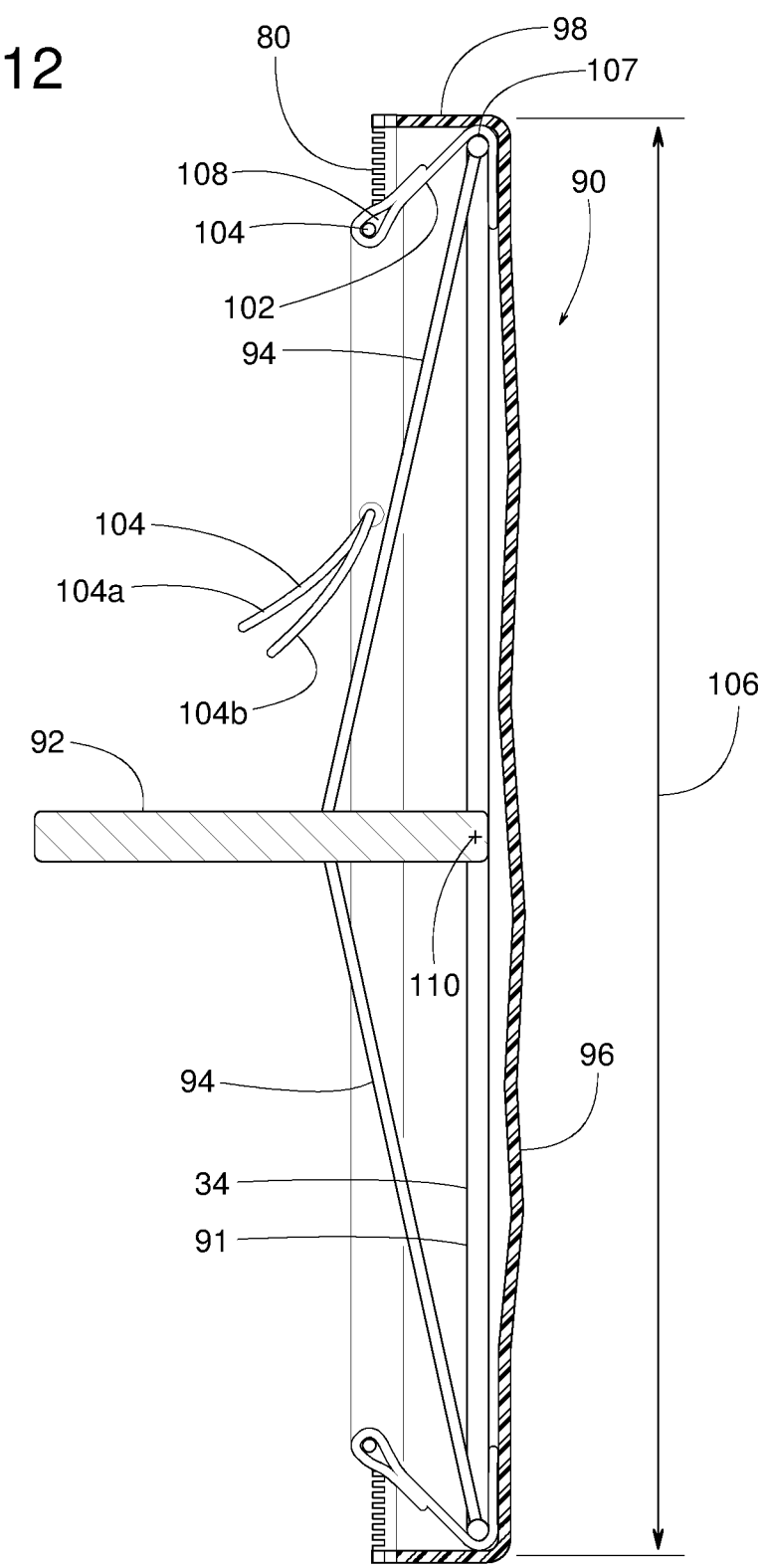
FIG. 12 is a cross-sectional side view of an example end cap.
Figure 13:
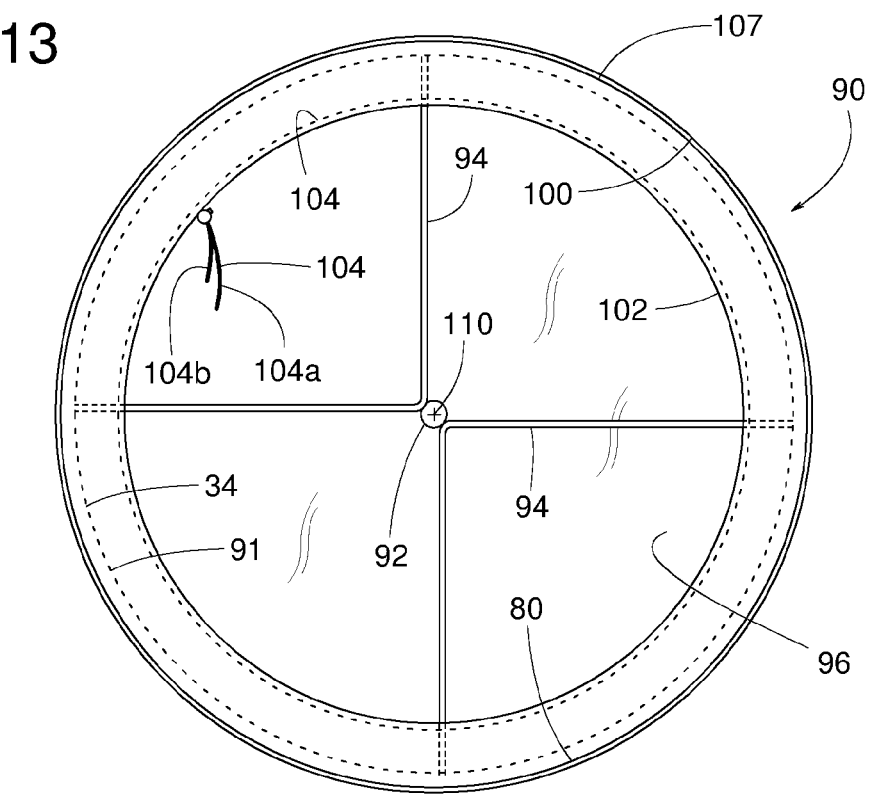
FIG. 13 is a back view of the end cap shown in FIG. 12 with the end cap's pliable sheet being relatively loose.
Figure 14:
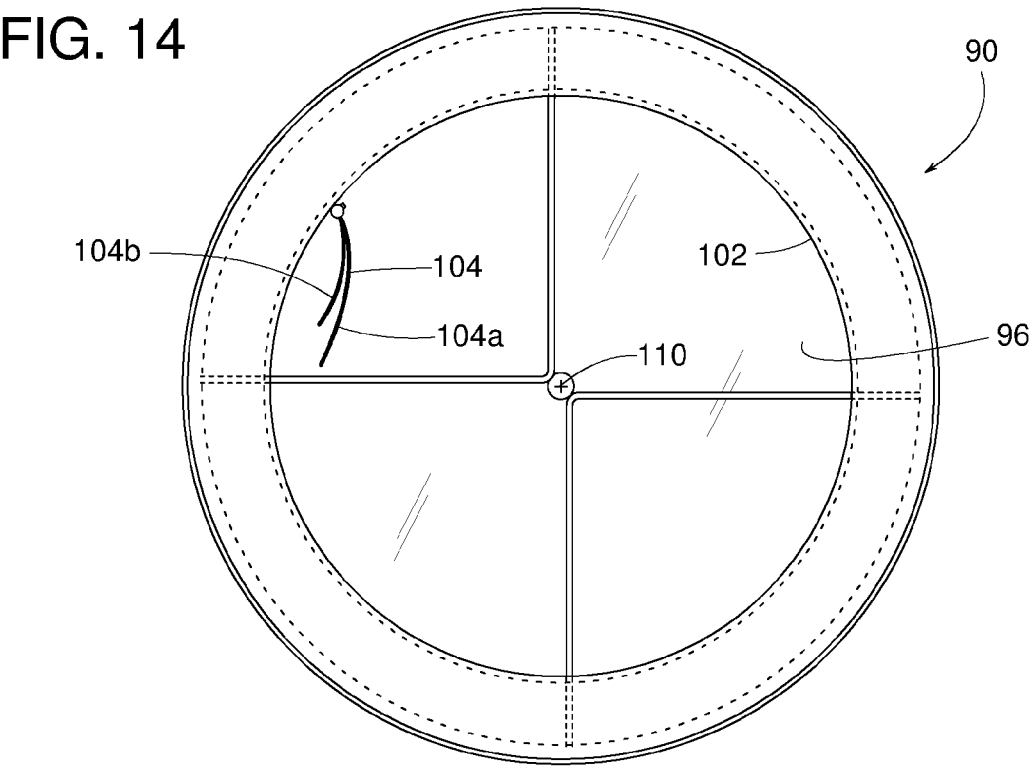
FIG. 14 is a back view similar to FIG. 13 but showing the end cap's pliable sheet taut.
Figure 15:
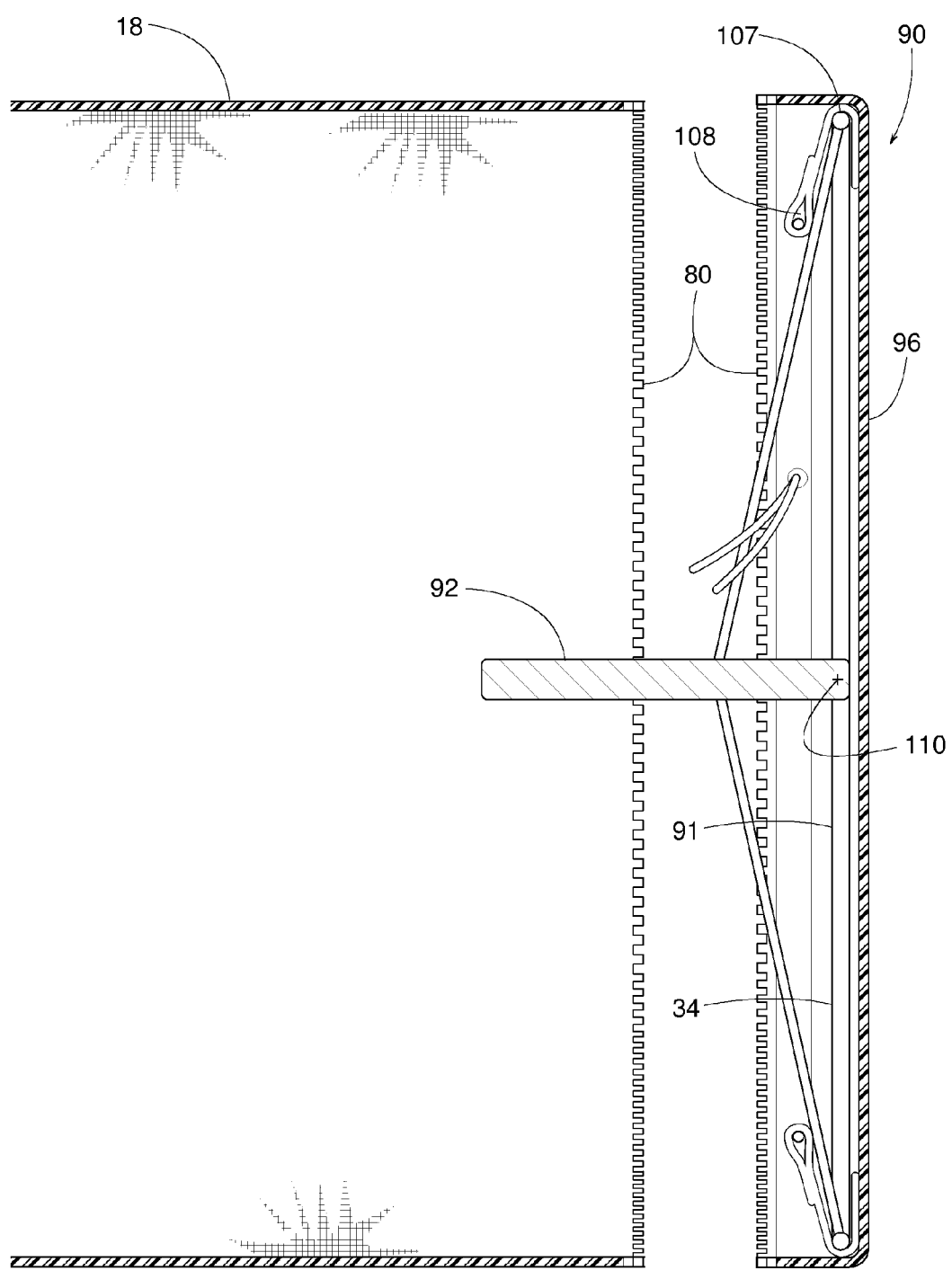
FIG. 15 is a cross-sectional side view similar to FIG. 12 but showing the end cap about to be installed.

In the illustrated example shown in FIGS. 10 and 11, end cap 22 comprises a pliable end sheet 78 with a fastener 80 for connecting end cap 22 to the end of duct 18. Radial support member 44a comprises a plurality of spokes 42 connecting rib 34 to a hub 46c. Some examples of fastener 80 include, but are not limited to, a zipper, a touch-and-hold fastener, snaps, clips, etc. To ensure framework 30 is sufficiently long to tension duct 18 when end cap 22 is installed, a telescopic connection 82 between hub 46c and a shaft segment 32g enables a total length of framework 30 to be increased adequately by sliding radial support member 44a out to phantom line 84, as shown in FIG. 10. When framework 30 is adjusted to the proper length, that length is held fixed by fastening hub 46c to shaft segment 32g by way of screw 74, for instance. In addition or alternatively, a pin 86 selectively insertable in one of a series of holes 88 can be used for setting a minimum length of framework 30, which can be a helpful feature during installation of duct system 10.

After framework 30 is set at the proper length, duct 18 and its end cap 22 are forcibly pulled together over rib 34 and fastener 80 is closed, as shown in FIG. 11. In some examples, the proper length of framework 30 is determined based on the anticipated pressure of air that blower 16 discharges into duct 18. In some examples, the length of framework 30 is sized such that the mechanical force exerted by framework 30 in longitudinal direction 38 is greater than the pneumatic force applied to the duct's end cap 22 so that the application of the pneumatic force does not expand or "pop" duct 18 beyond the end of framework 30. In other words, air duct 18 is at a first magnitude of tension in longitudinal direction 38 when the air inside air duct 18 is at the inactive ambient air pressure, air duct 18 is at a second magnitude of tension in longitudinal direction 38 when the air inside duct 18 is at the active positive air pressure, and the first magnitude of tension is greater than a difference between the first and second magnitudes of tension. Also, the first magnitude of tension is less than the second magnitude of tension. Furthermore, framework 30 is at a first magnitude of compression in longitudinal direction 38 when the air inside duct 18 is at the inactive ambient air pressure, framework 30 is at a second magnitude of compression in longitudinal direction 38 when the air inside duct 18 is at the active positive air pressure, and the first magnitude of compression is greater than a difference between the first and second magnitudes of compression. Also, the first magnitude of compression is greater than the second magnitude of compression.

Figure 3:
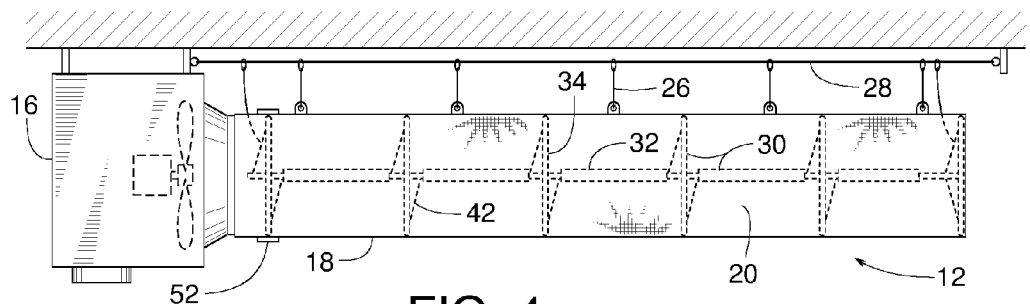
FIG. 3 is a side view similar to FIG. 1 but showing another example air duct system.
Figure 4:
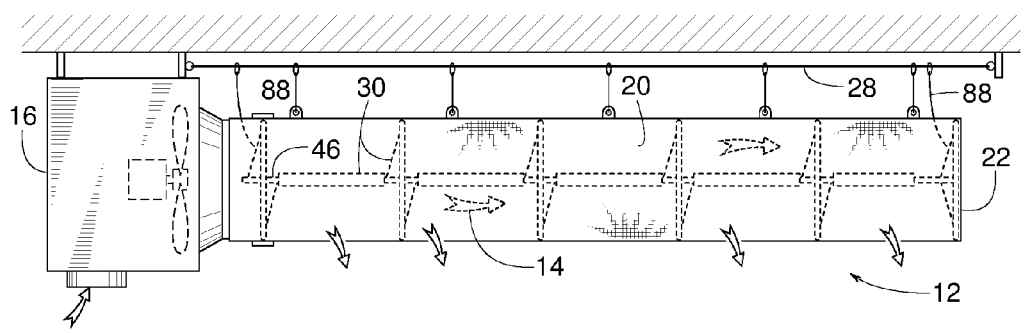
FIG. 4 is a side view similar to FIG. 3 but showing the system blower energized.

Once contained within duct 18, framework 30 requires no additional support because duct 18, which may be independently suspended from overhead support structure 28, carries most if not all the framework's total weight. In some examples, however, as shown in FIGS. 3 and 4, backup hangers 88 extending through sidewall 20 fasten framework 30 directly to some overhead support (e.g., support structure 28) so that framework 30 has a redundant source of support if frame support provided by duct 18 fails.

FIGS. 12-16 show an example end cap 90 that can be used instead of end cap 22 and can be used in a wide variety of pliable or inflatable air ducts, regardless of whether or not the air duct has any other internal framework. End cap 90, in this example, comprises an end piece 91 over which a pliable sheet 96 is stretched or tightly held. In the illustrated example, end piece 91 is provided by rib 34 with an optional hub 92 and optional set of spokes 94. Hub 92 and spokes 94 can be useful when end cap 90 is used in conjunction with a framework, such as the frameworks shown in FIGS. 1-11.

Moreover, while the example shown here uses rib 34, any member with a complementary shape to end cap 22 can be used. In the case of a round duct, such a complementary shape would be circular. Accordingly, in addition to a ring, a circular plate or similar structure could also be used. It may not even be necessary for the structure to be continuous circumferentially.

In some examples, end cap 90 also includes a hem 98, fastener 80, an extension 102, and a constricting member 104. Sheet 96 with hem 98 has an outer peripheral portion 106 and overlies an outer periphery 107 of rib 34. In some examples, hem 98 is sewn to the outer peripheral portion of sheet 96. In other examples, hem 98 is an integral extension of sheet 96. Fastener 80 is illustrated to represent any means for connecting hem 98 to the end of a tubular pliable air duct, such as duct 18. In some examples, extension 102 extends from a virtual circular line 100 (FIG. 13) at the general vicinity where both hem 98 meets sheet 96 and where sheet 96 overlies rib 34.

In this example, constricting member 104 is connected to extension 102 and is used for tightening sheet 96 in an outward radial direction, thereby avoiding a loose-fitting appearance of sheet 96. In some examples, constricting member 104 is a drawstring and extension 102 is a circular web having an inner sleeve 108 through which the drawstring (member 104) is threaded. In other examples, extension 102 comprises a plurality of fabric tabs circumferentially spaced apart and distributed along circular line 100. In either case, manually pulling the ends 104a and 104b of the drawstring pulls extension 102 radially inward toward a central point 110 of rib 34, thereby tightening sheet 96 in a radially outward direction. The drawstring is then tied, clamped or otherwise fixed to maintain sheet 96 in a taut state.

Figure 16:
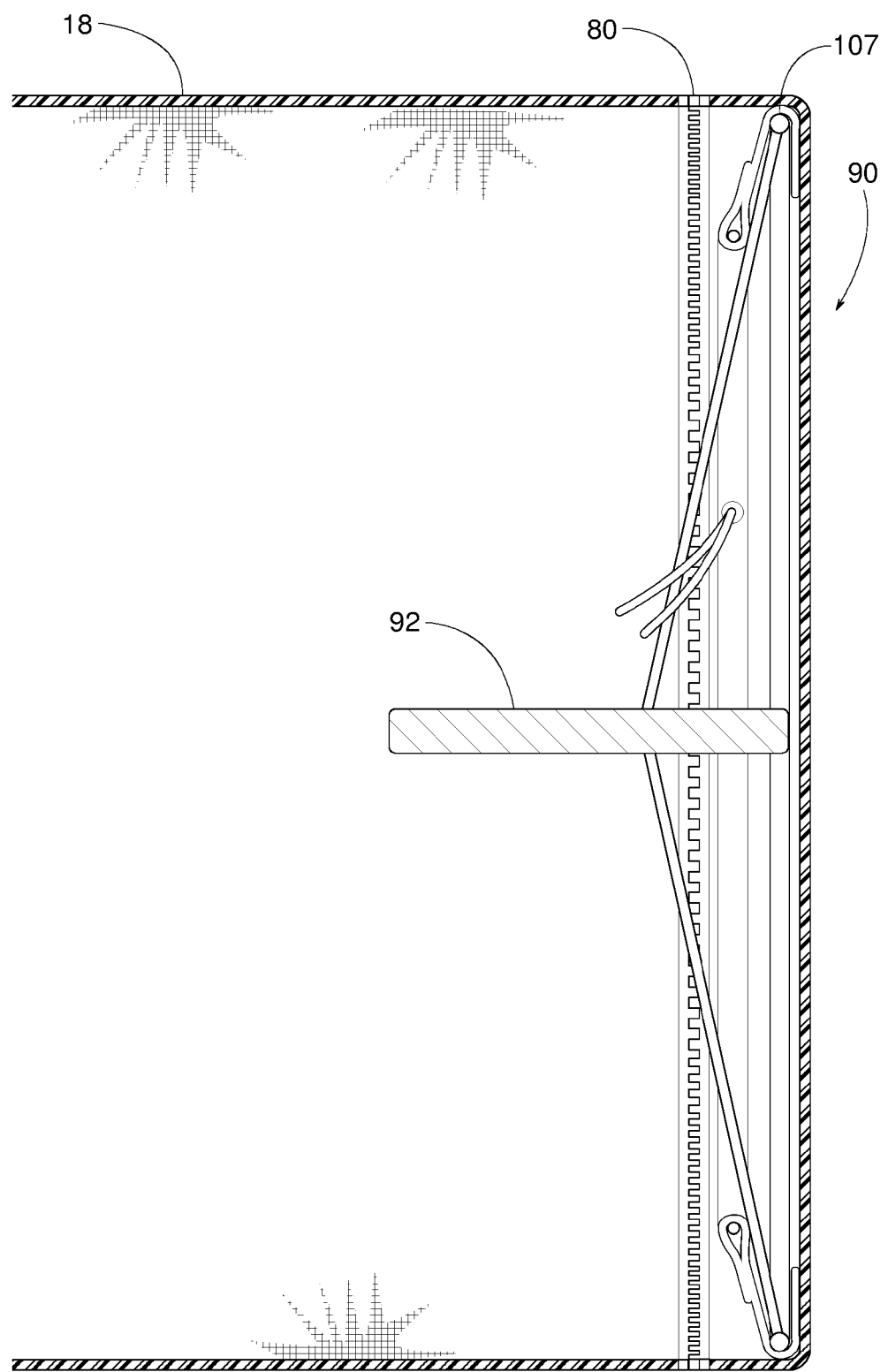
FIG. 16 is a cross-sectional side view similar to FIG. 15 but showing the end cap attached to a pliable-wall air duct.

In more general terms, constricting member 104 has a tight state (FIGS. 14, 15 and 16) and a loose state (FIGS. 12 and 13), wherein pliable sheet 96 is more taut when constricting member 104 is in the tight state than when constricting member 104 is in the loose state, and extension 102 is closer to central point 110 when constricting member 104 is in the tight state than when constricting member 104 is in the loose state. After sheet 96 is taut, fastener 80 connects end cap 90 to tubular pliable air duct 18, as shown in FIG. 16.

Regardless of the shape and other design features of end piece 91, constricting member 104 pulling extension 102 radially inward toward central point 110 pulls pliable sheet 96 over outer periphery 107 of end piece 91 and pulls pliable sheet 96 radially outward. The resulting radial tension in pliable sheet 96 provides end cap 90 with a neat appearance with minimal, if any, wrinkles.

Figure 17:
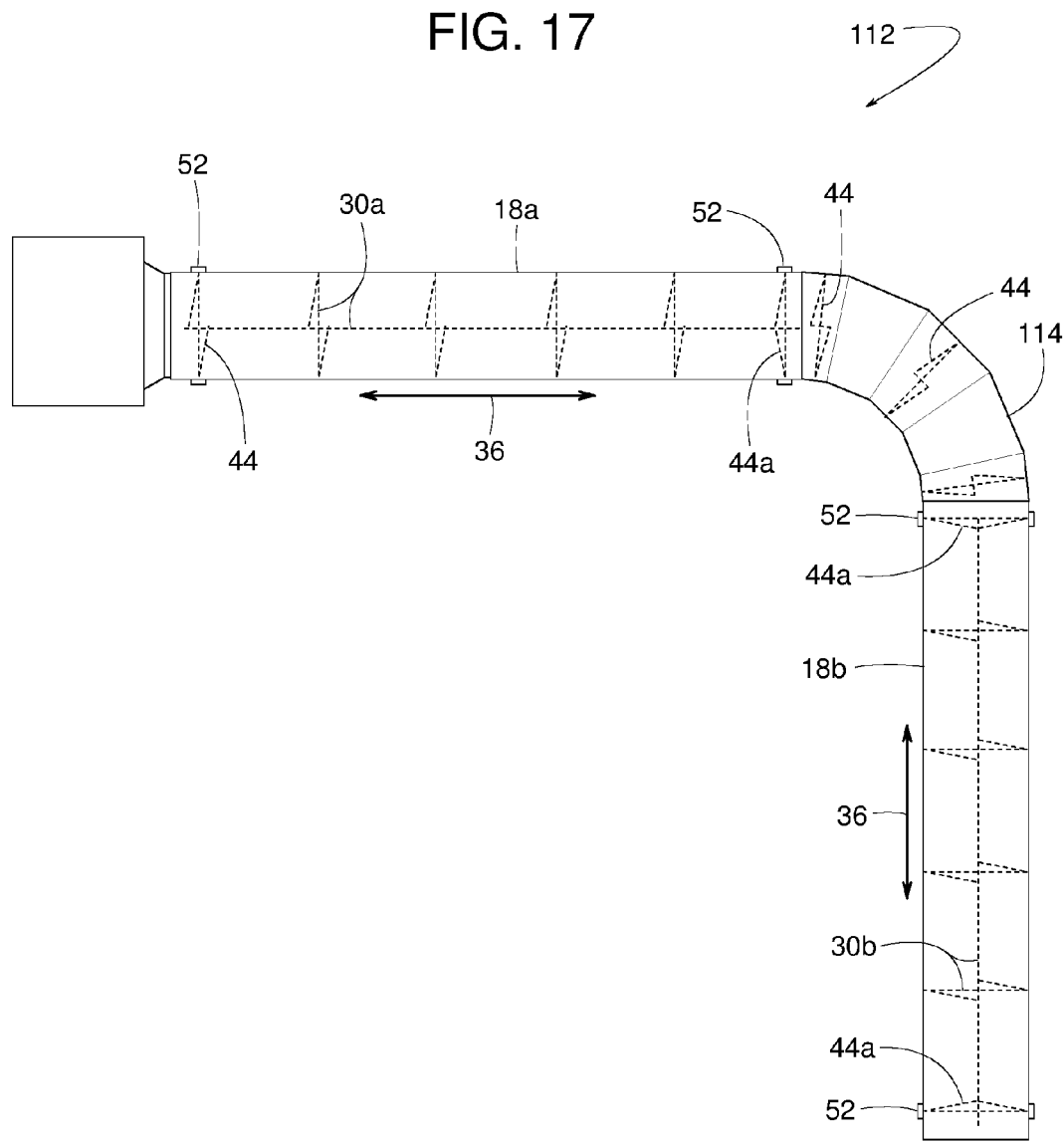
FIG. 17 is a top view of an example air duct system in an L-configuration.
Figure 18:
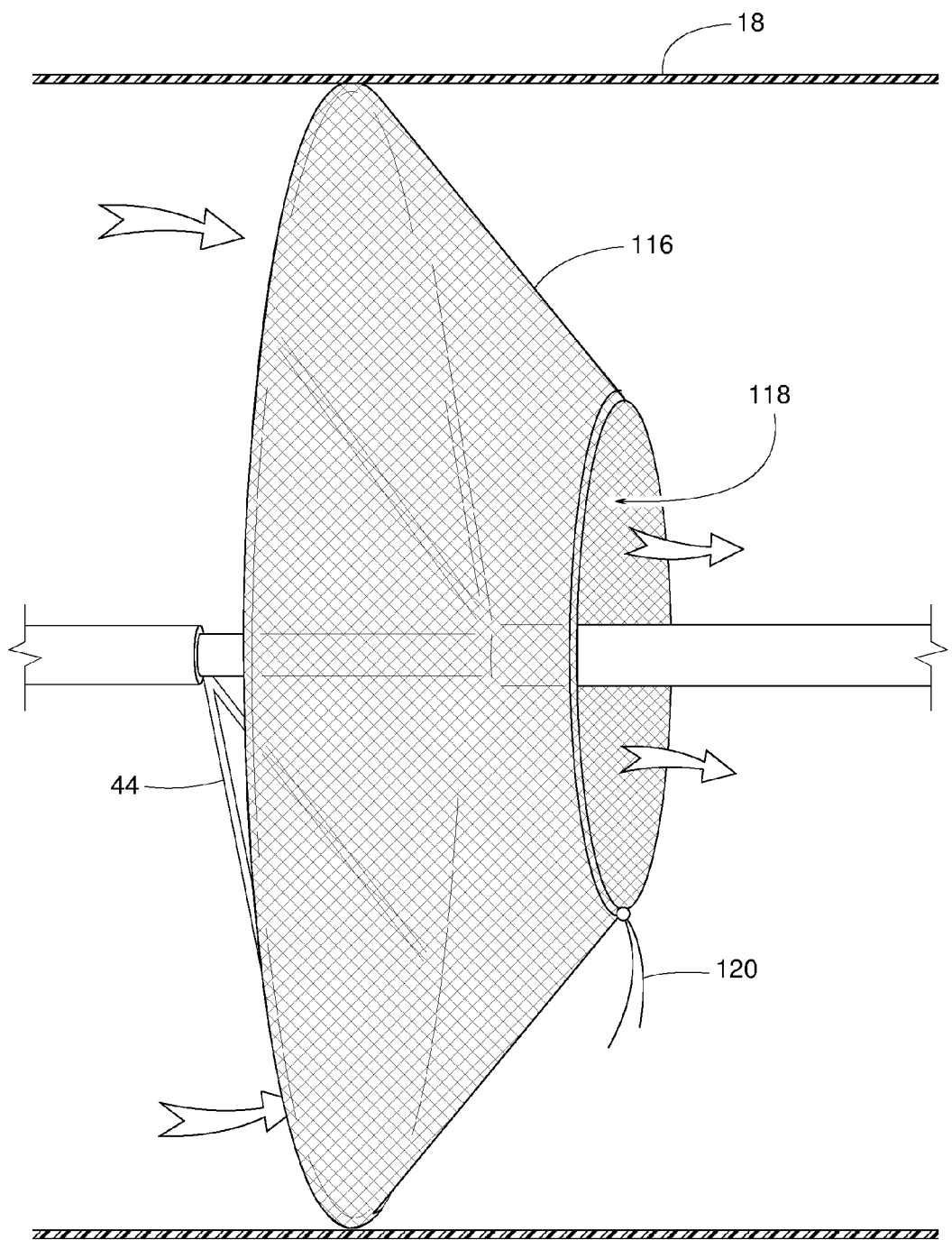
FIG. 18 is a cross-sectional perspective view of an example flow restrictor attached to an example radial support member inside a pliable air duct.
Figure 19:
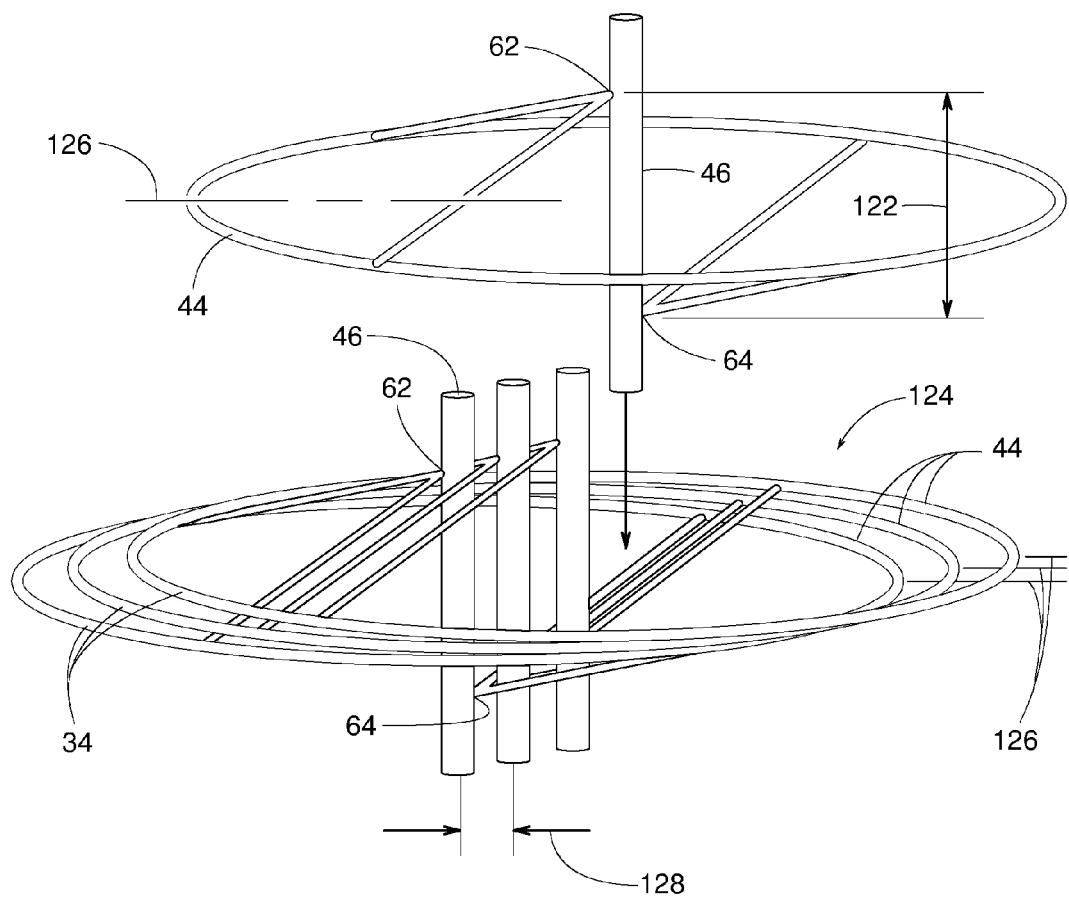
FIG. 19 is a perspective view showing the assembly of a nested stack of example radial support members.

Various additional features and benefits of the aforementioned examples are illustrated in FIGS. 17-19. FIG. 17 is a top view of an example L-shaped air duct system 112 comprising a pliable elbow duct 114 connecting two pliable air ducts 18a and 18b. To keep substantially the entire L-shaped duct appearing inflated, a first framework 30a is disposed within duct 18a to create longitudinal tension and/or tensile force 36 in that duct, wherein radial support members 44 and 44a are circumferentially clamped or otherwise held to duct 18a by any suitable means including, but not limited to, strap clamps 25. In addition or as an alternative to strap clamp 25 in some examples, a short pliable air duct segment with one or more retainers 50 holds radial support members 44 and/or 44a in place while circumferential zippers at either end of the duct segment connects the duct segment to the rest of air duct 18a.

Likewise, a second framework 30*b* is disposed within duct 18*b* to create longitudinal tension or tensile force 36 in that duct, wherein one or more radial support members 44 are circumferentially clamped to duct 18*b* by any suitable means including, but not limited to, strap clamps 205. One or more radial support members 44 are disposed within elbow 114 to keep elbow 114 appearing generally inflated. In some examples, a curved shaft interconnecting radial support members 44 within elbow 114 helps hold radial support members 44 in place. The curved shaft is not shown because not all examples of an elbow with radial support members include such a shaft.

FIG. 18 shows an example flow restrictor 116 attached to radial support member 44. Flow restrictor 116, in some examples, is a fabric cone with a reduced airflow outlet 118. In some examples, outlet 118 is a fixed opening, and in other examples the downstream opening of outlet 118 is adjustable by way of a constricting drawstring 120.

FIG. 19 shows how a plurality of radial support members 44 can be stacked in a compact transportable arrangement. Such a nested arrangement is possible due to the offset between spoke connecting points 62 and 64, wherein points 62 and 64 are longitudinally offset (dimension 122) and are on opposite sides of hub 46. In more specific terms, the example illustrated apparatus/assembly 124 comprises a plurality of ribs 34, wherein each rib 34 lies along an imaginary plane 126 to define a plurality of imaginary planes 126. Apparatus/assembly 124 also includes a hub 46 attached to each rib 34 to create a plurality of hubs 46. Rings 34 are in a transportable stacked arrangement with rings 34 lying adjacent each other so that the plurality of imaginary planes 126 are substantially parallel to each other. The plurality of hubs 46 are radially offset to each other (dimension 128), and the plurality of ribs 34 are radially offset to each other. In the illustrated example, at least one hub 46 extends through more than one imaginary plane 126.

Figure 20:
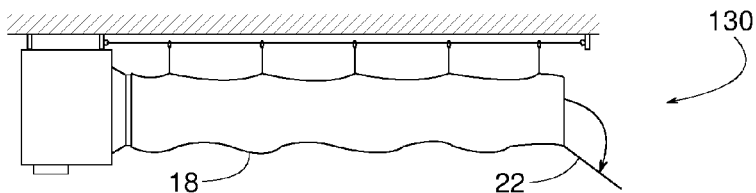
FIG. 20 is a side view of an existing pliable-wall air duct about to be retrofitted with an example framework.
Figure 22:
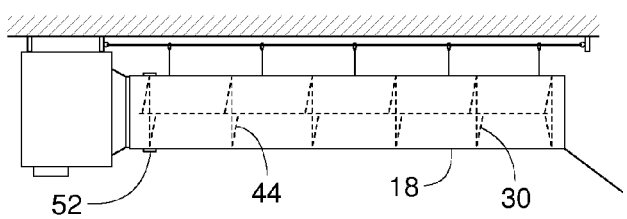
FIG. 22 is a side view similar to FIG. 20 but showing an example framework installed within the duct.
Figure 23:
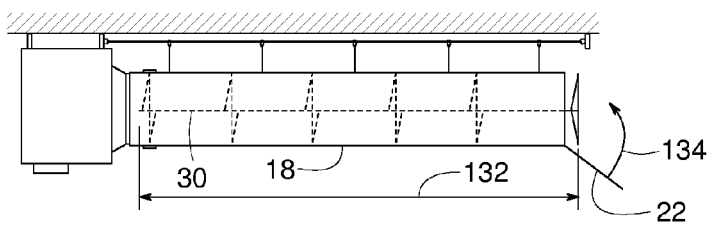
FIG. 23 is a side view similar to FIG. 22 but showing the framework being adjustably lengthened.
Figure 24:
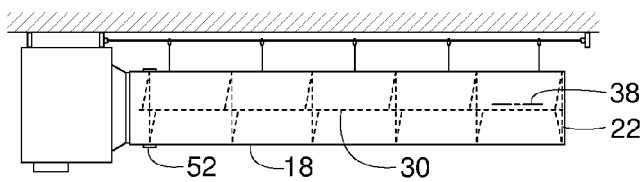
FIG. 24 is a side view similar to FIG. 20 but showing an example framework installed and axially compressed within the duct.

FIGS. 20-24 illustrate an example method for taking an existing, previously functional air duct system 130 that includes an inflatable air duct 18 and retrofitting system 130 with framework 30 or one similar to it. In some examples, the method involves accessing the interior volume of duct 18 by opening the duct at some point, for example, at the duct's end cap 22, as shown in FIG. 20. FIG. 21 shows installing framework 30 inside duct 18. In some examples, alternate styles of frameworks are installed instead, such as framework 30'. In some examples, framework 30 is assembled progressively as it is inserted in duct 18. FIG. 22 shows framework 30 inside duct 18 with example retainer 52 holding one radial support member 44 in place. FIGS. 22 and 23 show how a longitudinal length 132 of framework 30 is adjustable, where framework 30 is longer in FIG. 23 than in FIG. 22. Arrow 134 of FIG. 23 represents closing end cap 22, thereby enclosing framework 30 within the internal volume of duct 18. Forcibly enclosing framework 30 within duct 18, as shown in FIG. 24, results in compressing framework 30 and tensioning inflatable air duct 18 in longitudinal direction 38.

Figure 25:
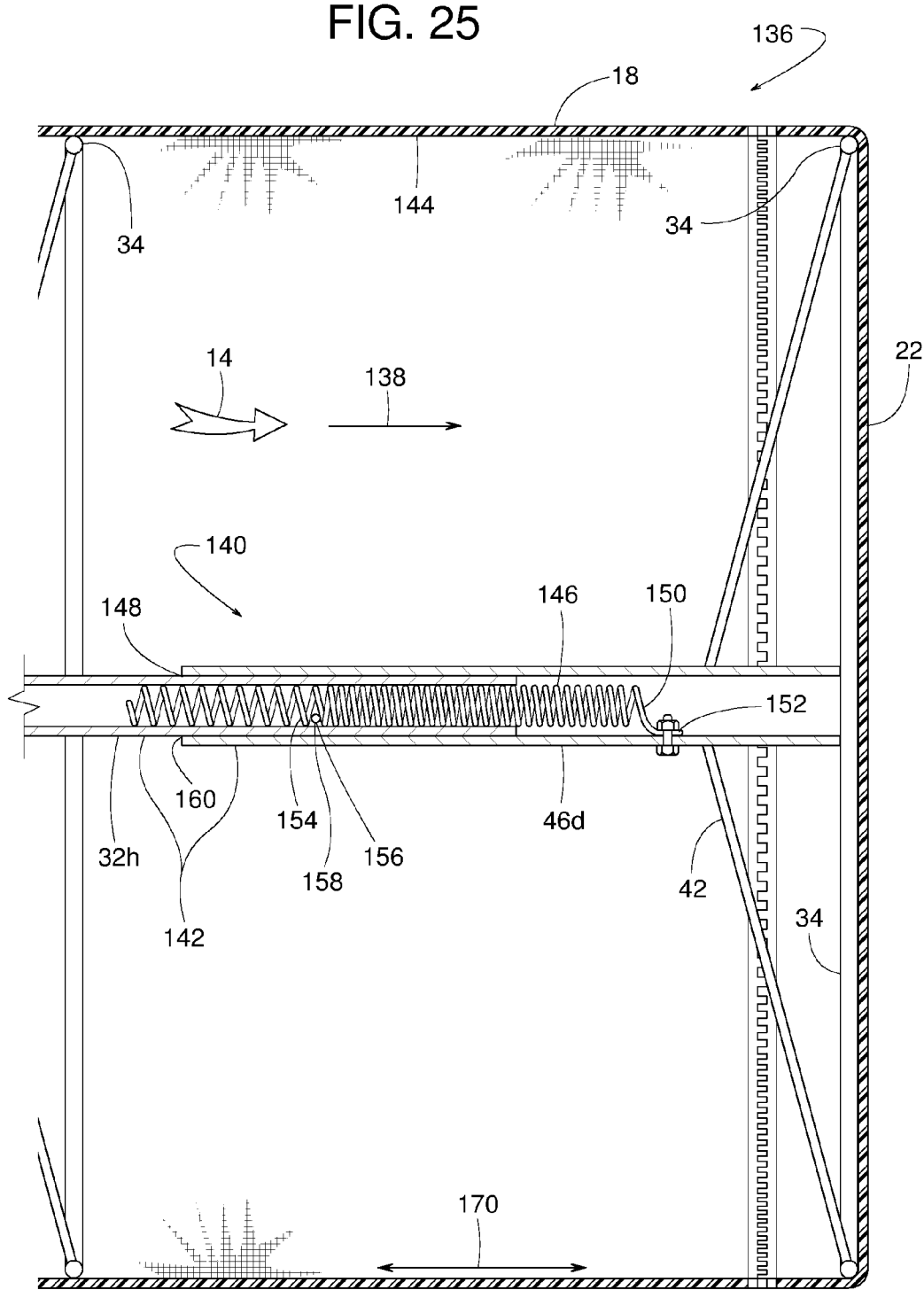
FIG. 25 is a cross-sectional side view similar to FIG. 11 but showing another example air duct system.
Figure 26:
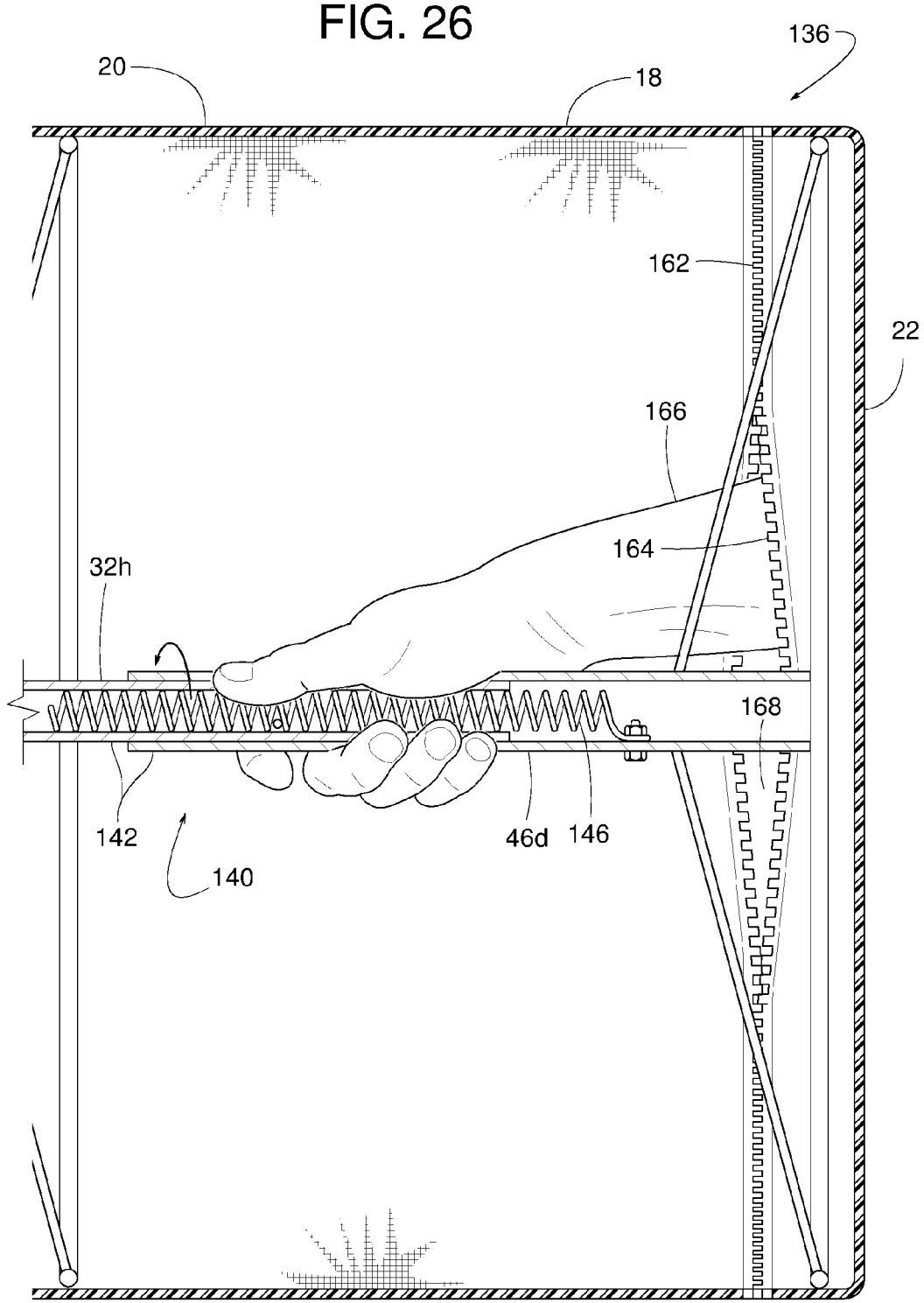
FIG. 26 is a cross-sectional side view showing the duct system of FIG. 25 being manually adjusted.

With previous air ducts having pliable tubular sidewalls and an internal framework, the sidewall material still tends to sag with the loss of internal air pressure and/or as the sidewall material stretches over time. An example of an air duct, which is able to keep continuous tension on the sidewall material, and thus maintain tautness of the duct, uses the stored compression in a spring, which supplies continuous force on the end cap in the lengthwise direction of the duct. With this example, the stored compression in the spring can be released when the duct is deflated, resulting in the lengthening of the duct. The stored compression is drawn upon due to the internal framework having a variable overall length and the spring providing the actual force to change the length. FIGS. 25 and 26 illustrate an example air duct system 136 with features that facilitate installation and ensure tautness of the system's air duct 18 even when duct 18 is deflated. In this example, air duct 18 includes tubular pliable sidewall 20 (FIG. 26) and attached end cap 22. Sidewall 20 being tubular is suitable for conveying air 14 in a longitudinal direction 138 through duct 18 and eventually releasing air 14 in a radial and/or axial direction through pores or other outlets in duct 18.

To keep sidewall 20 taut so duct 18 appears inflated when duct 18 is actually deflated (unpressurized), an example spring loaded framework 140 is installed within duct 18, as shown in FIG. 25. Framework 140, in this example, comprises a shaft 142 supporting a plurality of ribs 34. Ribs 34 engage an inner surface 144 of sidewall 20 to maintain duct 18 in a radially expanded shape. To keep sidewall taut in longitudinal direction 138, shaft 142 comprises a first shaft segment 32*h*, a second shaft segment 46*d*, a spring or biasing element 146, and a telescopic connection 148 between shaft segments 32*h* and 46*d* (e.g., first and second shaft segment examples include, but are not limited to, previously mentioned hubs 46, 46*a*, 46*b*, 46*c* and 92); wherein the various shaft components and other elements of system 136 are designed to hold duct 18 in longitudinal tension in reaction to shaft 142 being in longitudinal compression.

Lengthwise adjustment of the internal structure is provided by a pin engaging a helical spring which makes the length continuously (opposed to by discreet increments) adjustable. For instance, in some examples, spring 146 is a helical compression spring with one end 150 attached to a fixed point 152 on second shaft segment 46*d*. An intermediate section 154 of spring 146 threadingly engages a pin 156 or comparable feature at a point 158 fixed on first shaft segment 32*h*. The distance between points 152 and 158, in addition to other physical dimensions of system 136, determines the overall length of shaft 142 and/or the compression of spring 146.

To adjust shaft length and/or spring compression, a first rotational joint 160 at telescopic connection 148 enables second shaft segment 46*d* to be rotated relative to first shaft segment 32*h*. Depending on the direction of rotation, manually turning second shaft segment 46*d* relative to first shaft segment 32*h*, as shown in FIG. 26, effectively screws the two shaft segments 32*h* and 46*d* together or apart due to the two shaft segments 32*h* and 46*d* being threadingly coupled to each other by way of spring section 154 engaging pin 156. Thus, spring 146 serves as an adjustment screw for adjusting the overall length of shaft 142 when shaft 142 is unrestrained lengthwise by duct 18 (unrestrained, for example, when end cap 22 is removed or when shaft 142 is appreciably shorter than duct 18). When the length of shaft 142 is restrained by the finite length of duct 18 with end cap 22 installed, spring 146 serves as an adjustment screw for adjusting the compression of spring 146 and thus serves as a means for adjusting the longitudinal compression of shaft 142. Adjusting the longitudinal compression of shaft 142, in turn, adjusts the longitudinal tension in duct 18 accordingly.

In some examples, the adjustment of shaft 142 is carried out as follows: First, the length of framework 140 is set as shown in FIG. 26, wherein the framework's relatively short, uncompressed length allows a portion 162 of end cap 22 to be readily zipped or otherwise attached to sidewall 20. With another portion 164 of the end cap's periphery unzipped or otherwise unattached to sidewall 20, as shown in FIG. 26, a person can reach their arm 166 through the unzipped opening 168 into the duct's interior to manually rotate second shaft segment 46*d* relative to first shaft segment 32*h* so that the shaft's relaxed, uncompressed length becomes greater than the length of duct 18 and sidewall 20. However, with end cap 22 restricting the shaft's ability to fully extend to its relaxed, uncompressed length, spring 146 and shaft 142 become compressed within the confines of duct 18. Next, the person withdraws their arm 166 and closes opening 168. End cap 22 now fully attached to sidewall 20 holds spring 146 and shaft 142 in compression. Shaft 142 being compressed subjects sidewall 20 to longitudinal tension 170, as shown in FIG. 25.

Figure 27:
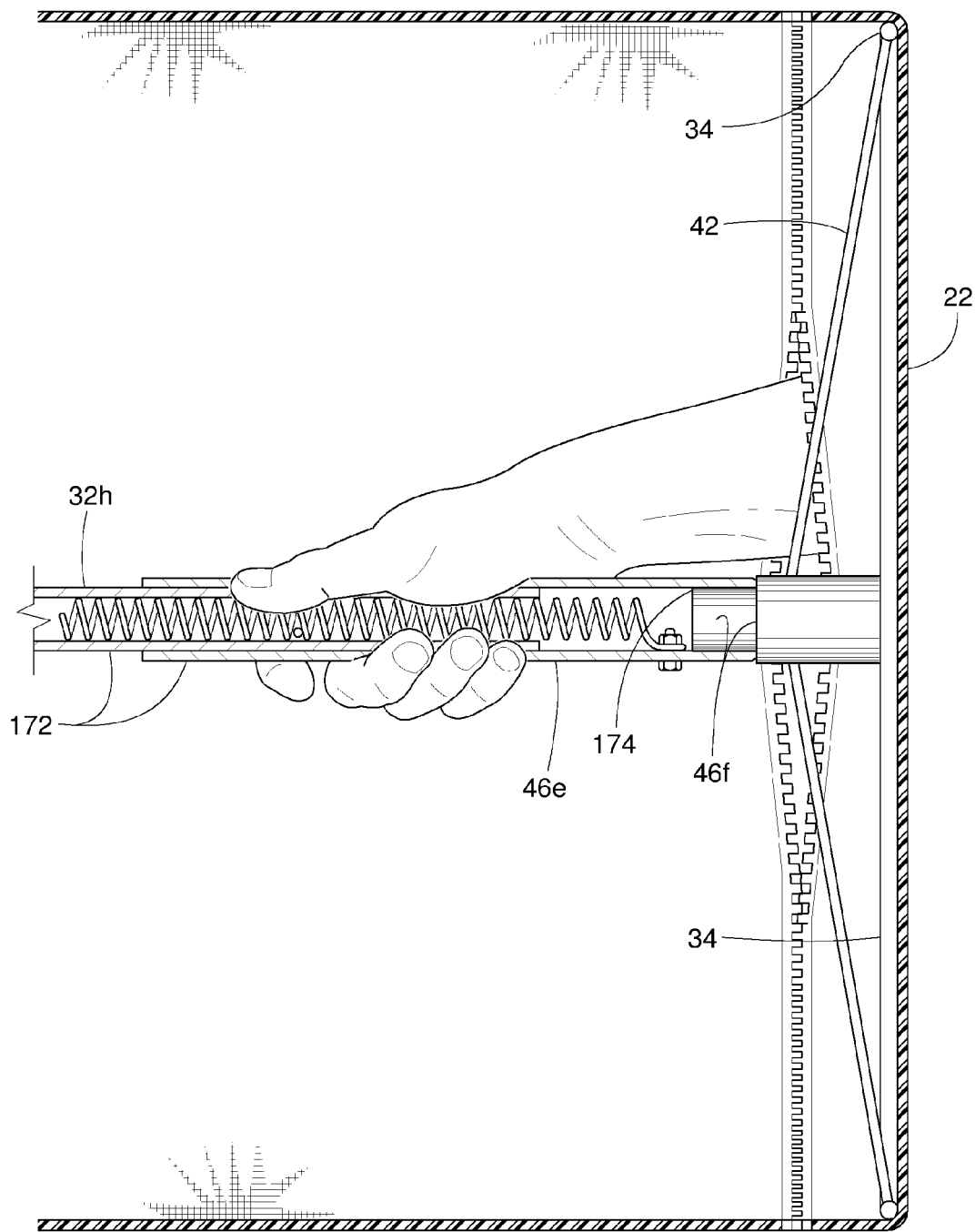
FIG. 27 is a cross-sectional side view similar to FIG. 26 but showing another example duct system being manually adjusted.

To make it easier to manually rotate second shaft segment 46*d* relative to first shaft segment 32*h* without rib 34 tending to rotate end cap 22 in the process, some example shafts, such as shaft 172 of FIG. 27, includes a second rotatable joint 174 between a second shaft segment 46*e* and a hub 46*f* that renders second shaft segment 46*e* further rotatable relative to end cap 22.

Figure 28:
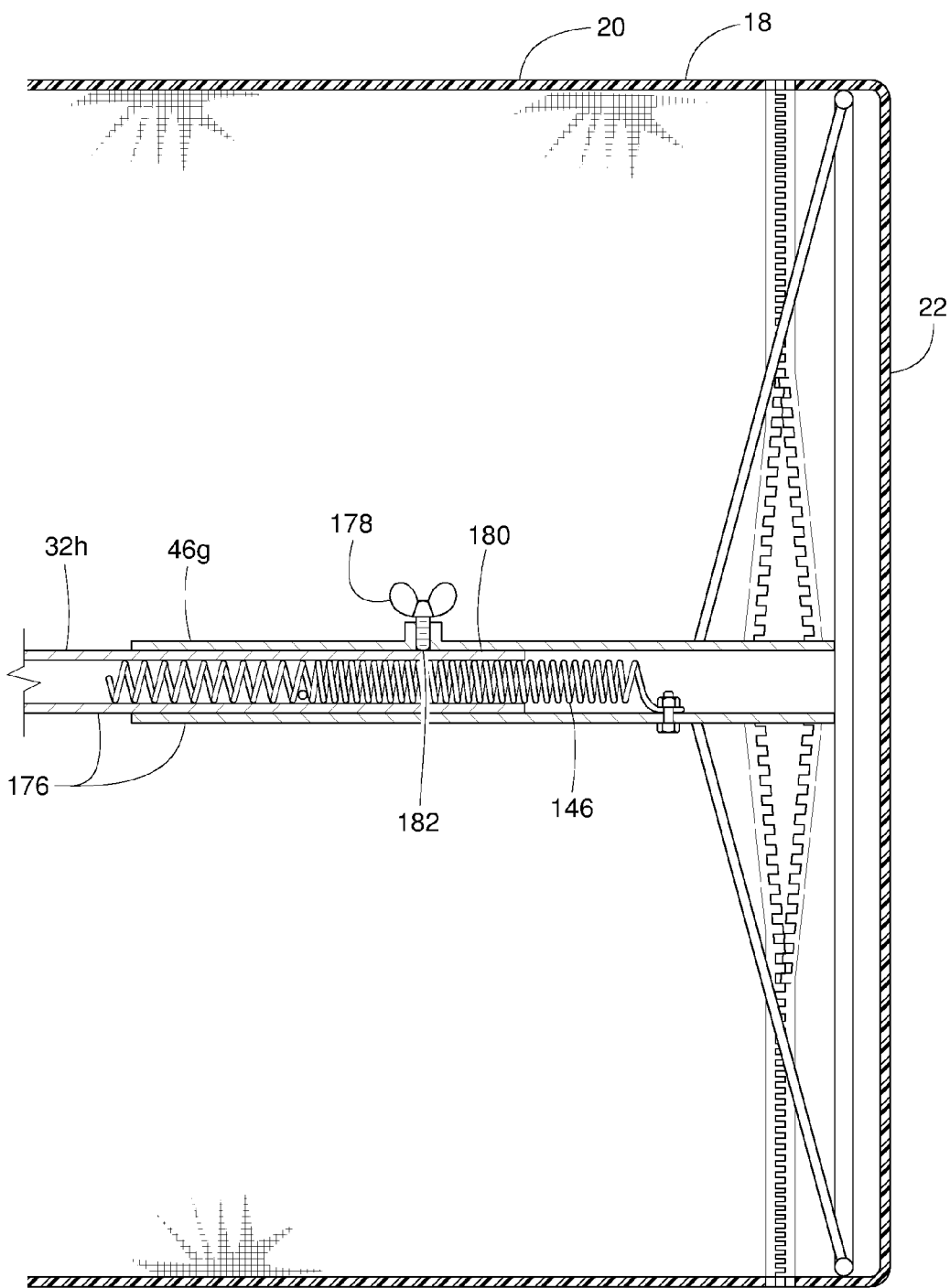
FIG. 28 is a cross-sectional side view similar to FIG. 26 but showing another example duct system.
Figure 29:
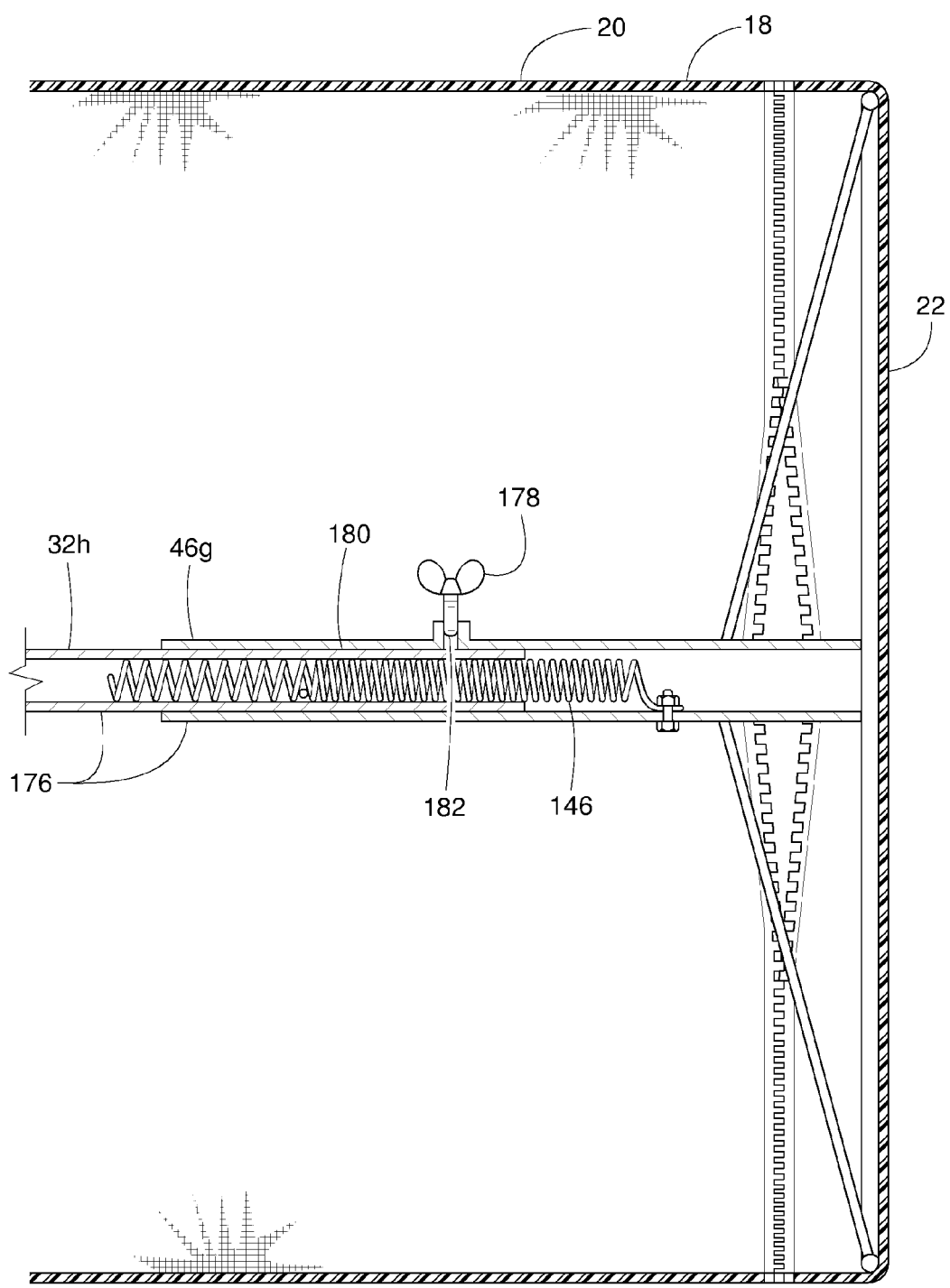
FIG. 29 is a cross-sectional side view showing the duct system of FIG. 28 after being adjusted.

In some examples, as shown in FIGS. 28 and 29, a shaft 176 includes a releasable lock 178 at telescopic connection 180. The function of the releasable lock is to temporarily store some of the adjustable length/spring compression and release it only when the end cap is in place to react to the force. Releasable lock 178 can make it easier to close the connection between sidewall 20 and end cap 22 while spring 146 and shaft 176 are under compression. For instance, lock 178 in its holding position of FIG. 28 holds shaft 176 at a retracted length that easily fits within duct 18. Just before completely closing the closure between end cap 22 and sidewall 20, a person can reach into duct 18 to move lock 178 to its release position of FIG. 29. This allows spring 146 to extend shaft 176 to the length shown in FIG. 29, whereby spring 146 still under some compression provides the axial force to place sidewall 20 in longitudinal tension. After releasing lock 178, the person can complete the closure between end cap 22 and sidewall 20.

Although the actual structure of lock 178 may vary, in some examples, lock 178 is a thumb screw threadingly engaging a second shaft segment 46*g* with an axial end 182 selectively abutting first shaft segment 32*h*. In the holding position, axial end 182 presses firmly against first shaft segment 32*h* to hold segment 32*h* fixed relative to second shaft segment 46*g*. In the release position, axial end 182 is spaced apart from first shaft segment 32*h* to permit relative movement between shaft segments 32*h* and 46*g*.

Figure 30:
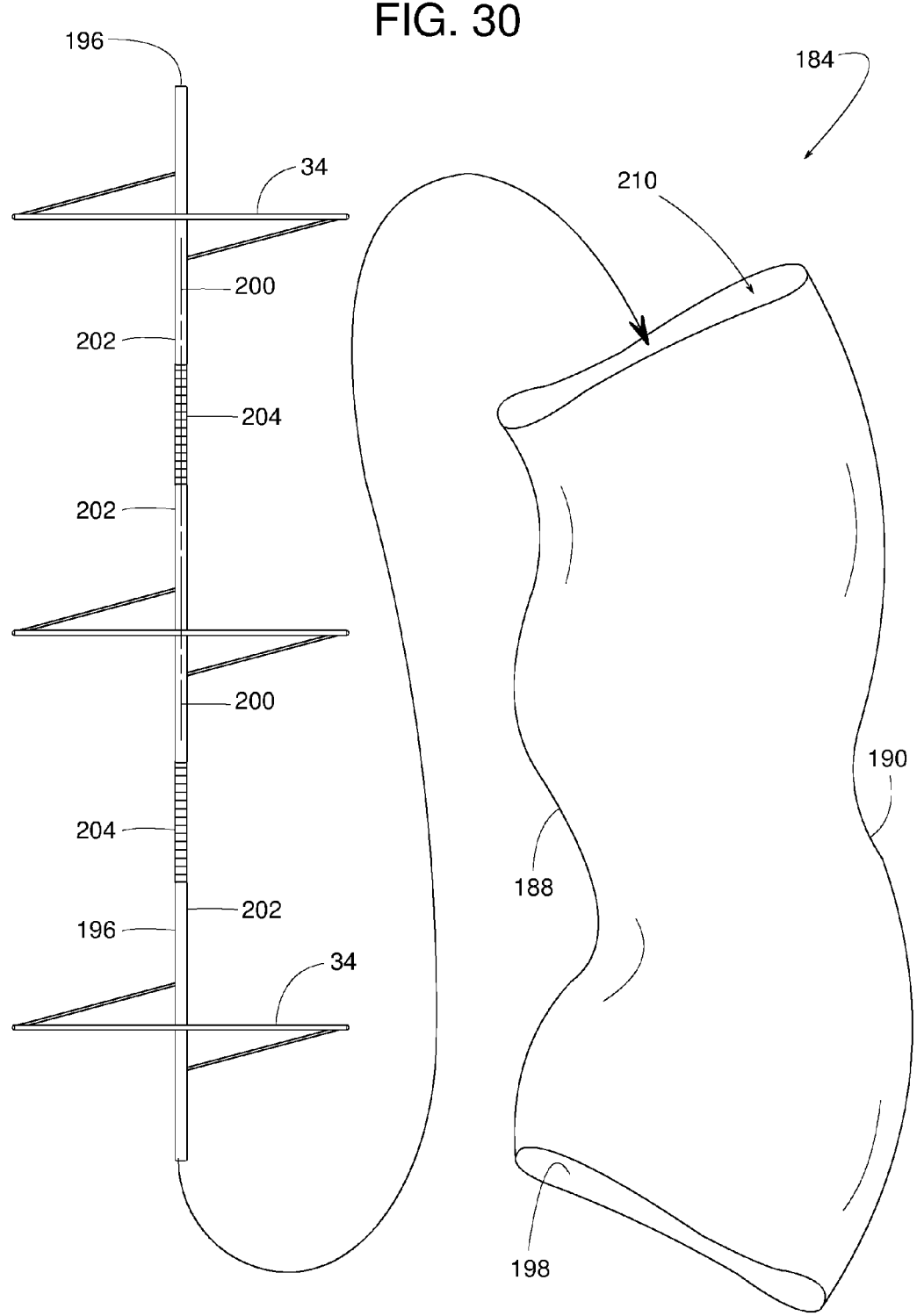
FIG. 30 is a side view of an example air duct system with an example shaft in a removed configuration.
Figure 31:
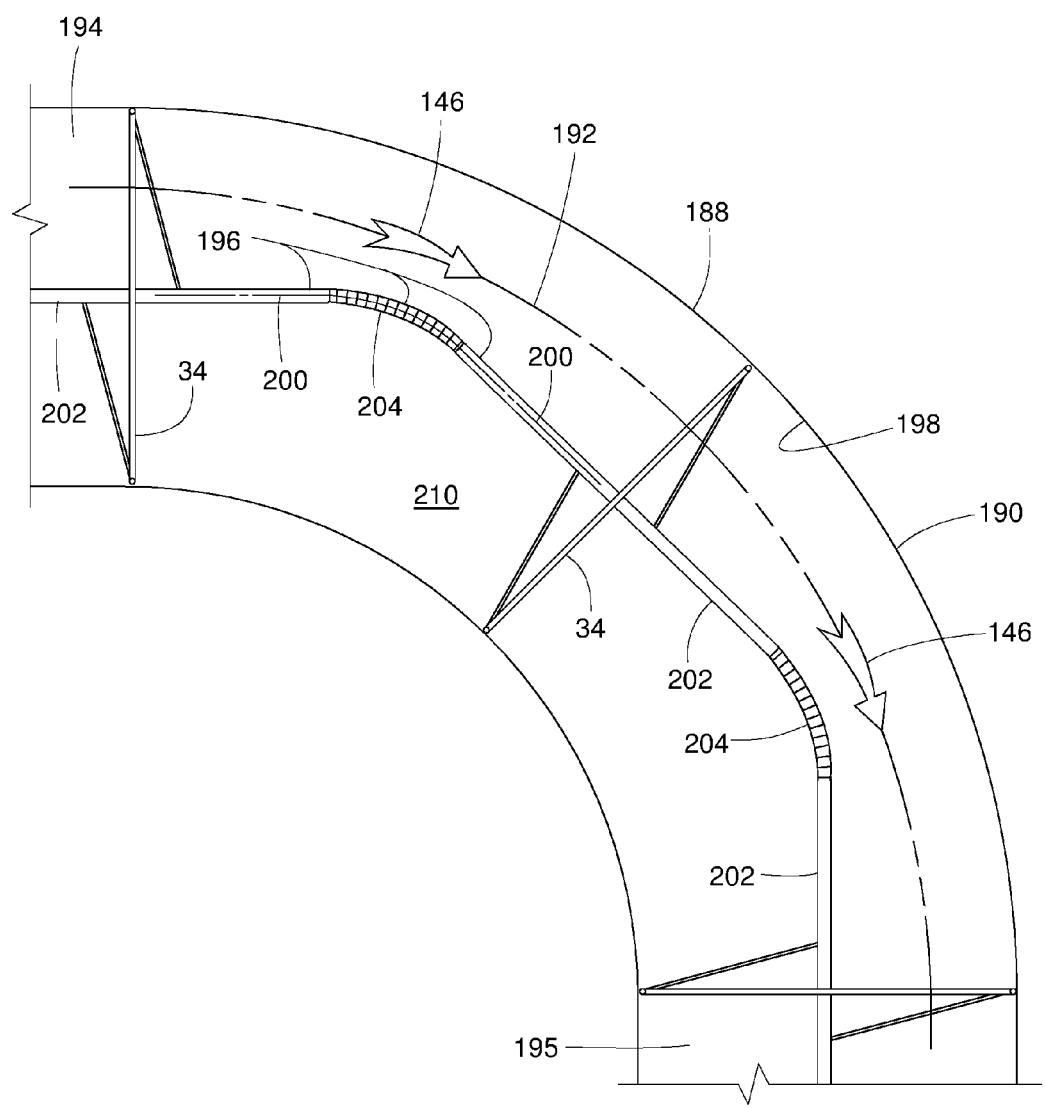
FIG. 31 is a cross-sectional side view of the duct system of FIG. 30 but showing the shaft in its installed configuration.

In some examples, as shown in FIGS. 30 and 31, an air duct system 184 includes a novel elbow particularly suited for redirecting a current of air 146 through a tubular pliable sidewall 188 of an air duct 190. In FIG. 31, air duct 190 defines a nonlinear airflow path 192 from an inlet 194 to an outlet 195 of duct 190. To hold air duct 190 in a radially expanded shape, the illustrated example includes a plurality of ribs 34 supported by a shaft 196 that is selectively configurable to a removed configuration and an installed configuration.

In the removed configuration, shaft 196 is removed out from within duct 190 and has a first shape that in some examples is relatively or somewhat straight (e.g., straighter than a 90-degree elbow), as shown in FIG. 30. In the installed configuration, shaft 196 is installed within duct 190 with ribs 134 engaging an inner surface 198 of sidewall 188, as shown in FIG. 31. In the installed configuration, shown in FIG. 31, shaft 196 has a second shape that is distinguishable from its first shape shown in FIG. 30. In the illustrated example, shaft 196 has a longitudinal centerline 200 that is straighter in FIG. 30 than in FIG. 31. In FIG. 31, centerline 200 lies along a nonlinear line. FIG. 30 shows centerline 200 lying along a substantially linear line or at least along a line that deviates from the nonlinear line shown in FIG. 31. The variable shape of shaft 196 can be beneficial in the installation, shipping, and/or manufacturing of shaft 196. The variable shape of shaft 196 can also be useful in fitting shaft 196 to duct elbows of various shapes.

Figure 32:
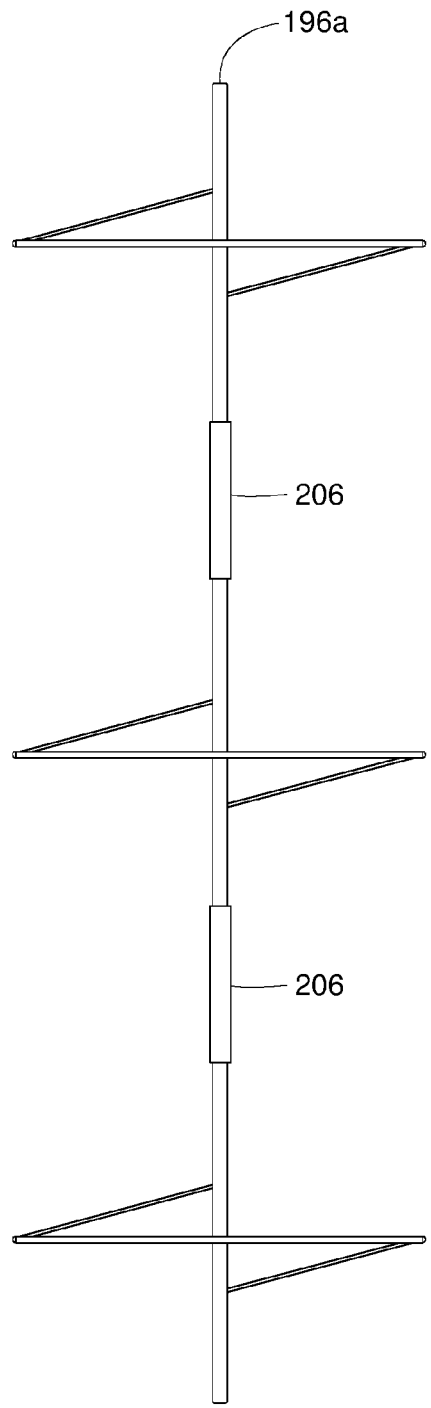
FIG. 32 is a side view of an example shaft for an air duct system.
Figure 33:
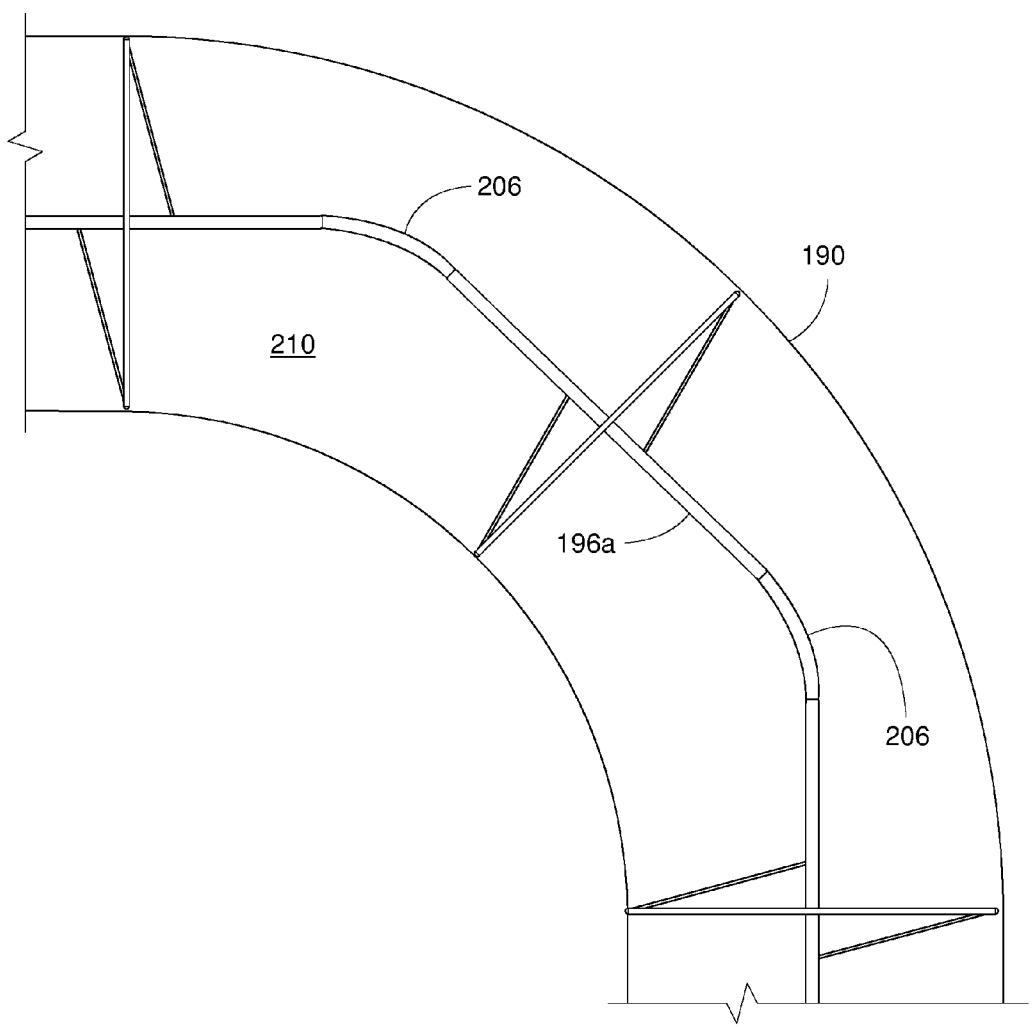
FIG. 33 is a cross-sectional side view of the shaft of FIG. 32 but showing the shaft in an installed configuration.
Figure 34:
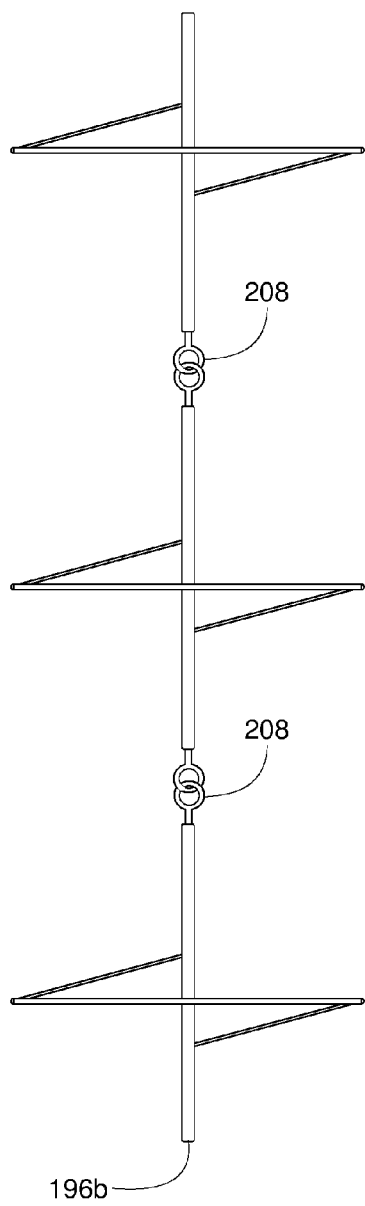
FIG. 34 is a side view of another example shaft for an air duct system.
Figure 35:
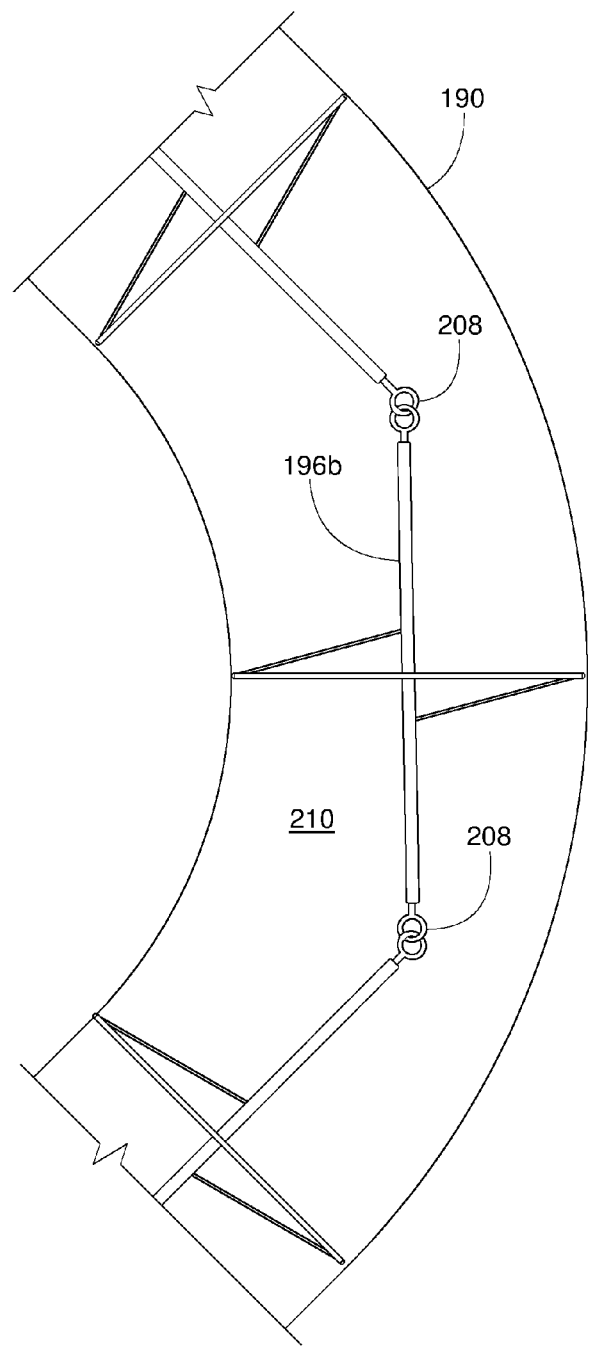
FIG. 35 is a cross-sectional side view of the shaft of FIG. 34 but showing the shaft in an installed configuration.

In some examples, the variable shape of shaft 196 is achieved by having shaft 196 be comprised of a plurality of shaft segments 202 interconnected by at least one articulation joint 204, wherein joint 204 renders the plurality of shaft segments 202 angularly movable relative to each other when shaft 196 is in the removed configuration. In some examples, articulation joint 204 is a helical spring that is more flexible than the plurality of shaft segments 202. In other examples, as shown in FIGS. 32 and 33, an example articulation joint 206 is a tube made of a resiliently bendable polymer (e.g., rubber, polyurethane, etc.). In still other examples, as shown in FIGS. 34 and 35, an example articulation joint 208 is a pivotal link such as, for example, two interconnected eyelets (e.g., two interconnected eyebolts or disconnectable clasp).

In the examples shown in FIGS. 30-35, air duct 190 is selectively inflated and deflated. Air duct 190 has an internal deflated volume 210 that when air duct 190 is deflated, the internal deflated volume is greater when shaft 196, 196*a* or 196*b* is in the installed configuration (FIGS. 31, 33 and 35, respectively) than when the shaft is in the removed configuration.

Figure 36:
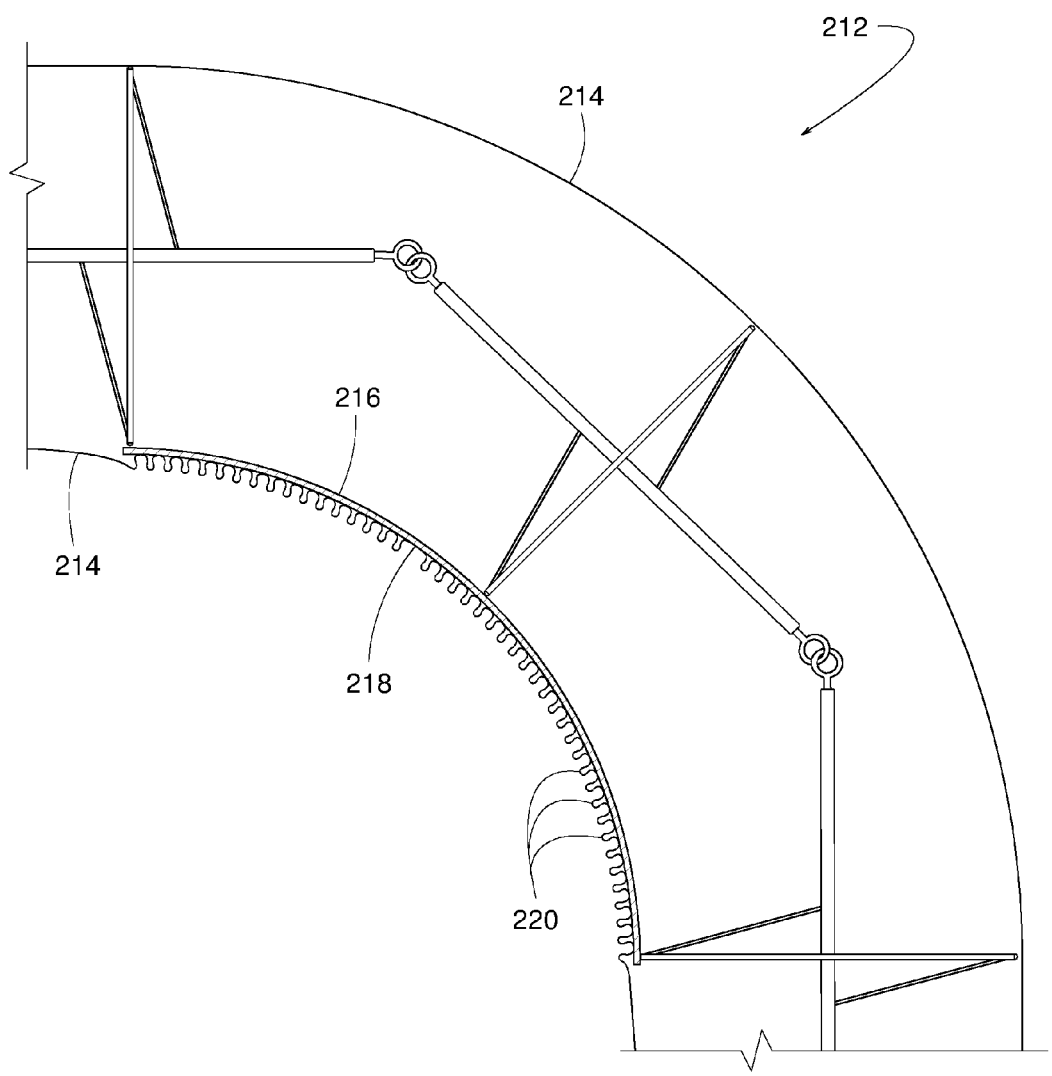
FIG. 36 is a cross-sectional side view similar to FIG. 35 but showing an example duct system with an alternate tubular sidewall.

In some examples, as shown in FIG. 36, an air duct 212 in the shape of an elbow has a tubular pliable sidewall 214 with at least some elastic material 216 that helps control the puckering of sidewall 214 to evenly distribute a plurality of wrinkles or puckers 220. In some examples, material 216 is an elastic strip intermittently sewn or otherwise attached to an inner radius 218 of tubular sidewall 214. In other examples, most if not all of sidewall 214 is comprised of elastic material.

With previous air ducts having pliable tubular sidewalls and an internal framework which could be adjustable in the lengthwise direction, the adjustment could only be made in discreet increments. Also, adjusting the length of the internal framework of the previous duct, to achieve adequate tension of the sidewall was difficult, do the relatively high tension forces required. In an example of an air duct having adjustable length internal framework, a linear clutch device not only provides for continuous (non-discreet) length adjustment, it also utilizes mechanical advantage to achieve the required tension in the sidewall. In this example, the sidewall material can be pre-stressed taut enough so that it does not sag even when deflated. In some examples, as shown in FIGS. 37-45, an air duct system 222 includes an example shaft assembly 224 with an example linear clutch 226 for holding air duct 18 in tension 228 (FIG. 39) longitudinally in response to shaft assembly 224 being in longitudinal compression 230. The term, "linear clutch" means any mechanism that has at least one configuration in which the mechanism facilitates longitudinal extension of an elongate assembly (e.g., shaft assembly 224) while resisting longitudinal retraction of the elongate assembly. Examples of linear clutch 226 and other linear clutches include, but are not limited to, a Lever Action Cargo Bar, P/N-08907, provided by Erickson Manufacturing LTD. of Marine City, Mich.; a Pro Grip Cargo Control Cargo Bar, P/N 900912, provided by USA Products Group, Inc. of Lodi, Calif.; a Ratcheting Cargo Bar, P/N 05059 (U.S. Pat. No. 5,443,342), provided by Keeper Corp. (Hampton Products International) of North Windham, Conn.; a Haul-Master 2-in-1 Support Cargo Bar, P/N 66172, provided by various distributors (e.g., Harbor Freight of Camarillo, Calif.; Amazon.com, Inc. of Seattle, Wash.; and Sears Holdings Corp. of Hoffman Estates, Ill.).

Figure 37:
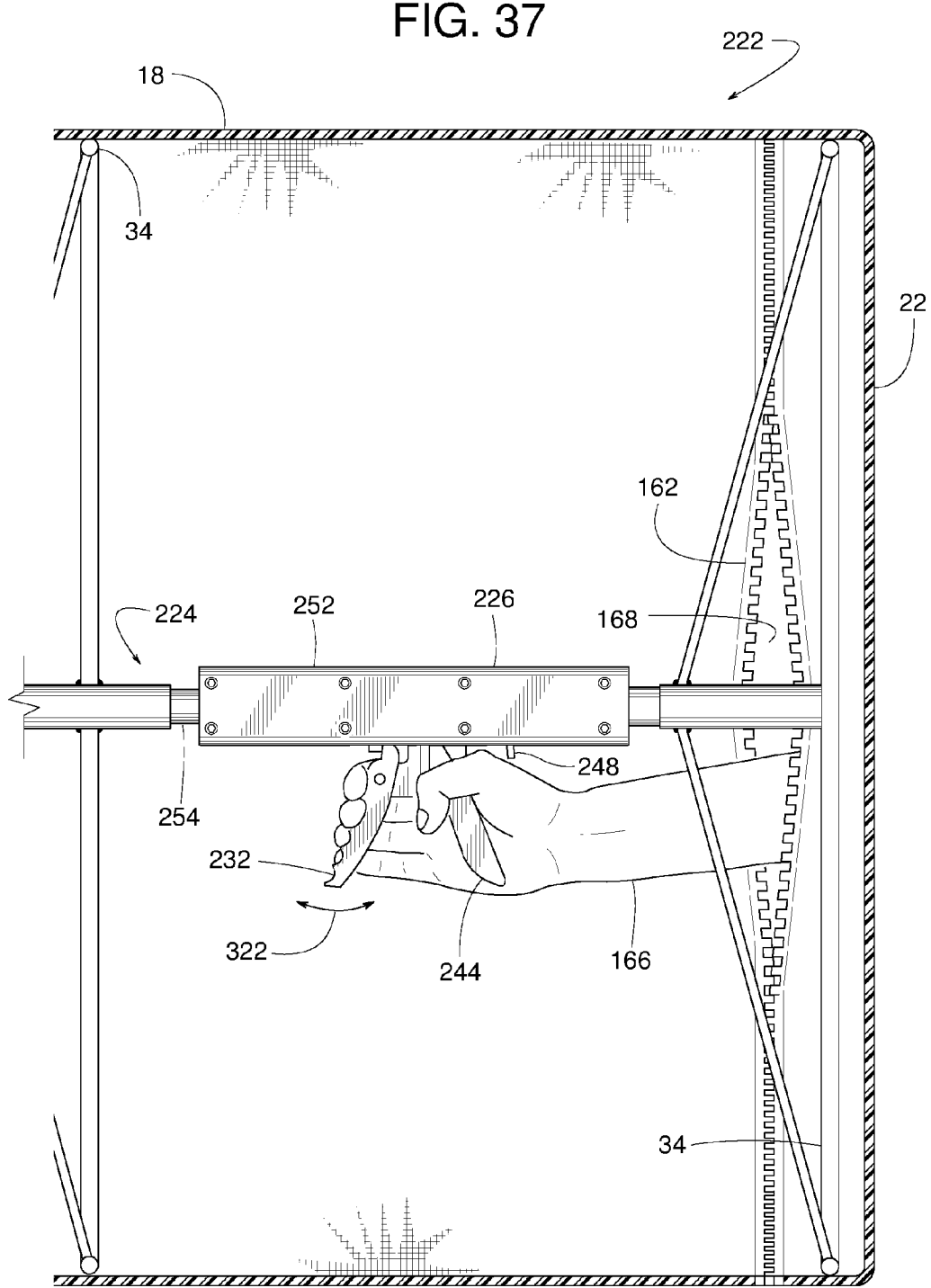
FIG. 37 is a cross-sectional side view showing an example air duct system with an example linear clutch.
Figure 38:
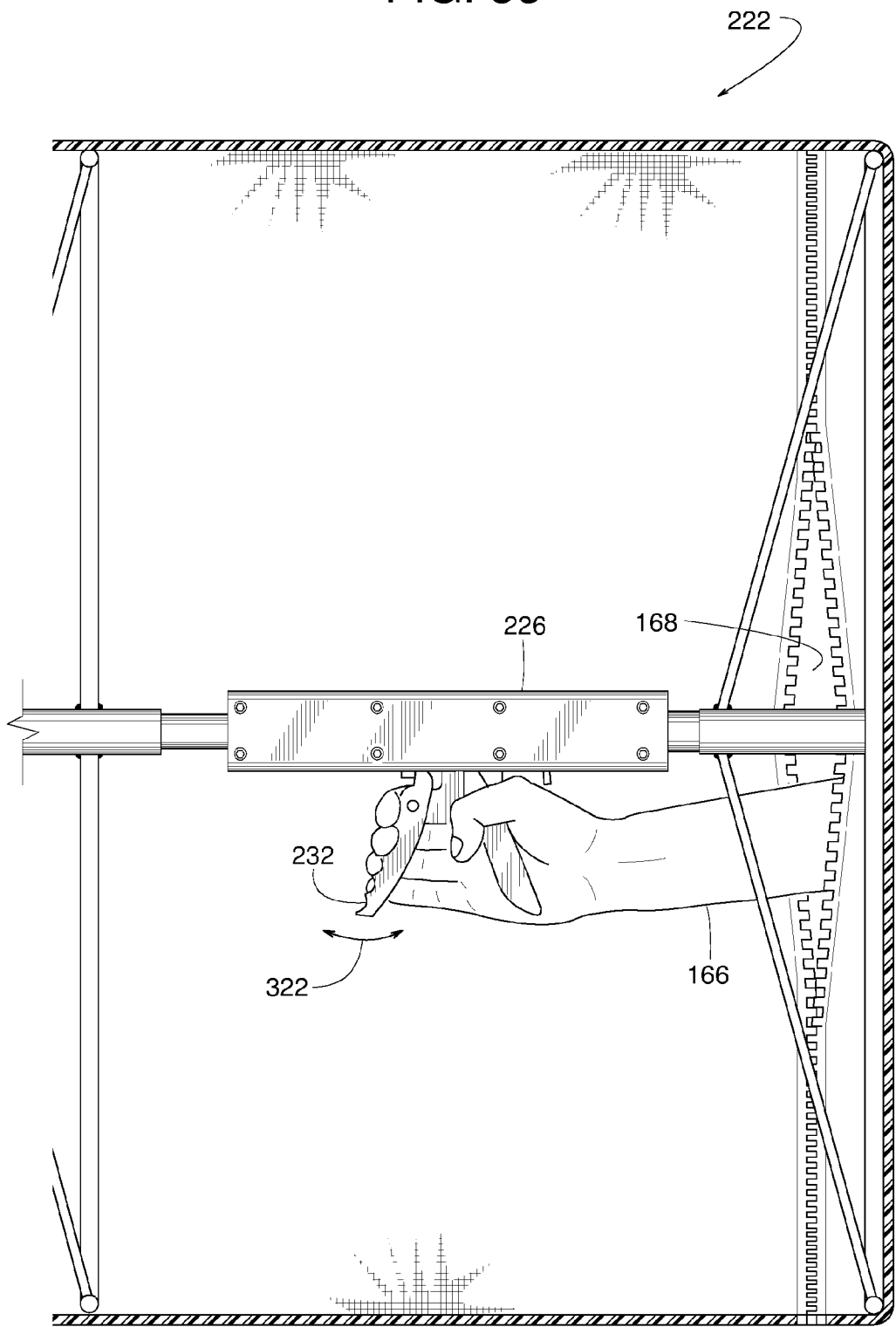
FIG. 38 is a cross-sectional side view similar to FIG. 37 but showing the linear clutch being used in lengthening an example shaft assembly.
Figure 42:
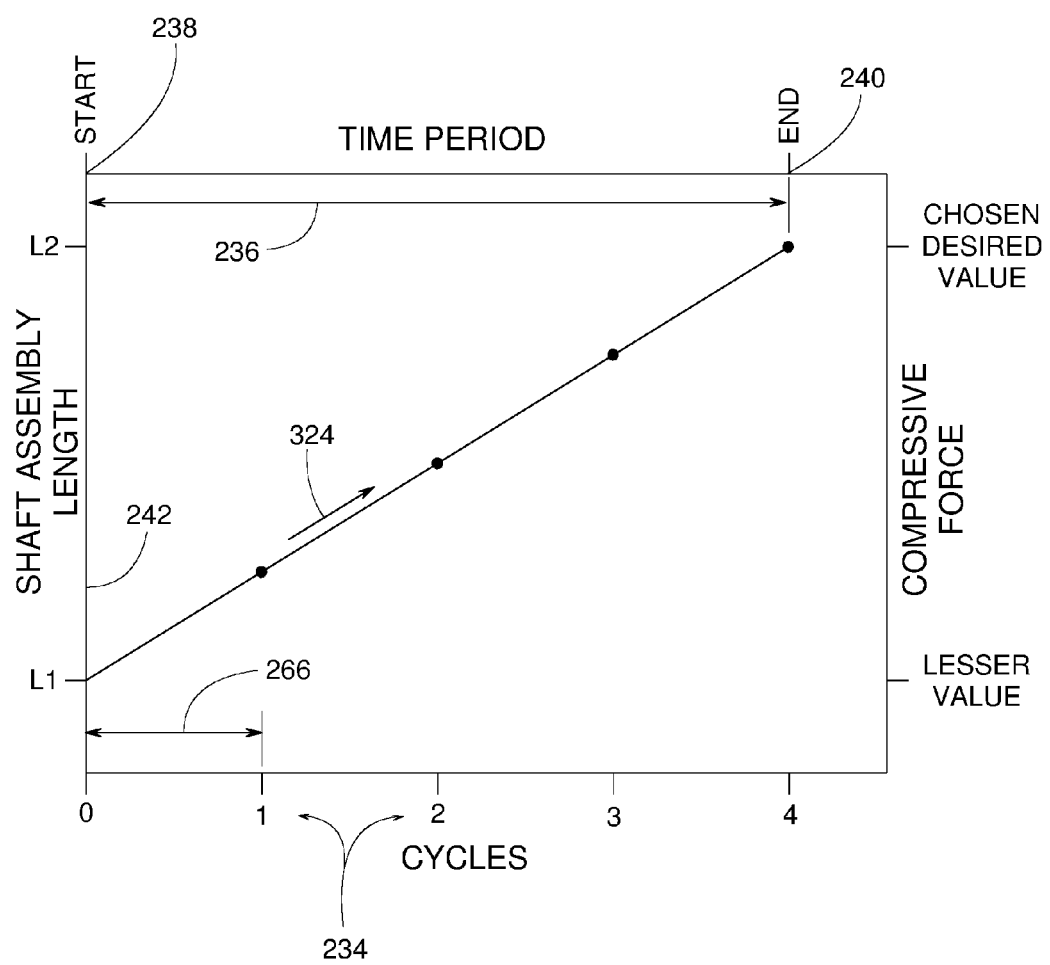
FIG. 42 is a graph showing various aspects of the air duct system illustrated in FIGS. 37-41.

In the illustrated example, to extend shaft assembly 224 from its length of FIG. 37 to that of FIG. 38, a person reaches their arm 166 through opening 168 to repeatedly move or cycle a reciprocator 232 extending from linear clutch 226. The term, "reciprocator" means any member that is operated by repeated back and forth movement. Repeatedly moving reciprocator 232 between its relaxed position (FIG. 43) and its stressed position (FIG. 44) and doing so for a plurality of cycles 234 (FIG. 42) during a given period 236 extending between a start 238 and an end 240, lengthens shaft assembly 224. Thus, an adjustable length 242 of shaft assembly 224 is longer at the period's end 240 than at the period's start 238, and length 242 increases incrementally with each cycle, as shown in the example of FIG. 42.

Figure 39:
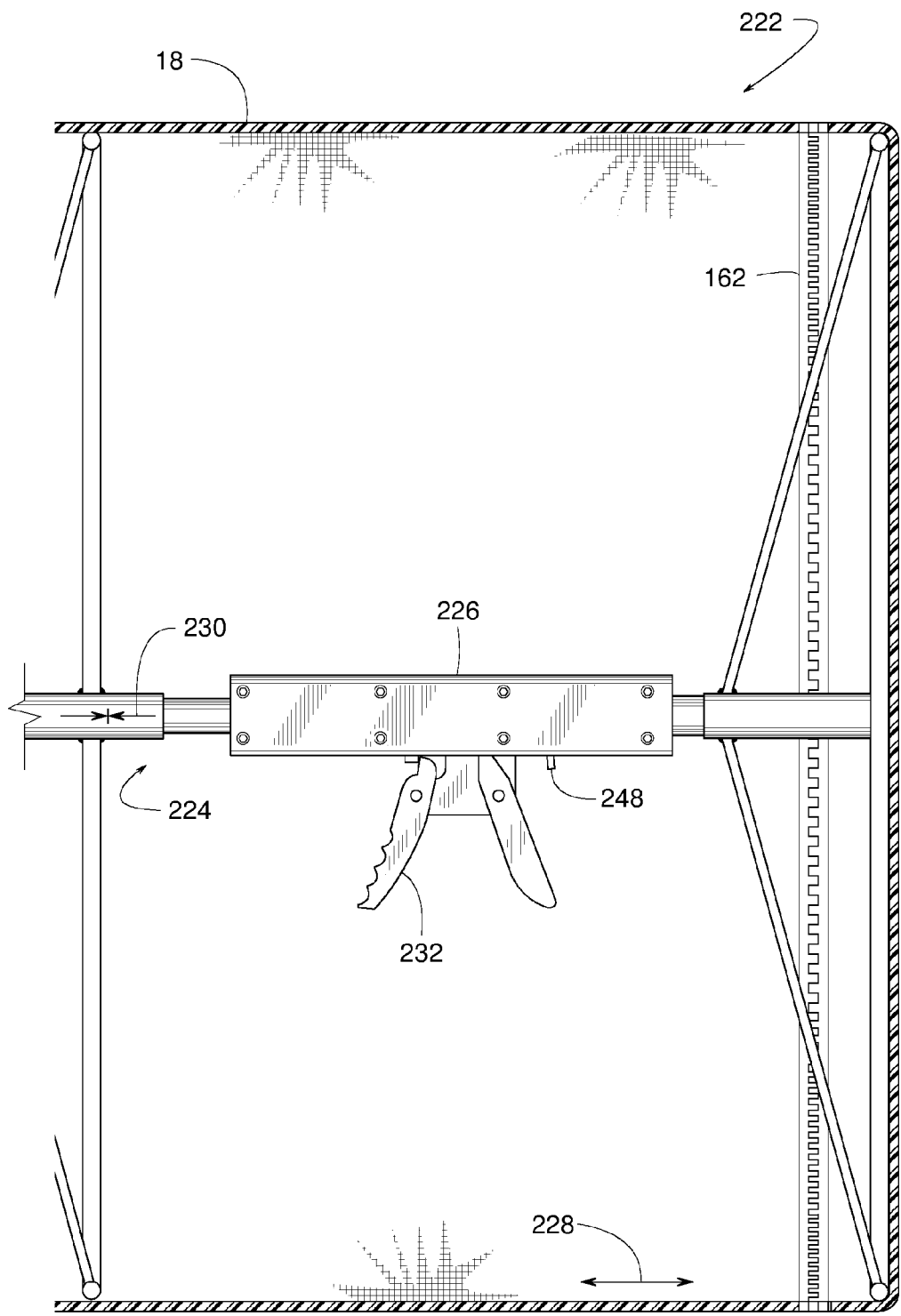
FIG. 39 is a cross-sectional side view similar to FIG. 38 but showing the linear clutch having lengthened the shaft assembly.
Figure 40:
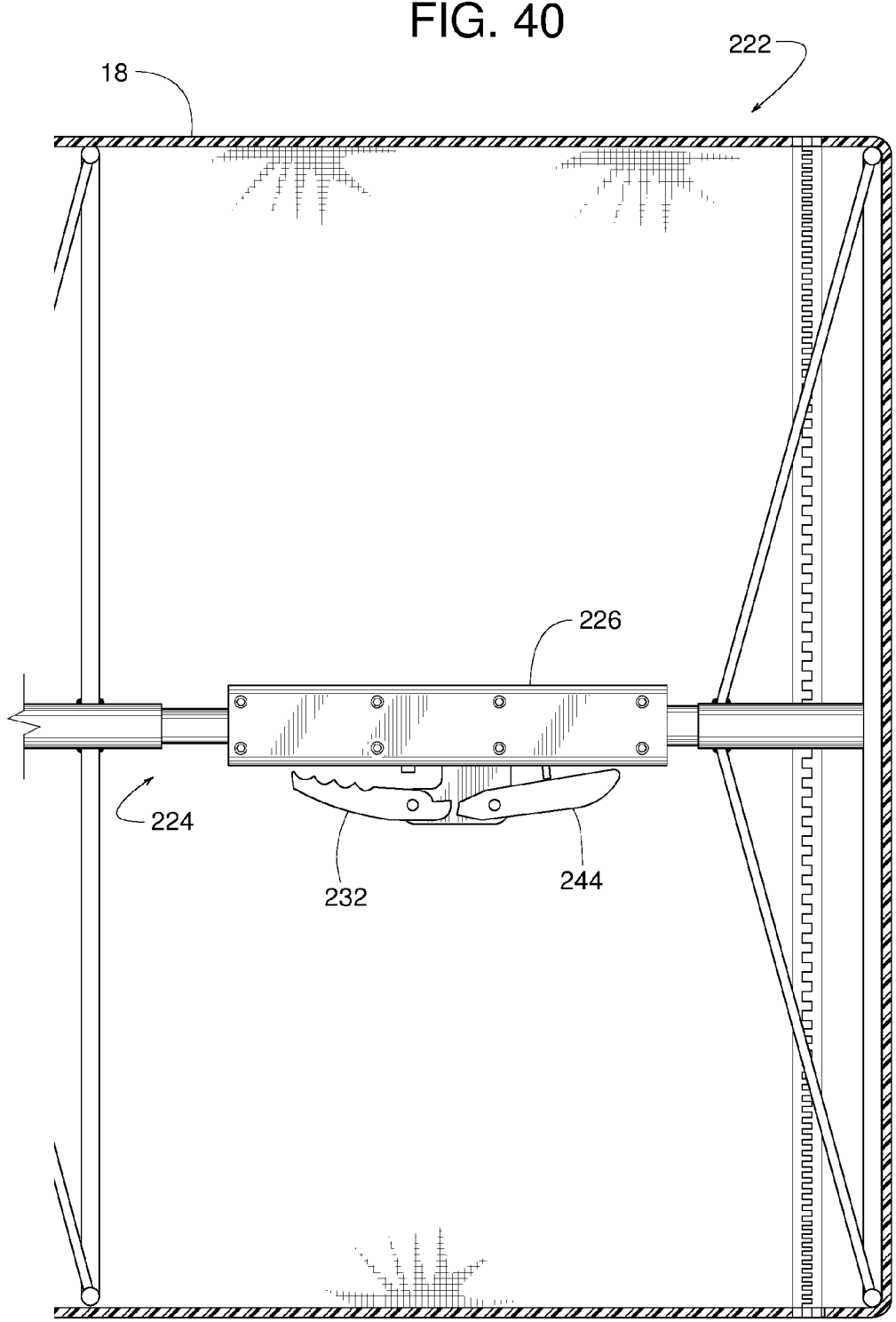
FIG. 40 is a cross-sectional side view similar to FIG. 39 but showing the linear clutch configured in a more airstream shape.
Figure 41:
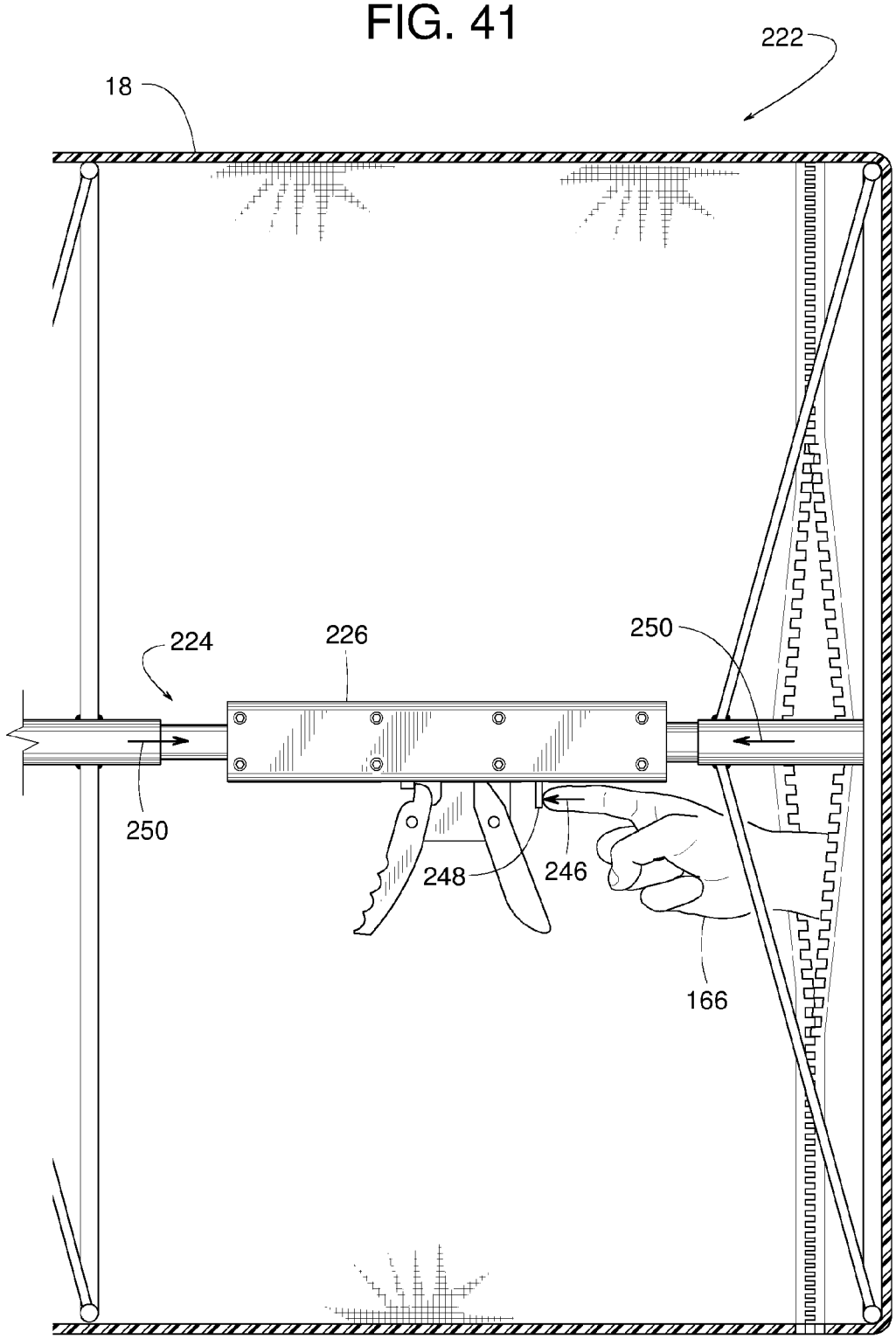
FIG. 41 is a cross-sectional view similar to FIG. 38 but showing the linear clutch releasing the compression in the shaft assembly.

Once linear clutch 226 extends shaft assembly 224 to a desired length that places air duct 18 in tension and shaft assembly in compression, zipper 162 is closed, as shown in FIG. 39, and air duct system 222 is ready for use. To minimize airflow resistance in duct 18, in some examples, reciprocator 232 and a handle 244 are moved to a stored position, as shown in FIG. 40. If, for any reason, one wants to relieve the air duct's tension and the shaft assembly's compression by shorting shaft assembly 224, a person can reach arm 166 into duct 18, as shown in FIG. 41, and actuate 246 a release lever 248 that allows linear clutch 226 to retract 250 shaft assembly 224.

Although the actual design and operation of linear clutch 226 may vary, FIGS. 43-45 illustrate one example, wherein linear clutch 226 is selectively moveable to a hold configuration (FIG. 43) and a release configuration (FIG. 45). FIG. 44 shows linear clutch 226 in another hold configuration but with linear clutch 226 having incrementally lengthened shaft assembly 234. In this illustrated example, linear clutch 226 comprises a housing 252, handle 244 attached to housing 252, reciprocator 232 pinned to housing 252, a shaft segment 254 slidingly disposed within housing 252, a first annular binding member 256 encircling shaft segment 254, a second annular binding member 258 encircling shaft segment 254, release lever 248 integrally extending from second annular binding member 258, a first compression spring 260 urging first annular binding member 256 to its free position (shown in FIGS. 43 and 45), and a second compression spring 262 urging second annular binding member 258 to its grip position (shown in FIG. 43).

In this example, pivotally moving reciprocator 232 from its relaxed position (FIG. 43) to its stressed position (FIG. 44) tilts first annular binding member 256 from its free position (FIG. 43) to its grip position (FIG. 44) such that first annular binding member 256 grips shaft segment 254. While first annular binding member 256 grips shaft segment 254, moving reciprocator 232 from its relaxed position (FIG. 43) to its stressed position (FIG. 44) pushes first annular binding member 256 and shaft segment 254 to the left 264 one increment 266 (FIGS. 42 and 44), thereby extending shaft assembly 224. Second annular binding member 258 allows such movement because as shaft segment 254 moves leftward, axial friction between shaft segment 254 and second annular binding member 258 is in a direction that diminishes the frictional holding force between shaft segment 254 and second annular binding member 258. Subsequently releasing reciprocator 232 from its stressed position (FIG. 44) to its relaxed position (FIG. 43) allows first spring 260 to push first annular binding member 256 back to its free position of FIG. 43 while second spring 262 urging annular binding member 258 to its grip position (FIG. 43) prevents shaft segment 254 from retracting rightward back to where it was previously in FIG. 43. This cycle is repeated to incrementally extend shaft assembly 224.

To later retract shaft assembly 224, in this example, release lever 248 is tilted from its normal binding position of FIG. 43 to a release position of FIG. 45. In the release position, second annular binding member 258 releases its binding grip on shaft segment 254. With both annular binding members 256 and 258 in their release positions, as shown in FIG. 45, linear clutch 226 allows shaft assembly 224 to retract.

Figure 46:
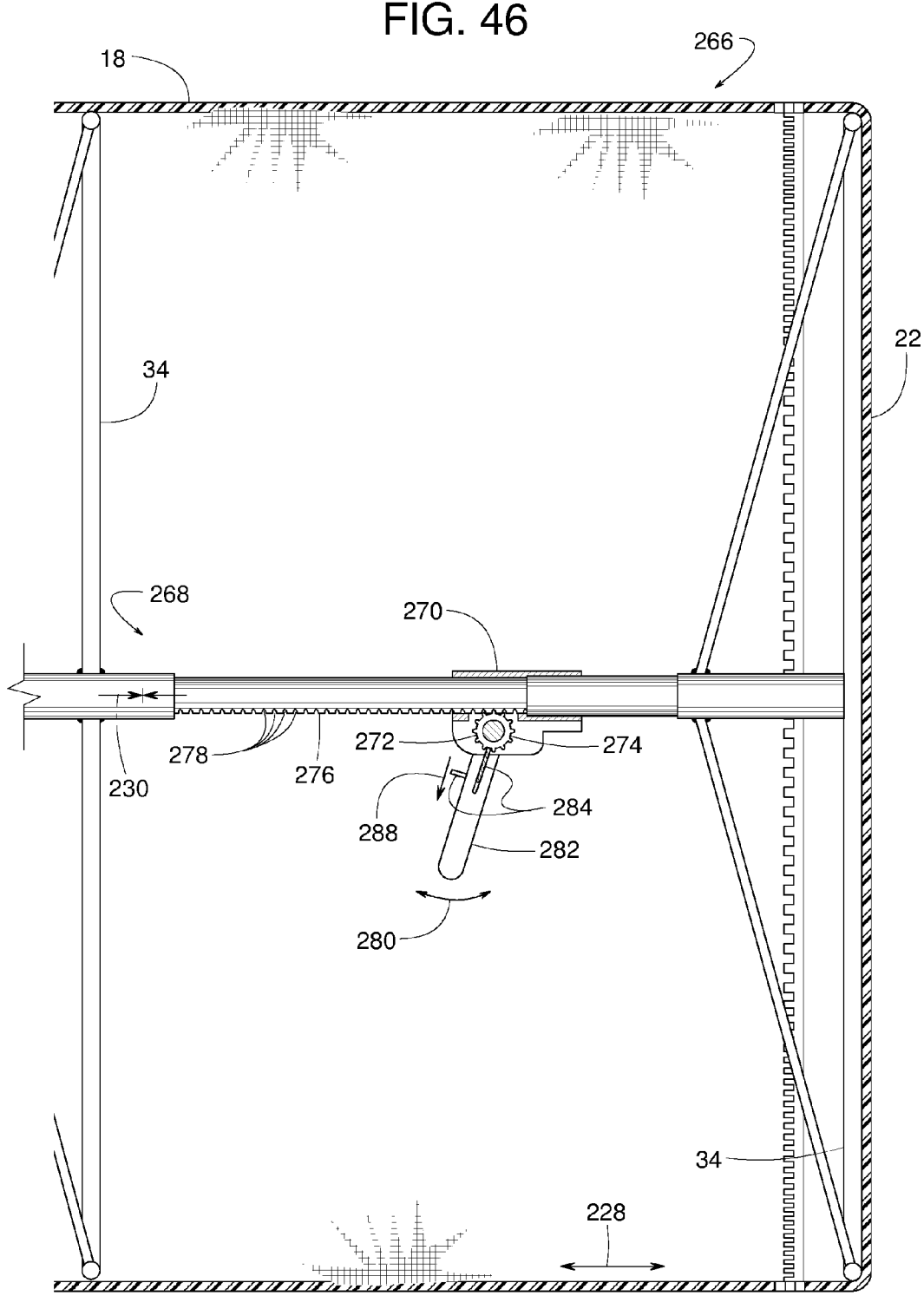
FIG. 46 is a cross-sectional side view similar to FIG. 39 but showing another example linear clutch.

In the example shown in FIG. 46, an air duct system 266 includes a shaft assembly 268 with another example linear clutch 270. Linear clutch 270 includes a ratchet mechanism 272 comprising a pawl 274 engaging a rack 276 having a plurality of discontinuities 278. The term, "pawl" means any movable element selectively engaging one or more discontinuities in a rack. Examples of a pawl include, but are not limited to, a pivotal bar or lever engaging one or more teeth or other discontinuities on a rack, and a partial or full pinion gear (e.g., pawl 274) with teeth mating with one or more teeth or other discontinuities on a rack. The term, "rack" means a generally linear elongate member with a plurality of discontinuities (e.g., teeth, protrusions, holes, detents, etc.) distributed along its length. Examples of a rack include, but are not limited to, a tube with a plurality of holes distributed along the tube's length, a tube with a plurality of detents distributed along the tube's length, and an elongate bar with a plurality of gear teeth distributed along the bar's length. A specific example of linear clutch 270 is a Ratcheting Cargo Bar, P/N 05059 (U.S. Pat. No. 5,443,342), provided by Keeper Corp. (Hampton Products International) of North Windham, Conn.

In the example illustrated in FIG. 46, repeatedly moving (in a cyclical manner 280) a reciprocator 282 of linear clutch 270 lengthens shaft assembly 268. Shaft assembly 268 can be shortened by manually actuating a release lever 284 to disengage lever 284 from pawl 272, wherein arrow 288 represents the actuation of release lever 284. FIG. 46 is similar to FIG. 39 in that linear clutch 270 is shown having extended shaft assembly 268 to place duct 10 in tension 228 and shaft assembly 268 in compression 230. An example of an air duct capable of automatic tension adjustment of the pliable sidewall material in the length direction of the duct, is shown in FIGS. 48-51.

Figure 47:
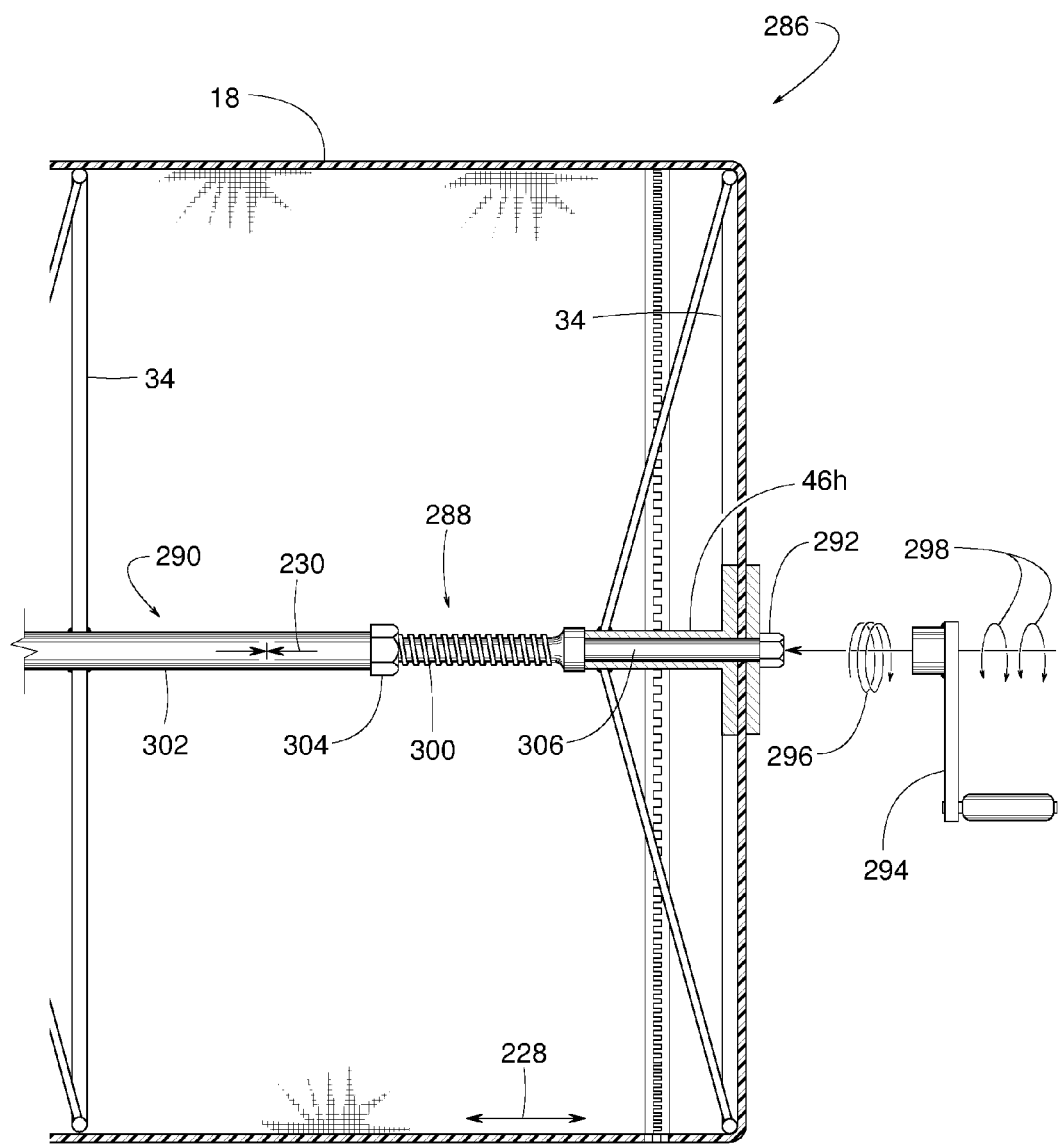
FIG. 47 is a cross-sectional side view similar to FIGS. 39 and 46 but showing yet another example linear clutch.

In another example, shown in FIG. 47, an air duct system 286 includes an example screw-style linear clutch 288 for placing duct 18 in tension 228 in reaction to a shaft assembly 290 being in compression 230. To adjust the length of shaft assembly 290 and/or to adjust the tension in duct 18, a head 292 of linear clutch 288 is rotated by a tool 294 in a cyclical manner (e.g., rotating tool 294 a plurality of continuous revolutions 296, or rotating tool 294 a plurality of partial revolutions 298). Such action varies the extent to which a rotatable screw 300 (helically threaded member) extends into a shaft tube 302 of shaft assembly 290.

In some examples, linear clutch 288 comprises screw 300 screwed into an internally threaded member 304 affixed to shaft tube 302 (e.g., a nut welded to the end of tube 302, or tube 302 being internally threaded), a shank 306 affixed to screw 300 such that shank 306 and screw 300 rotate as a unit, a tubular hub 46h radially supporting shank 306, and head 292 on shank 306. In some examples, tool 294 is a crank extending generally permanently from head 292. In some examples, tool 294 is a dedicated crank removably attached to head 292. In some examples, tool 294 is a general purpose wrench, such as a ratchet wrench with a socket that fits head 292. The direction and amount that tool 294 and screw 300 are rotated relative to internally threaded member 304 determine the extent to which screw 300 extends into shaft tube 302 and thus determines the adjusted length of shaft assembly 290. The adjusted length of shaft assembly 290, in turn, determines the tension and compression of duct 18 and shaft assembly 290, respectively.

Figure 48:
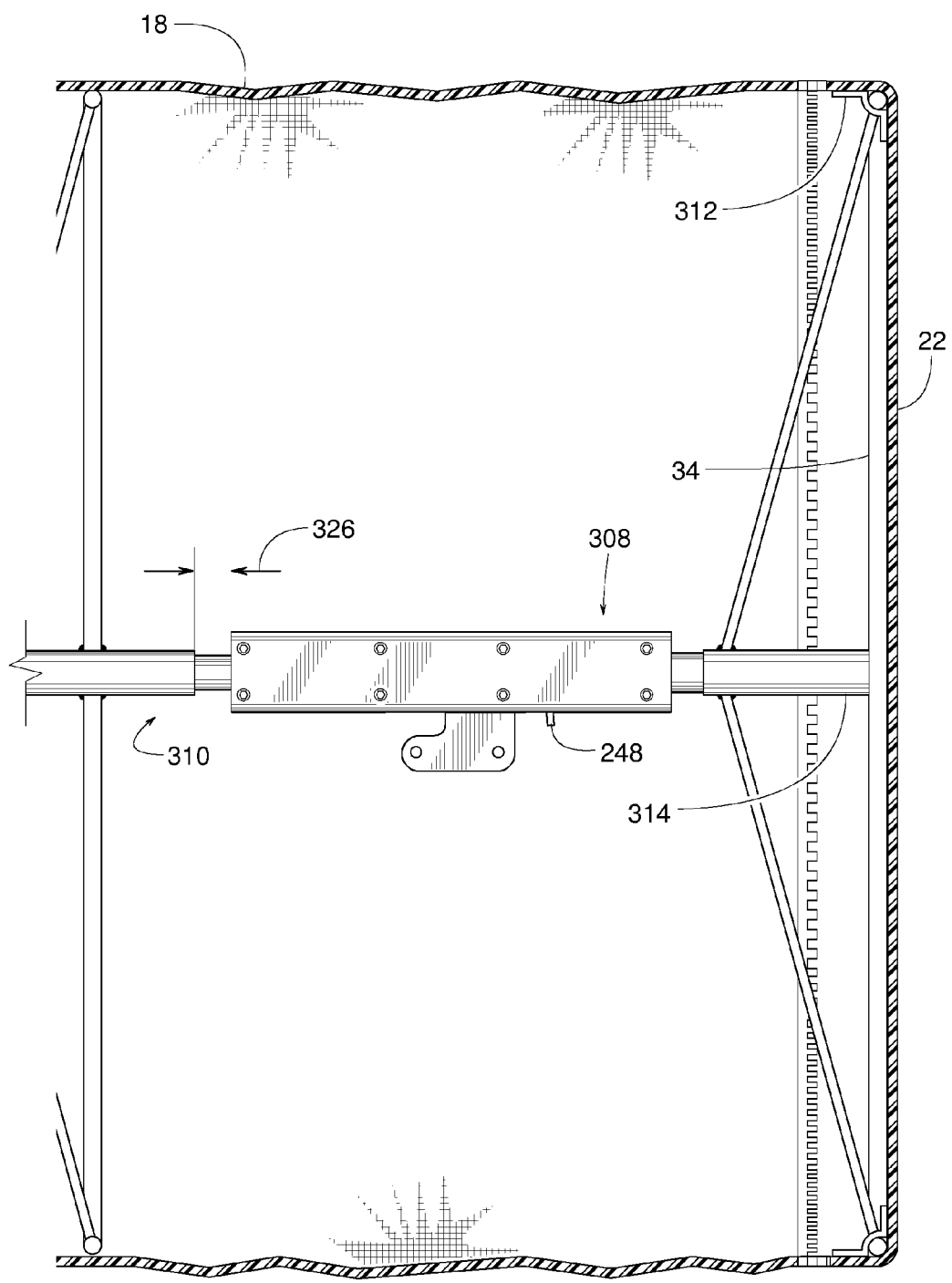
FIG. 48 is a cross-sectional side view showing another example air duct system with another example linear clutch.
Figure 49:
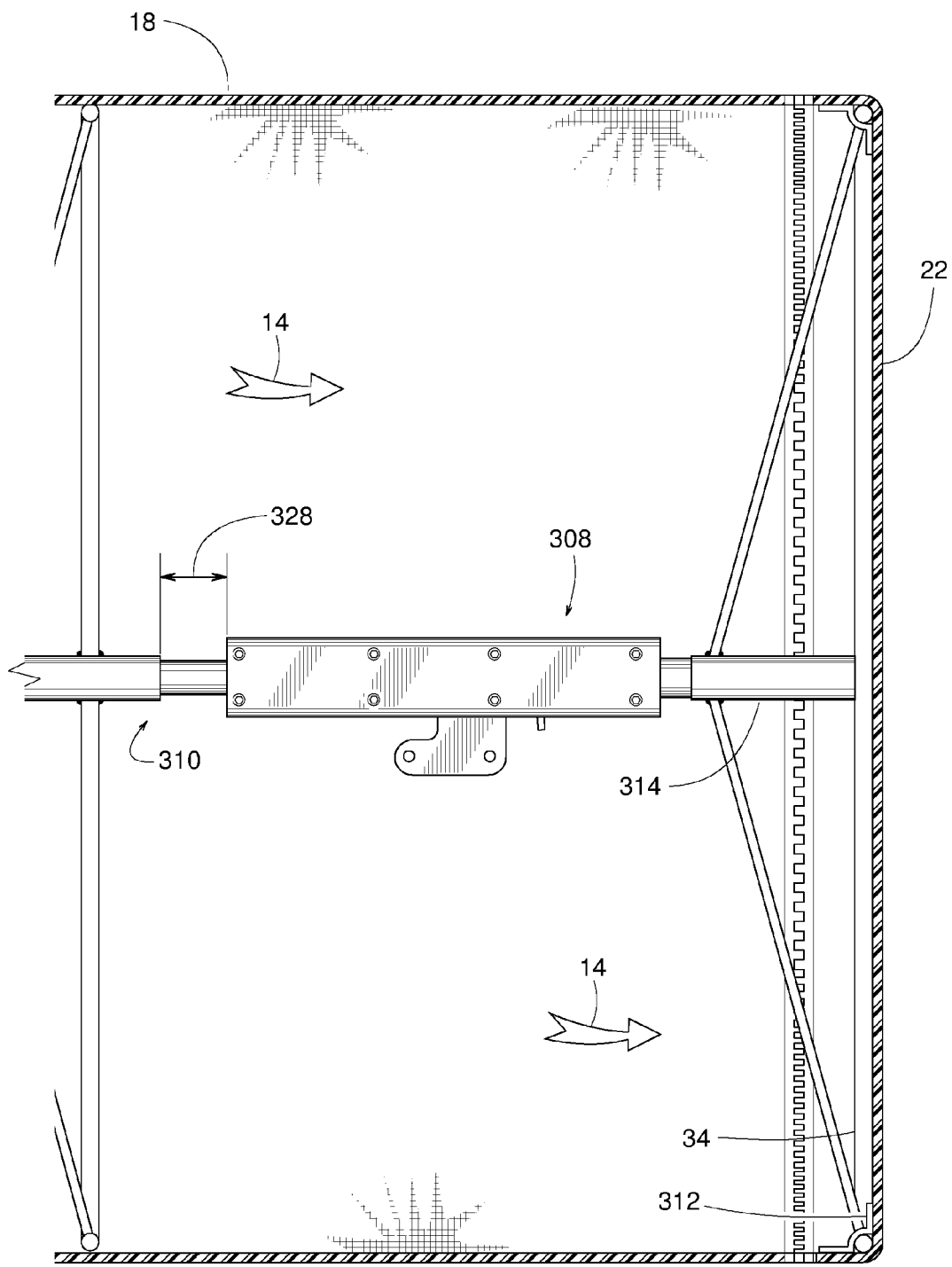
FIG. 49 is a cross-sectional side view similar to FIG. 48 but showing the air duct inflated and showing an example shaft assembly extended due to the duct's inflation.

In some examples, as shown in FIGS. 48-51, a linear clutch 308 allows the extension of a shaft assembly 310 (framework example) by inflating air duct 18 from a deflated state of FIG. 48 to an inflated state of FIG. 49 while a retainer 312 (e.g., strap, clip, clamp, pocket, loop, etc.) couples a distal end 314 of shaft assembly 310 to the air duct's end cap (e.g., end cap 22). In addition to retainer 312 and/or alternatively, in some examples, distal end 314 is attached to the duct's end cap in the manner illustrated in FIGS. 12-16.

As inflation naturally extends the length of duct 18, the air duct's resulting elongation lengthens shaft assembly 310 because the shaft assembly's distal end 314 is coupled to the duct's end cap. Once shaft assembly 310 is extended from its shorter length of FIG. 48 to its longer length of FIG. 49, the unidirectional gripping action of linear clutch 308 holds shaft assembly 310 at its extended length even after duct 18 is subsequently deflated, as shown in FIG. 50.

In some examples, linear clutch 226 used in shaft assembly 224 is identical to linear clutch 308; however, many parts of linear clutch 226 can be left unused. Eliminating the unused parts renders example linear clutch 308, as shown in FIGS. 48-51. FIG. 51 shows the elimination of handle 244, reciprocator 232, first annular binding member 256 and first compression spring 260. Thus, linear clutch 308 is left comprising housing 252, shaft segment 254, annular binding member 258 encircling shaft segment 254, release lever 248 integrally extending from annular binding member 258 and compression spring 262. The function of the parts included in linear clutch 308 function as those same parts which were described with reference to linear clutch 226.

Figure 50:
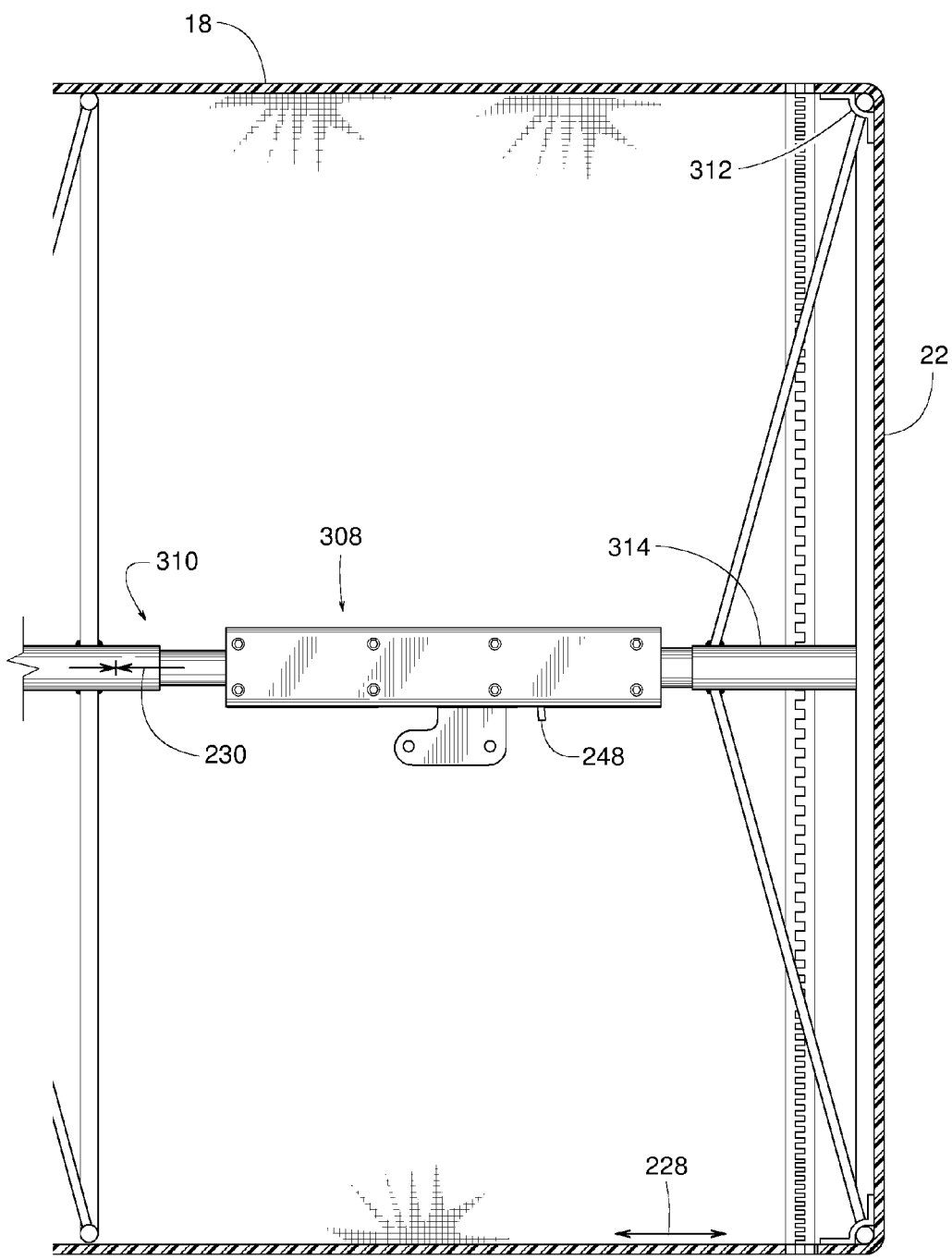
FIG. 50 is a cross-sectional side view similar to FIG. 49 but showing the duct deflated while the shaft assembly remains extended.
Figure 51:
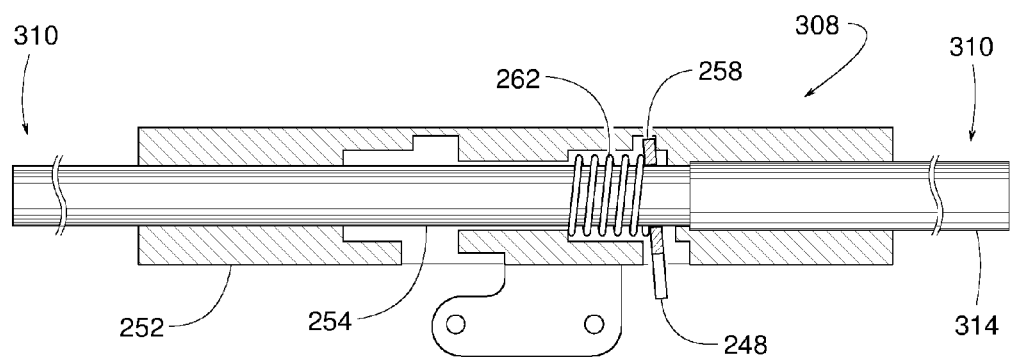
FIG. 51 is a cross-sectional side view similar to FIG. 43 but showing the linear clutch of FIGS. 48-50.
Figure 52:
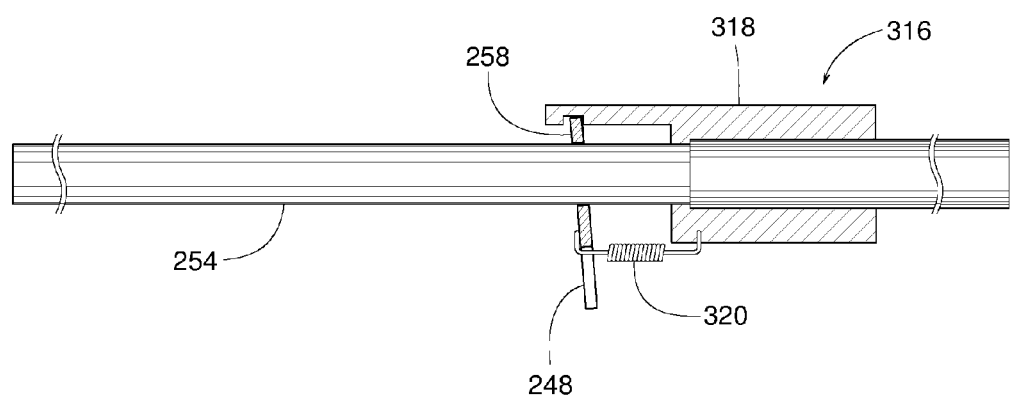
FIG. 52 is a cross-sectional side view similar to FIGS. 43 and 51 but showing another example of a linear clutch.

FIG. 52 illustrates an example linear clutch 316 that is functionally similar or identical to linear clutch 308 and in some examples is used as a substitute for linear clutch 308 in the air duct system illustrated in FIGS. 48-50. Structurally, linear clutch 316 includes a housing 318 instead of housing 252 and a tension spring 320 instead of compression spring 262. Tension spring 320 urges annular binding member 258 to its grip position shown in FIG. 52.

As for various methods pertaining to the examples illustrated in FIGS. 1-52, FIG. 21 provides at least one example that illustrates inserting a shaft assembly into an air duct. An arrow 322 of FIGS. 37 and 38 provides at least one example that illustrates manipulating the actuator in a cyclical manner that involves a plurality of cycles. An arrow 324 of FIG. 42 provides at least one example that illustrates lengthening the shaft assembly in a plurality of increments corresponding to the plurality of cycles. FIG. 39 provides at least one example that illustrates, as a consequence of lengthening the shaft assembly, subjecting the air duct to tension (arrow 228) in the longitudinal direction and subjecting the shaft assembly to compression (arrow 230) in the longitudinal direction. Arrow 322 of FIGS. 37 and 38 provides at least one example that illustrates manipulating the actuator in a reciprocating motion. Arrow 296 of FIG. 47 provides at least one example that illustrates turning a helically threaded member a plurality of revolutions. Arrow 280 of FIG. 46 and arrow 298 of FIG. 47 provide at least one example that illustrates manipulating a ratchet mechanism in a reciprocating motion. The current of air 14 in FIG. 49 and comparing the relatively limp air duct in FIG. 48 (deflated with no appreciable current of air 14) to the inflated taut air duct in FIG. 49 provides at least one example of inflating the air duct. Comparing a dimension 326 in FIG. 48 to a longer dimension 328 in FIG. 49 provides at least one example that illustrates as a consequence of inflating the air duct, lengthening the framework longitudinally to an extended length (e.g., L2 in FIG. 42). FIG. 50 without arrow 14 provides at least one example that illustrates deflating the air duct to a deflated state. Arrow 228 in FIG. 50 provides at least one example that illustrates subjecting the air duct to at least some longitudinal tension while the air duct is in the deflated state. Arrow 230 of FIG. 50 provides at least one example that illustrates subjecting the air duct to at least some longitudinal compression while the air duct is in the deflated state. Arrows 228 and 230 and shaft assembly 310 (example of a framework) in FIG. 50 provide at least one example that illustrates the framework holding the air duct in longitudinal tension while the air duct is in the deflated state and holding the framework in longitudinal compression while the air duct is in the deflated state.

Figure 53:
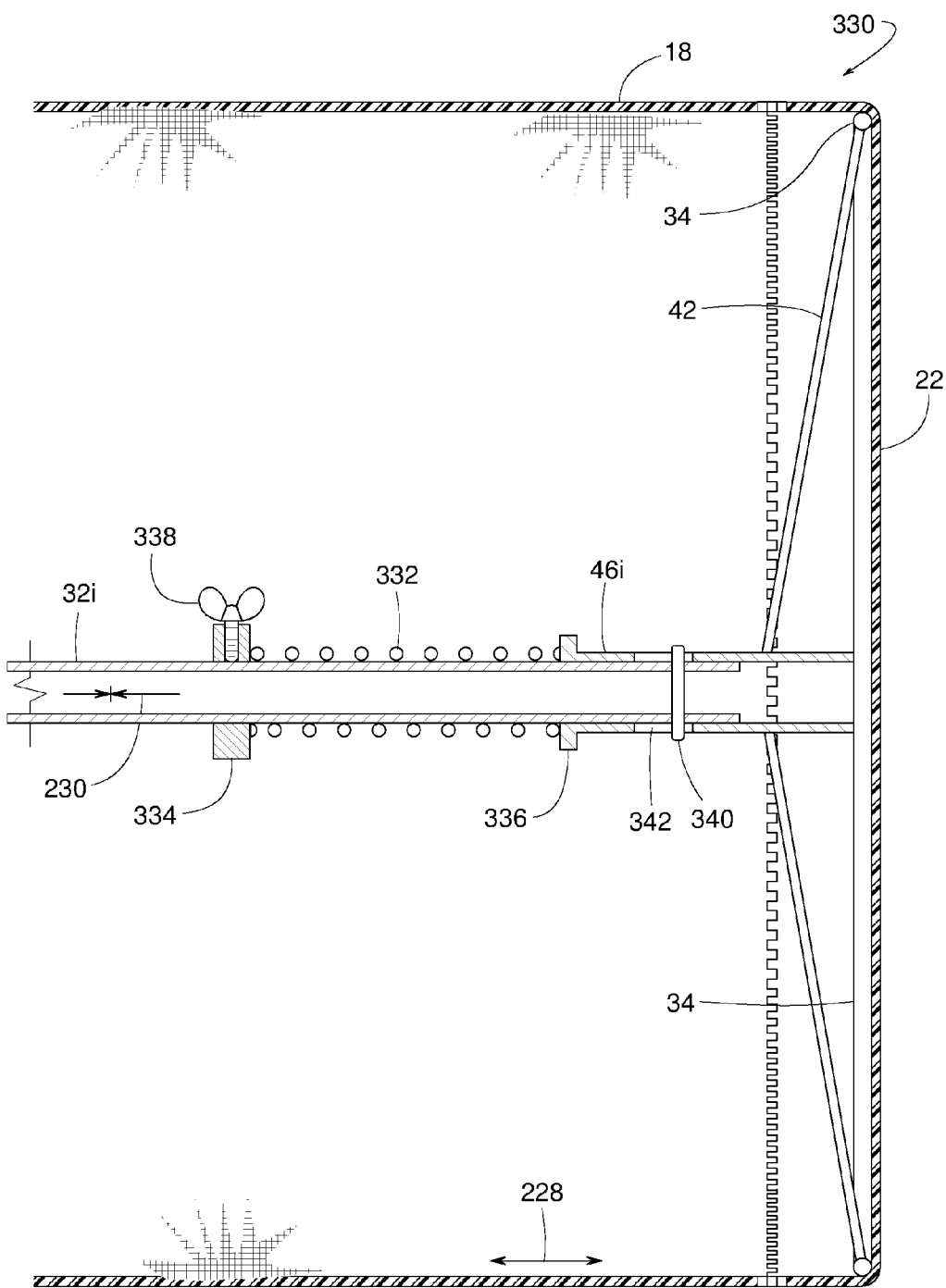
FIG. 53 is a cross-sectional side view showing another example duct system.
Figure 54:
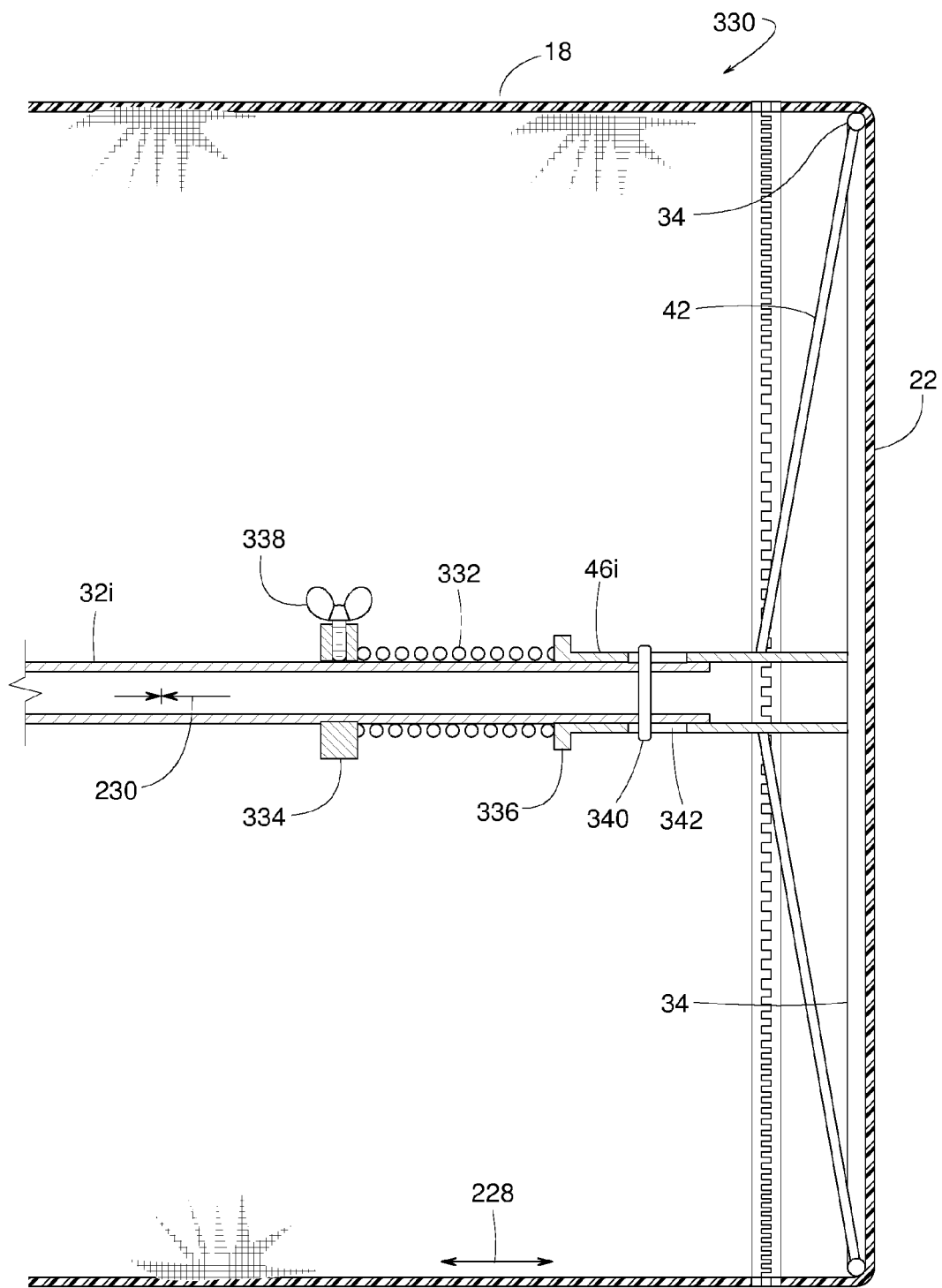
FIG. 54 is a cross-sectional side view similar to FIG. 53 but showing the system in another configuration.
Figure 55:
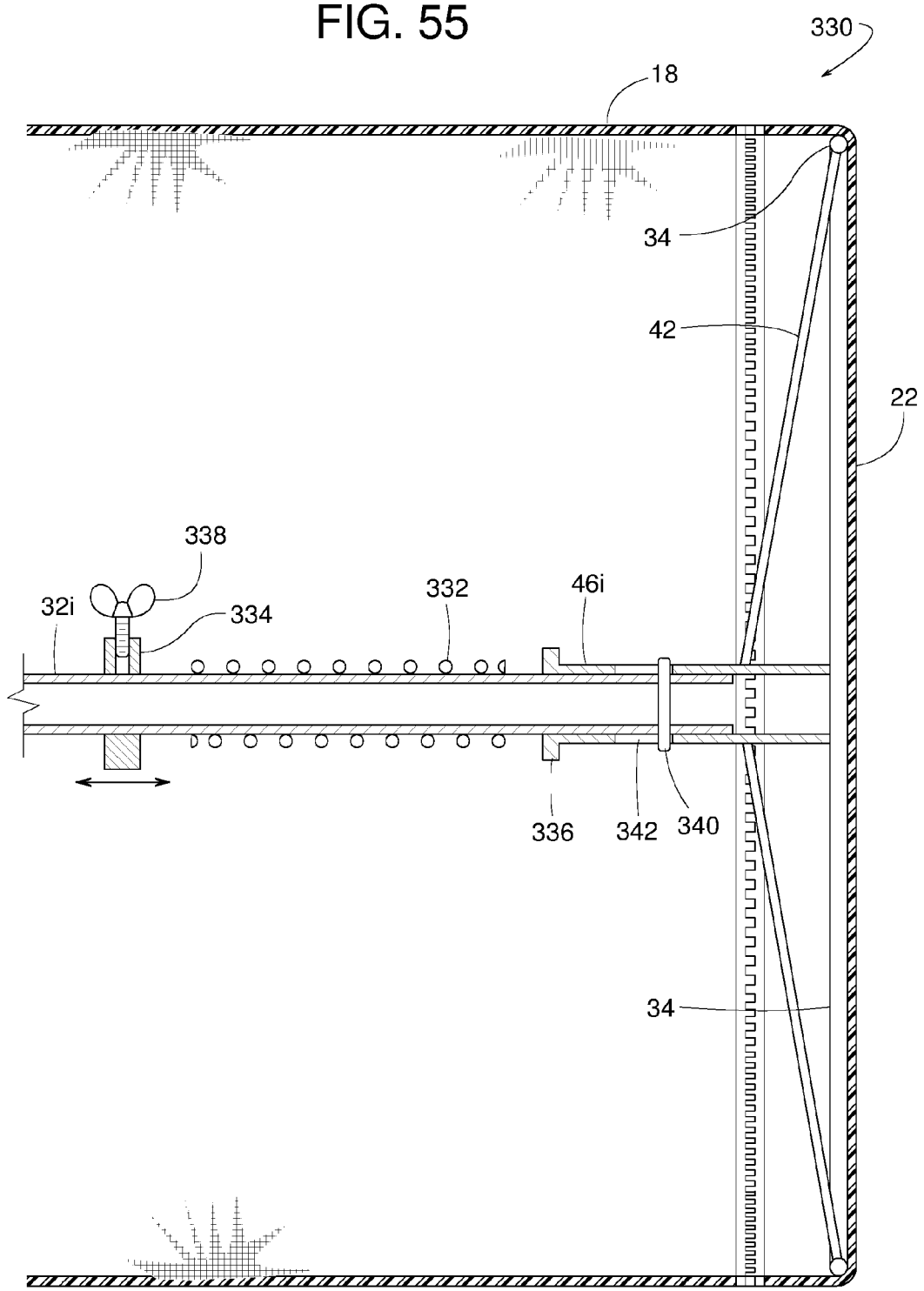
FIG. 55 is a cross-sectional side view similar to FIGS. 53 and 54 but showing the system in yet another configuration.

In some examples, as shown in FIGS. 53-55, air duct 18 of an air duct system 330 is held in tension longitudinally by a compression spring 332 that is adjustably compressed between a collar 334 and a tubular hub 46i. In the illustrated example, spokes 42 and rib 34 couple end cap 22 to hub 46i, and collar 334 encircles a tubular shaft 32i such that the collar's axial position on shaft 32i can be changed to adjust and set the tension of air duct 18.

FIG. 53, for instance, shows collar 334 at a less-stress position on shaft 32i to place spring 332 in a less-compressed state. Spring 332 being compressed between collar 334 and a shoulder 336 on hub 46i subjects air duct 18 to tension 228 and shaft 32i to compression 230. FIG. 54 shows collar 334 at a more-stress position that places spring 332 in a more-compressed state, which subjects air duct 18 to more tension 228 and shaft 32i to more compression 230.

To adjust the position of collar 334 on shaft 32i, collar 334 and/or shaft 32i includes a collar holding mechanism for selectively holding and releasing collar 334 relative to shaft 32i. Releasing collar 334 allows collar 334 to be manually slid axially to another position along shaft 32i. In the illustrated example, the holding mechanism is a thumbscrew 338 that screws into a threaded hole in collar 334 to selectively engage or release shaft 32i.

FIGS. 53 and 54 show thumbscrew 338 engaging shaft 32i to place collar 334 in a locked condition such that collar 334 remains axially fixed relative to shaft 32i. FIG. 55 shows thumbscrew 338 partially unscrewed from within the collar's threaded hole to release collar 334 from shaft 32i, thereby placing collar 334 in an unlocked condition. In the unlocked condition, collar 334 is free to be slid axially along shaft 32i for adjusting the compression of spring 332, which determines the tension in duct 18. In the unlocked condition, collar 334 can also be moved to completely release the compression of spring 332, as shown in FIG. 55.

In some examples, a pin 340 affixed to shaft 32i protrudes through one or more slots 342 that extend longitudinally along hub 46i. This limits the range of axial adjustment or relative movement between hub 46i and shaft 32i. In some cases, if end cap 22 is removed, the limited range of movement of pin 340 along slot 342 prevents a compressed spring 332 from pushing hub 46i completely off of shaft 32i.

Figure 56:
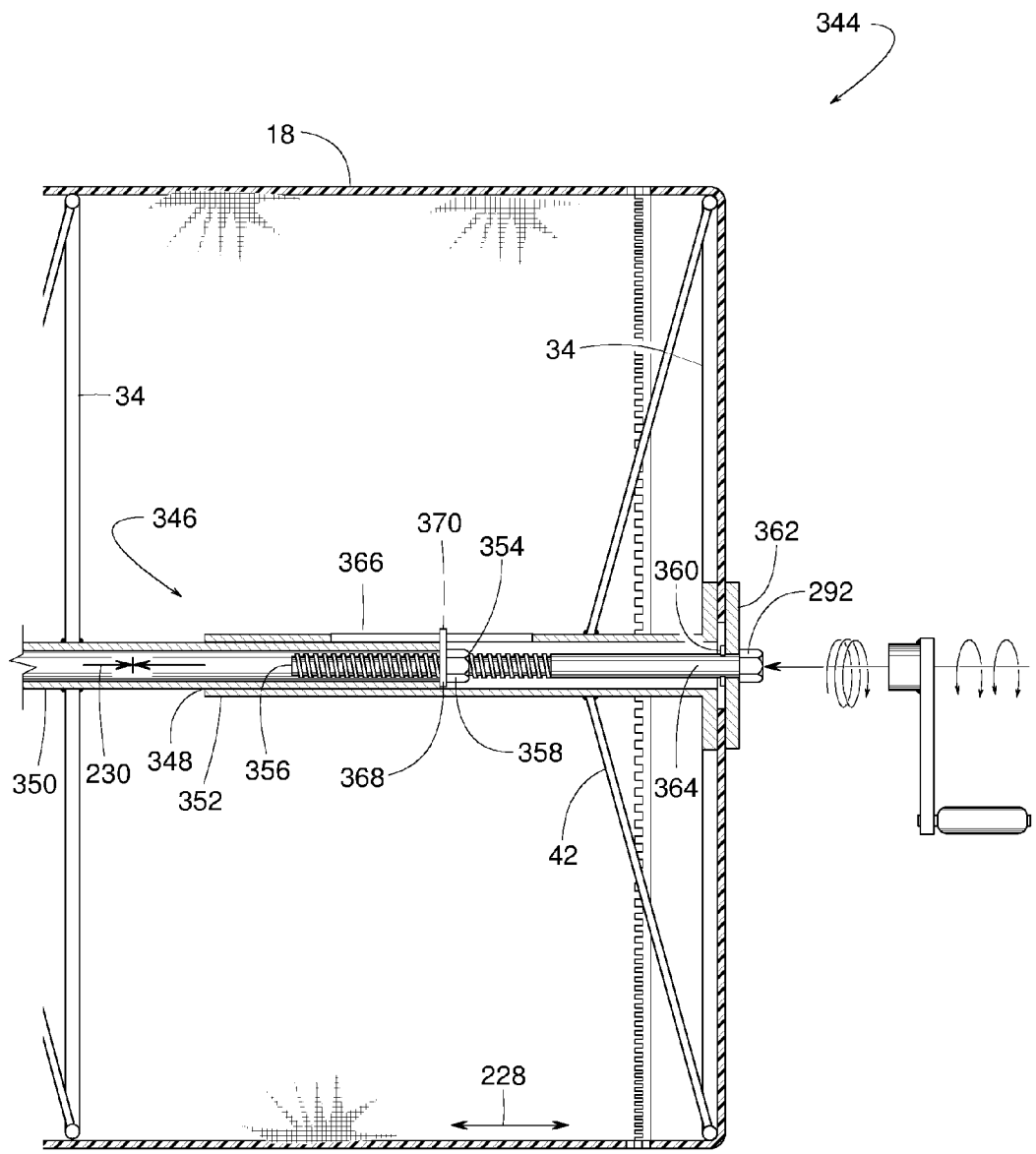
FIG. 56 is a cross-sectional side view similar to FIG. 47 but showing another example of an air duct system.
Figure 57:
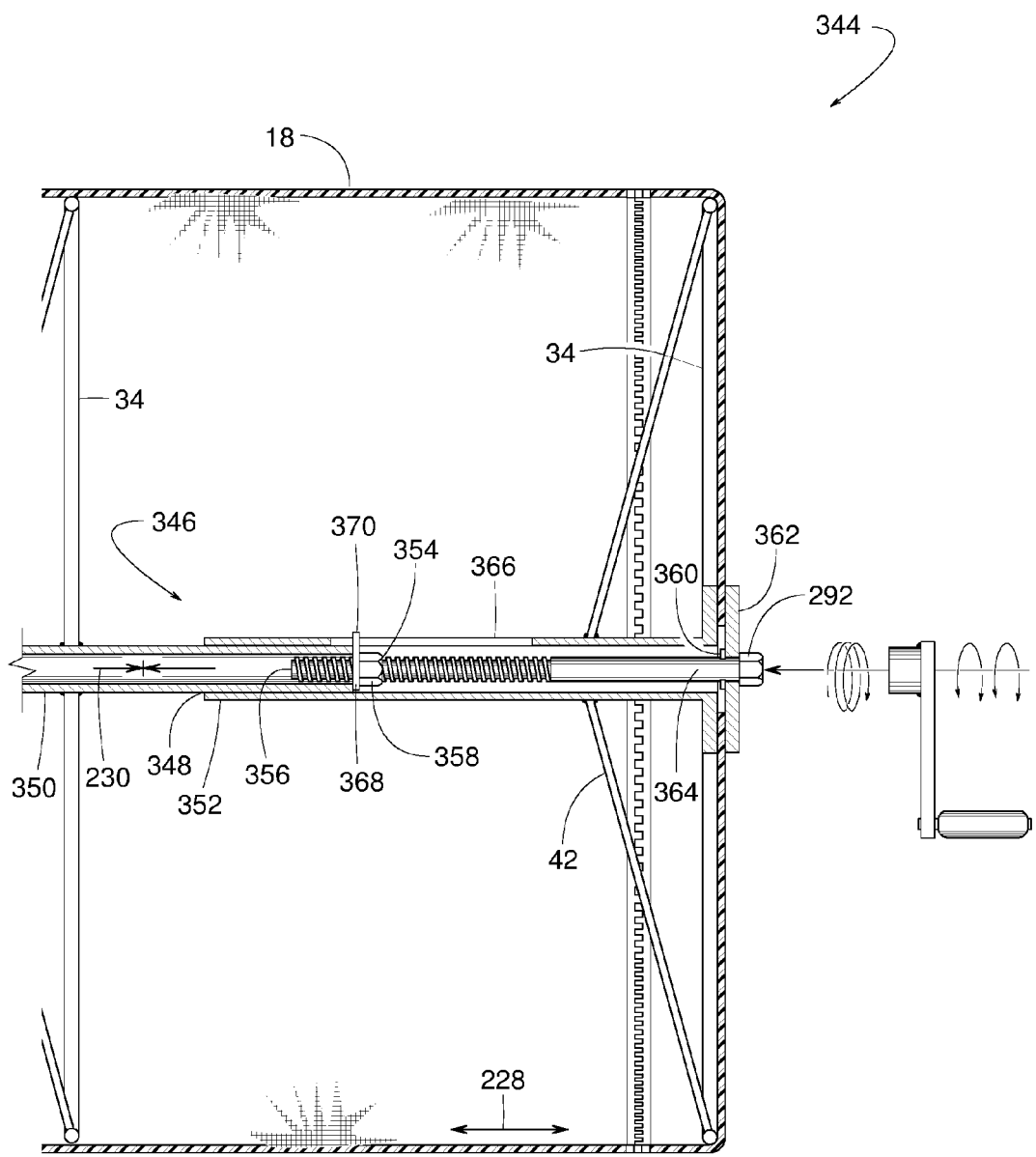
FIG. 57 is a cross-sectional side view similar to FIG. 56 but showing the air duct more taut.

In some examples, as shown in FIGS. 56 and 57, an air duct system 344 comprises a shaft assembly 346 from which spokes 42 extend radially outward to support a plurality of ribs 34, which in turn support air duct 18. The length of shaft assembly 346 is adjustable to hold duct 18 in longitudinal tension 228, which places shaft assembly 346 in longitudinal compression 230. In this example, the adjustment of shaft assembly 346 is by virtue of a telescopic connection 348 between a first shaft segment 350 and a second shaft segment 352 in combination with an adjustable threaded connection 354 between a screw 356 (e.g., threaded rod, bolt, etc.) and an internally threaded member 358 (e.g., a conventional nut, block with a tapped hole, plate with a tapped hole, etc.). Shaft assembly 346 is shown more extended in FIG. 57 than in FIG. 56, so the air duct's tension is greater in FIG. 57 than in FIG. 56.

To increase the shaft assembly's length and thus increase the tension in duct 18, head 292 on screw 356 is rotated in one direction relative to threaded member 358 such that threaded member 358 travels axially along the length of screw 356, away from head 292, to push first shaft segment 350 partially out from within second shaft segment 352. As shaft assembly 346 lengthens, a shaft retainer 360 abutting a plate 362 on end cap 22 prevents the head-end 364 of screw 356 from being forced axially outward from within duct 18. Examples of retainer 360 include, but are not limited to, a nut, washer or pin welded to screw 356; a shoulder on screw 356; an E-clip or C-clip on screw 356, etc. Examples of plate 362 include, but are not limited to, a washer, a disc, a grommet, etc. Rotating head 292 in the opposite direction moves threaded member 358 toward head 292, which allows first shaft segment 350 to retract into second shaft segment 352 and thus shorten shaft assembly 346 to reduce the duct's tension.

Relative rotation of screw 356 and threaded member 358 is achieved, in some examples, by an anti-rotation feature between threaded member 358 and a longitudinal slot 366 in second shaft segment 352. In some examples, the anti-rotation feature is a disc 368 attached to threaded member 358 and encircling screw 356, wherein disc 368 has a radial protrusion 370 extending into slot 366. Protrusion 370 extending into slot 366 inhibits relative rotation between disc 368 and second shaft segment 352. Since disc 368 is attached to threaded member 358, protrusion 370 extending into slot 366 also inhibits relative rotation between threaded member 358 and second shaft segment 352. In other words, protrusion 370 extending into slot 366 provides limited relative rotation between internally threaded member 358 and second shaft segment 352, wherein the term, "limited relative rotation," means that in reference to second shaft segment 352, threaded member 358 is rotatable less than 360 degrees and in some examples the threaded member's relative rotation is limited to zero degrees. Disc 368 also provides a bearing surface for pushing against an axial end of first shaft segment 350.

It should be noted that as head 292 is rotated to extend or retract shaft assembly 346, screw 356 has a substantially fixed longitudinal position relative to second shaft segment 352, and internally threaded member 358 has a substantially fixed axial position relative to first shaft segment 350.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. An air duct system comprising:
an air duct extending in a longitudinal direction and including a pliable sidewall;
a framework disposed at least partially inside the air duct;
means for applying to the pliable sidewall a tensile force in the longitudinal direction; and
means for maintaining the tensile force in the pliable sidewall by bearing a reactive compressive force in a longitudinal portion of the framework positioned inside the air duct.

2. The air duct system of claim 1, wherein:
the framework includes a longitudinally-extending shaft and at least one rib interconnecting the shaft to the pliable sidewall; and
the means for maintaining includes means for preventing relative longitudinal movement between the shaft and the rib.

3. The air duct system of claim 2, wherein the means for preventing includes a fastening means.

4. An air duct system comprising:
an air duct extending in a longitudinal direction and including a pliable sidewall;
a framework disposed at least partially inside the air duct, the framework including a longitudinally-extending shaft and at least one rib interconnecting the shaft to the pliable sidewall;
means for applying to the pliable sidewall a tensile force in the longitudinal direction; and
means for maintaining the tensile force in the pliable sidewall by bearing a reactive compressive force in a portion of the framework, the means for maintaining including means for preventing relative longitudinal movement between the shaft and the rib, wherein the means for preventing includes means for coupling a movable portion of the framework with the shaft to prevent relative longitudinal motion between the movable portion and the shaft.

5. The air duct system of claim 1, wherein:
the framework includes a first element interconnected with the pliable sidewall and a second element that is movable with respect to the first element; and
the means for applying the tensile force includes means for adjusting a longitudinal space between the first element and the second element.

6. The air duct system of claim 5, wherein the means for maintaining includes means for maintaining a desired longitudinal space between the first element and the second element.

7. The air duct system of claim 5, wherein the means for adjusting the longitudinal space includes a telescopic shaft positioned between the first element and the second element.

8. The air duct system of claim 1, wherein the means for applying the tensile force is configured to adjust a length of the framework in the longitudinal direction.

9. An air duct system comprising:
an air duct extending in a longitudinal direction and including a pliable sidewall;
a framework disposed at least partially inside the air duct;
means for applying to the pliable sidewall a tensile force in the longitudinal direction; and
means for maintaining the tensile force in the pliable sidewall by bearing a reactive compressive force in a portion of the framework, wherein the means for applying the tensile force includes a rotating actuator.

10. An air duct system comprising:
an air duct extending in a longitudinal direction and including a pliable sidewall;
a framework disposed at least partially inside the air duct;

means for applying to the pliable sidewall a tensile force in the longitudinal direction; and means for maintaining the tensile force in the pliable sidewall by bearing a reactive compressive force in a portion of the framework, wherein the means for maintaining includes a compression spring configured to apply a longitudinal force on an end cap engaged with the pliable sidewall.

11. An air duct system comprising:

an air duct extending in a longitudinal direction and including a pliable sidewall;

a framework disposed at least partially inside the air duct;

means for applying to the pliable sidewall a tensile force in the longitudinal direction; and means for maintaining the tensile force in the pliable sidewall by bearing a reactive compressive force in a portion of the framework, wherein:

the air duct includes an end cap and a main duct portion, the end cap being engaged with an end portion of the main duct portion and substantially perpendicular to the main duct portion;

the framework includes first and second telescoping shaft segments and at least one rib interconnecting one of the shaft segments to the end cap;

the means for applying the tensile force includes a helical compression spring having one end attached to a fixed point on the second shaft segment and a pin fixed on the first shaft segment, the compression spring threadingly engaging the pin such that relative rotation of the first and second shaft segments causes the pin to move axially along a length of the compression spring to set an effective length of the compression spring which is compressed as a result of securing the end cap to the main duct portion; and the means for maintaining includes securing the end cap to the main duct portion.

12. The air duct system of claim 11, wherein the means for maintaining further includes a releasable lock actuatable to temporarily fix the first and second shaft segments with respect to each other against a longitudinal biasing force in the compression spring while the end cap is being secured to the main duct portion, the releasable lock also being actuatable to release the first and second shaft segments for relative longitudinal movement after the end cap is secured to the main duct portion.

13. An air duct system comprising:

an air duct extending in a longitudinal direction and including a pliable sidewall;

a framework disposed at least partially inside the air duct;

means for applying to the pliable sidewall a tensile force in the longitudinal direction; and means for maintaining the tensile force in the pliable sidewall by bearing a reactive compressive force in a portion of the framework, wherein the framework is adjustable for extension and retraction in the longitudinal direction, and the means for maintaining includes a linear clutch that permits longitudinal extension of the framework and resists longitudinal retraction of the framework.

14. The air duct system of claim 13, wherein the linear clutch includes a lever, a ratchet, or a screw actuatable to cause or permit longitudinal extension and retraction of the framework.

15. The air duct system of claim 13, wherein the means for applying the tensile force includes a reciprocator extending from the linear clutch, the reciprocator being actuatable between a relaxed position and a stressed position to cause longitudinal extension of the framework.

16. The air duct system of claim 13, wherein the linear clutch includes a release lever actuatable to permit longitudinal retraction of the framework.

17. The air duct system of claim 13, wherein the linear clutch includes a pawl engageable with a rack to longitudinally elongate the framework, the rack having a plurality of discontinuities.

18. The air duct system of claim 13, wherein:

the linear clutch includes a threaded member that is rotatable to cause longitudinal extension and retraction of the framework; and both the means for applying and the means for maintaining include the threaded member.

19. An air duct system comprising:

an air duct extending in a longitudinal direction and including a pliable sidewall;

a framework disposed at least partially inside the air duct;

means for applying to the pliable sidewall a tensile force in the longitudinal direction; and means for maintaining the tensile force in the pliable sidewall by bearing a reactive compressive force in a portion of the framework, wherein the framework includes a shaft and a hub and the means for applying is a spring positioned between a collar slidingly engaged with the shaft and the hub, and the means for maintaining includes a collar holding mechanism having a first state in which the collar is longitudinally fixed with respect to the shaft and a second state in which the collar is longitudinally movable with respect to the shaft.

20. The air duct system of claim 19, wherein the collar is longitudinally movable with respect to a shoulder formed on the hub to change tension of the air duct.

21. An air duct system comprising:

an air duct extending in a longitudinal direction and including a pliable sidewall;

a framework disposed at least partially inside the air duct;

means for applying to the pliable sidewall a tensile force in the longitudinal direction; and means for maintaining the tensile force in the pliable sidewall by bearing a reactive compressive force in a portion of the framework, wherein:

the framework includes a first shaft and a second shaft in a telescoping arrangement, an internally threaded member engaging the first shaft, and an externally threaded member supported for rotation within the second shaft and threaded into the internally threaded member;

the means for applying includes a means for rotating the externally threaded member with respect to the internally threaded member to cause linear longitudinal movement of the first shaft with respect to the second shaft; and the means for maintaining includes frictional engagement between threads of the internally threaded member and the externally threaded member while the externally threaded member is not being rotated.

22. The air duct system of claim 21, wherein the means for applying includes means for preventing rotation of the internally threaded member with respect to the second shaft.

23. The air duct system of claim 22, wherein the means for preventing rotation includes a protrusion from the internally threaded member extending into a slot in the second shaft.

24. An air duct system comprising:
an air duct extending along a longitudinal extent; and
a framework including:
  a first hub;
  a second hub spaced from the first hub along a length of the framework; and
  means for adjusting a longitudinal space between the first hub and the second hub to apply tension to the air duct, wherein the means for adjusting the longitudinal space includes a shaft in a telescopic arrangement with at least one of the first hub and the second hub, wherein the framework is a material of less flexibility than a material of the air duct.

25. The air duct system of claim 24, wherein the means for adjusting the longitudinal space has a continuously adjustable length.

26. The air duct system of claim 24, further including a rib interconnected between the air duct and one of the first and second hubs.

27. The air duct system of claim 24, wherein the means for adjusting the longitudinal space is rotatably actuatable.

28. The air duct system of claim 24, wherein the means for adjusting the longitudinal space includes a linear clutch.

29. The air duct system of claim 24, further including means for selectively holding at least one of the first and second hubs in a selected position with respect to the means for adjusting the longitudinal space.

30. An air duct system comprising:
an air duct extending along a longitudinal extent; and
a framework including:
  a first hub;
  a second hub spaced from the first hub along a length of the framework; and
  means for adjusting a longitudinal space between the first hub and the second hub to apply tension to the air duct, wherein the means for adjusting includes a rack and pawl assembly, wherein the framework is a material of less flexibility than a material of the air duct.

* * * * *